(12) United States Patent
Iida et al.

(10) Patent No.: US 7,545,727 B2
(45) Date of Patent: Jun. 9, 2009

(54) RECORDING MEDIUM, RECORDING APPARATUS, AND READING APPARATUS

(75) Inventors: Michihiko Iida, Kanagawa (JP); Kunihiko Miyake, Kanagawa (JP)

(73) Assignee: Sony Corporation, Tokyo (JP)

( * ) Notice: Subject to any disclaimer, the term of this patent is extended or adjusted under 35 U.S.C. 154(b) by 44 days.

(21) Appl. No.: 11/506,832

(22) Filed: Aug. 21, 2006

(65) Prior Publication Data

US 2006/0274635 A1   Dec. 7, 2006

Related U.S. Application Data

(63) Continuation of application No. 09/790,594, filed on Feb. 23, 2001, now Pat. No. 7,164,633.

(30) Foreign Application Priority Data

Feb. 25, 2000   (JP)   ............... 2000-054411

(51) Int. Cl.
*G11B 7/00* (2006.01)
(52) U.S. Cl. .................. 369/275.3; 369/53.22
(58) Field of Classification Search ............. 369/275.2, 369/275.3, 47.27, 53.22, 44.26, 47.1, 47.28
See application file for complete search history.

(56) References Cited

U.S. PATENT DOCUMENTS

| | | | |
|---|---|---|---|
| 5,809,006 A | 9/1998 | Davis et al. | |
| 5,872,755 A | 2/1999 | Inazawa et al. | |
| 5,890,176 A | 3/1999 | Kish et al. | |
| 5,983,242 A | 11/1999 | Brown et al. | |
| 6,519,217 B1 * | 2/2003 | Kawashima et al. | 369/53.2 |
| 6,580,684 B2 | 6/2003 | Miyake et al. | |
| 6,917,572 B2 | 7/2005 | Iida et al. | |
| 6,990,052 B2 | 1/2006 | Iida et al. | |
| 7,006,417 B2 | 2/2006 | Iida et al. | |
| 7,106,671 B2 | 9/2006 | Iida et al. | |
| 7,164,633 B2 * | 1/2007 | Iida et al. | 369/47.27 |
| 2005/0163034 A1 | 7/2005 | Iida et al. | |
| 2005/0163035 A1 | 7/2005 | Iida et al. | |
| 2005/0190687 A1 | 9/2005 | Iida et al. | |
| 2006/0077839 A1 | 4/2006 | Iida et al. | |

FOREIGN PATENT DOCUMENTS

| | | |
|---|---|---|
| EP | 0 915 427 | 5/1999 |
| EP | 1089281 | 4/2001 |

(Continued)

OTHER PUBLICATIONS

U.S. Appl. No. 11/506,921, filed Aug. 21, 2006, Iida et al.

(Continued)

*Primary Examiner*—Nabil Z Hindi
(74) *Attorney, Agent, or Firm*—Oblon, Spivak, McClelland, Maier & Neustadt, P.C.

(57) ABSTRACT

In a recording medium, the physical characteristic information of the recording medium, and more specifically, the configuration (shape and size) and the moment of inertia of the disc, is recorded. This enables a recording apparatus or a reading apparatus to easily and correctly determine the physical characteristics of the disc, and thus to perform suitable settings for the recording or reading operation.

3 Claims, 52 Drawing Sheets

| BYTE POSITION | CONTENTS | NUMBER OF BYTES |
|---|---|---|
| 0 | MEDIUM TYPE/PART VERSION | 1 |
| 1 | MOMENT OF INERTIA/DISC SIZE/MAXIMUM TRANSFER RATE | 1 |
| 2 | DISC STRUCTURE | 1 |
| 3 | RECORDING DENSITY | 1 |
| 4 ~ 15 | RESERVED | 12 |
| 16 | BCA DESCRIPTOR | 1 |
| 17 ~ 31 | RESERVED | 15 |
| 32 | DISC TYPE ID | 1 |
| 33 ~ 499 | RESERVED | 467 |
| ⋮ | ⋮ | ⋮ |

| MOMENT OF INERTIA | | DISC SIZE | | MAXIMUM TRANSFER RATE | | | |
|---|---|---|---|---|---|---|---|
| (J1) | (J2) | | | | | | |
| b7 | b6 | b5 | b4 | b3 | b2 | b1 | b0 |

FOREIGN PATENT DOCUMENTS

| | | |
|---|---|---|
| JP | 01-300455 | 12/1989 |
| JP | 09-507946 | 8/1997 |
| JP | 10-69646 | 3/1998 |
| JP | 11-096602 | 4/1999 |
| JP | 11-134719 | 5/1999 |
| JP | 11-345455 | 12/1999 |
| JP | 2000-163809 | 6/2000 |
| WO | WO 96/16404 | 5/1996 |

OTHER PUBLICATIONS

U.S. Appl. No. 11/506,832, filed Aug. 21, 2006, Iida et al.
U.S. Appl. No. 11/506,789, filed Aug. 21, 2006, Iida et al.

* cited by examiner

FIG. 1A
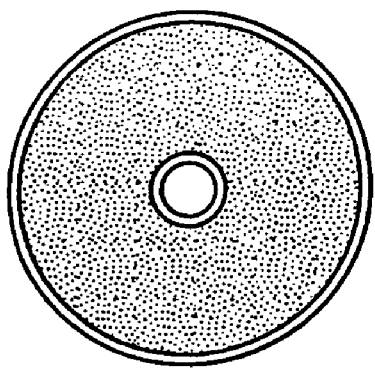
FIG. 1B
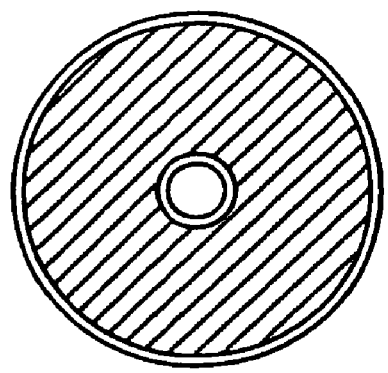
FIG. 1C
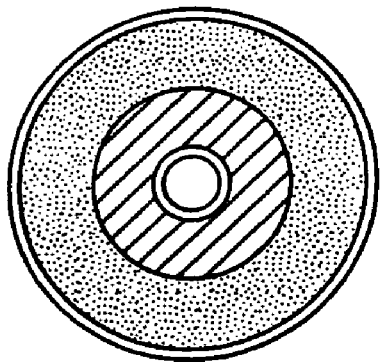
FIG. 1D
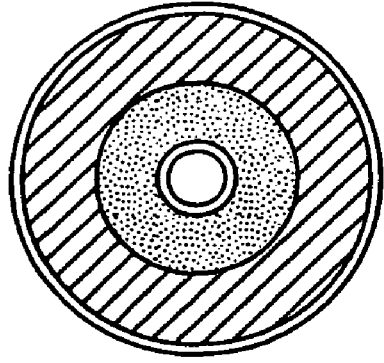
 : HIGH DENSITY
 : STANDARD DENSITY

FIG. 2

|  | STANDARD DENSITY | HIGH DENSITY |
|---|---|---|
| USER DATA CAPACITY | 650 Mbytes (120 mm)<br>195 Mbytes ( 80 mm) | 1.30 Gbytes (120 mm)<br>0.40 Gbytes ( 80 mm) |
| PROGRAM AREA START POSITION (RADIUS) | 50mm | 48mm |
| CENTER HOLE SIZE | 15mm | 15mm |
| DISC THICKNESS | 1.2mm | 1.2mm |
| TRACK PITCH | 1.6μm | 1.10μm |
| SCANNING VELOCITY | 1.2~1.4 m/s | 0.90m/s |
| LASER WAVELENGTH | 780nm | 780nm |
| NA | 0.45 | 0.55 (OR 0.50) |
| MODULATION METHOD | EFM | EFM |
| ERROR CORRECTING METHOD | CIRC4 | CIRC7 |
| CHANNEL BIT RATE | 4.3218 Mbps | 4.3218 Mbps |

FIG. 3A
(CD-DA, CD-ROM)
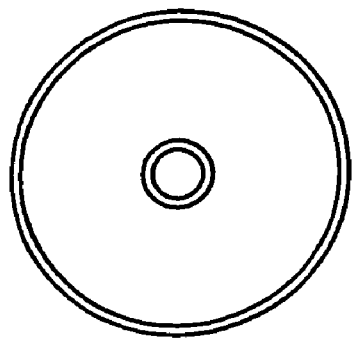
FIG. 3B
(CD-R)
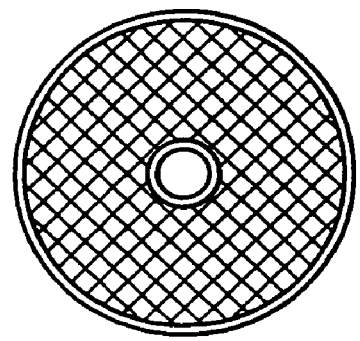
FIG. 3C
(CD-RW)
 : READ ONLY
 : DRAW (WORM)
 : REWRITABLE

☐ : READ ONLY

▨ : DRAW (WORM)

■ : REWRITABLE

FIG. 5A

| | DENSITY | RECORDING/READING TYPE |
|---|---|---|
| 1 | STANDARD | READ ONLY |
| 2 | STANDARD | DRAW (WORM) |
| 3 | STANDARD | REWRITABLE |
| 4 | HIGH | READ ONLY |
| 5 | HIGH | DRAW (WORM) |
| 6 | HIGH | REWRITABLE |

FIG. 5B

| | INNER PERIPHERY | OUTER PERIPHERY |
|---|---|---|
| HD1 | 1 | 2 |
| HD2 | 1 | 3 |
| HD3 | 1 | 4 |
| HD4 | 1 | 5 |
| HD5 | 1 | 6 |
| HD6 | 2 | 1 |
| HD7 | 2 | 3 |
| HD8 | 2 | 4 |
| HD9 | 2 | 5 |
| HD10 | 2 | 6 |
| HD11 | 3 | 1 |
| ⋮ | ⋮ | ⋮ |
| HD26 | 6 | 1 |
| HD27 | 6 | 2 |
| HD28 | 6 | 3 |
| HD29 | 6 | 4 |
| HD30 | 6 | 5 |

| BIT POSITION | 1~4 | 5~7 | 8~28 | 29~42 |
|---|---|---|---|---|
| NUMBER OF BITS | 4 | 3 | 21 | 14 |
| CONTENTS | SYNC. PATTERN | DISCRIMINATOR (IDENTIFIER) | WOBBLE INFORMATION | CRC |

(b)

| 5~8 | 9~28 |
|---|---|
| 41 | 20 |
| DISCRIMINATOR (IDENTIFIER) | WOBBLE INFORMATION |

FIG. 12

| | 24 BITS | |
|---|---|---|
| DISCRIMI-NATOR (M23 M22 M21) | CONTENTS OF WOBBLE INFORMATION (M20–M0) | |
| 000 | ADDRESSES OF PROGRAM AREA AND LEAD-OUT AREA | |
| 100 | ADDRESSES OF PCA, PMA, AND LEAD-IN AREA | |
| 101 | SPECIAL INFORMATION 1 | |
| 110 | SPECIAL INFORMATION 2 | |
| 111 | SPECIAL INFORMATION 3 | |
| 0010 | SPECIAL INFORMATION 4 | |
| 010 | ADDITIONAL INFORMATION 1 | |
| 011 | ADDITIONAL INFORMATION 2 | |
| 0011 | SUPPLEMENTAL INFORMATION | |

FIG. 13

| | M20 | M19 | M18 | M17 | M16 | M15 | M14 | M13 | M12 | M11 | M10 | M9 | M8 | M7 | M6 | M5 | M4 | M3 | M2 | M1 | M0 |
|---|---|---|---|---|---|---|---|---|---|---|---|---|---|---|---|---|---|---|---|---|---|
| SPECIAL INFORMATION 1 | TARGET RECORDING POWER | | | REFERENCE VELOCITY | | | | DISC APPLICATION CODE | | | | | | | DISC TYPE | | DISC SUB-TYPE | | RESERVED | | |
| SPECIAL INFORMATION 2 | START ADDRESS OF LEAD-IN AREA (ATIP ADDRESS) | | | | | | | | | | | | | | | | | | | | |
| SPECIAL INFORMATION 3 | START ADDRESS OF LEAD-OUT AREA (ATIP ADDRESS) | | | | | | | | | | | | | | | | | | | | |
| SPECIAL INFORMATION 4 | RESERVED | | | | | | | MANUFACTURER CODE | | | | | | | PRODUCT TYPE | | | | MATERIAL CODE | | |
| ADDITIONAL INFORMATION 1 | LOWEST CLV RECORDING VELOCITY | | | HIGHEST CLV RECORDING VELOCITY | | | | POWER MULTI-PLICATION FACTOR ρ | | | TARGET γ VALUE POWER FUNCTION | | | RE-SERVED | ERASING/ RECORDING POWER RATIO | | | RESERVED | | | |
| ADDITIONAL INFORMATION 2 | TARGET RECORDING POWER AT LOWEST RECORDING VELOCITY | | | TARGET RECORDING POWER AT HIGHEST RECORDING VELOCITY | | | | POWER MULTIPLICA-TION FACTOR ρ AT LOWEST RECORDING VELOCITY | | | POWER MULTIPLICA-TION FACTOR ρ AT HIGHEST RECORDING VELOCITY | | | RE-SERVED | ERASING/ RECORDING POWER RATE AT LOWEST RECORDING VELOCITY | | | ERASING/ RECORDING POWER RATE AT HIGHEST RECORDING VELOCITY | | | RE-SERVED |
| SUPPLEMENTAL INFORMATION | RESERVED | | | | | | | | | | | | | | INERTIA | | | DISC CONFIGU-RATION | PHYSICAL STUCTURE | | DISC DENSITY |
| COPYRIGHT INFORMATION 1 | RESERVED | | | | | | | | | | | | | | | | | | | | |
| COPYRIGHT INFORMATION 2 | RESERVED | | | | | | | | | | | | | | | | | | | | |

FIG. 14

| VALUE | MATERIAL |
|---|---|
| 000 | CYANINE |
| 001 | PHTHALOCYANINE |
| 010 | AZO COMPOUND |
| 100 | FOR PHASE CHANGE |
| OTHERS | RESERVED |

FIG. 15

| VALUE | MATERIAL |
|---|---|
| 0 | STANDARD DENSITY (SINGLE DENSITY) |
| 1 | HIGH DENSITY (DOUBLE DENSITY) |

FIG. 16

| VALUE | PHYSICAL STRUCTURE |
|---|---|
| 00 | REGULAR (CIRCULAR) DISC |
| OTHERS | RESERVED |

FIG. 17

| VALUE | DISC CONFIGURATION |
|---|---|
| 00 | CIRCULAR (8 cm, 12 cm) |
| 01 | TRIANGLULAR |
| 10 | QUADRILATERAL |
| 11 | OTHER CONFIGURATIONS |

FIG. 22

| VALUE | INERTIA |
|---|---|
| 00 | LESS THAN $0.01 \text{g} \cdot \text{m}^2$ |
| 01 | $0.01 \text{g} \cdot \text{m}^2$ OR GREATER BUT LESS THAN $0.02 \text{g} \cdot \text{m}^2$ |
| 10 | $0.02 \text{g} \cdot \text{m}^2$ OR GREATER BUT LESS THAN $0.03 \text{g} \cdot \text{m}^2$ |
| 11 | $0.03 \text{g} \cdot \text{m}^2$ OR GREATER |

FIG. 23

| VALUE | INERTIA |
|---|---|
| 000 | LESS THAN $0.004 \text{g} \cdot \text{m}^2$ |
| 001 | $0.004 \text{g} \cdot \text{m}^2$ OR GREATER BUT LESS THAN $0.010 \text{ g} \cdot \text{m}^2$ |
| 010 | $0.010 \text{g} \cdot \text{m}^2$ OR GREATER BUT LESS THAN $0.022 \text{g} \cdot \text{m}^2$ |
| 011 | $0.022 \text{g} \cdot \text{m}^2$ OR GREATER BUT LESS THAN $0.032 \text{g} \cdot \text{m}^2$ |
| 100 | $0.032 \text{g} \cdot \text{m}^2$ OR GREATER BUT LESS THAN $0.037 \text{g} \cdot \text{m}^2$ |
| 101 | $0.037 \text{g} \, \text{m}^2$ OR GREATER |
| OTHERS | RESERVED |

| FRAME | SUB-CODING FRAME |
|---|---|
| 98n+1 | SYNC. PATTERN |
| 98n+2 | SYNC. PATTERN |
| 98n+3 | P1 Q1 R1 S1 T1 U1 V1 W1 |
| 98n+4 | P2 Q2 R2 S2 T2 U2 V2 W2 |
| ⋮ | ⋮ |
| 98n+97 | P95 Q95 R95 S95 T95 U95 V95 W95 |
| 98n+98 | P96 Q96 R96 S96 T96 U96 V96 W96 |
| 98(n+1)+1 | |

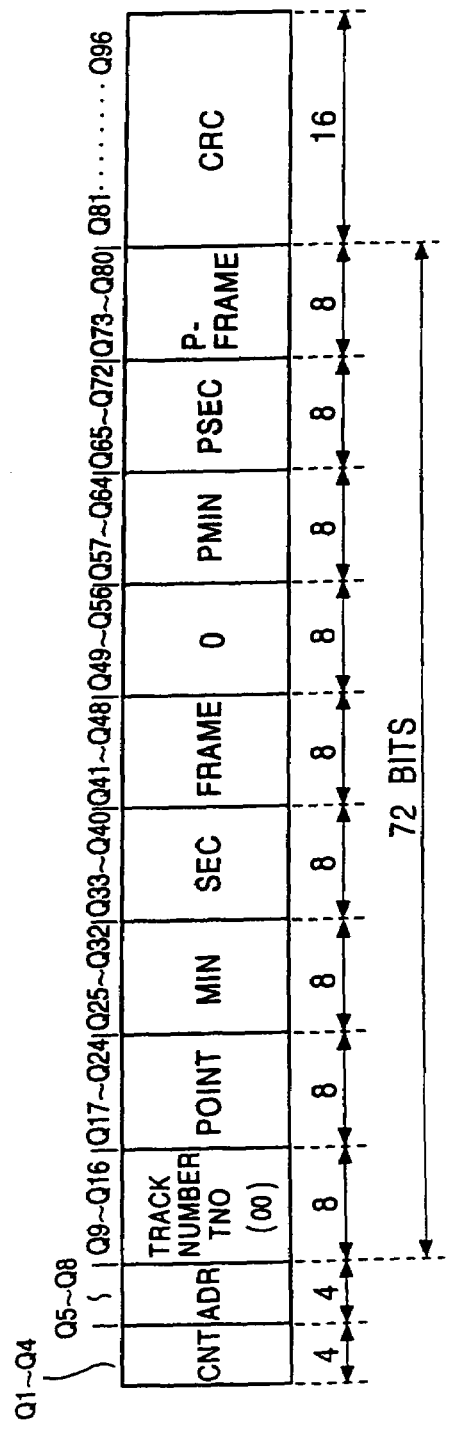
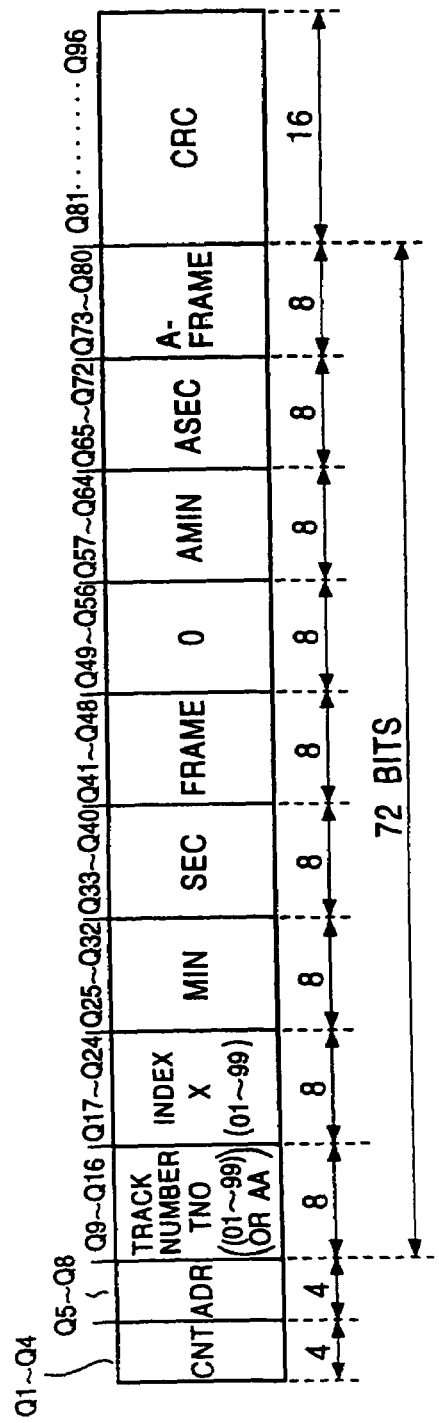
FIG. 29A
FIG. 29B

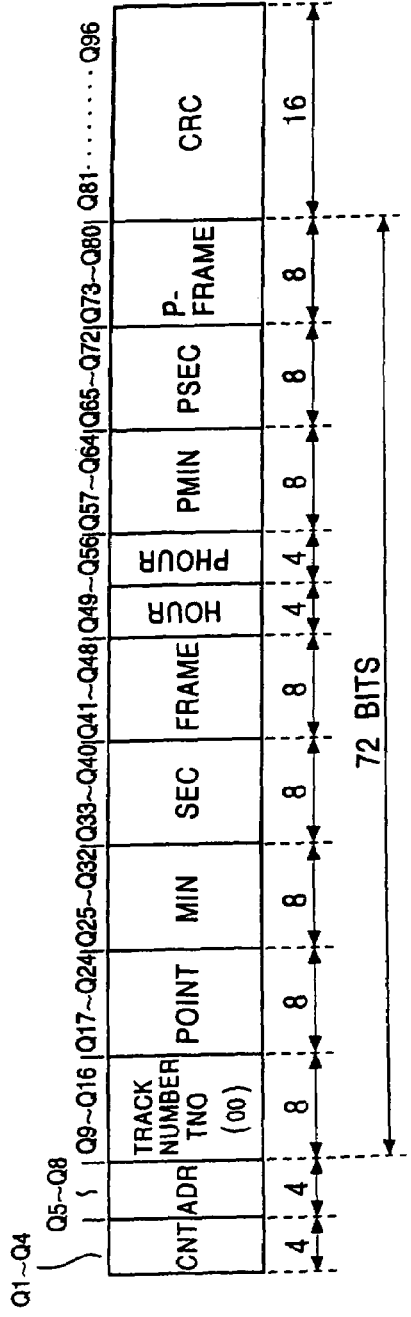

FIG. 31

| TNO | BLOCK NO. | POINT | PHOUR. | PMIN. | PSEC. | PFRAME | |
|---|---|---|---|---|---|---|---|
| 00 | n | 01 | 0. | 00. | 02. | 32 | START POINT OF TRACK #1 |
| | n+1 | 01 | 0. | 00. | 02. | 32 | |
| | n+2 | 01 | 0. | 00. | 02. | 32 | |
| | n+3 | 02 | 0. | 10. | 15. | 12 | START POINT OF TRACK #2 |
| | n+4 | 02 | 0. | 10. | 15. | 12 | |
| | n+5 | 02 | 0. | 10. | 15. | 12 | |
| | n+6 | 03 | 0. | 16. | 28. | 63 | START POINT OF TRACK #3 |
| | n+7 | 03 | 0. | 16. | 28. | 63 | |
| | n+8 | 03 | 0. | 16. | 28. | 63 | |
| | n+9 | 04 | . | | | | |
| | n+10 | 04 | . | | | | |
| | n+11 | 04 | . | | | | |
| | n+12 | 05 | . | | | | |
| | n+13 | 05 | . | | | | |
| | n+14 | 05 | . | | | | |
| | n+15 | 06 | 0. | 49. | 10. | 03 | START POINT OF TRACK #6 |
| | n+16 | 06 | 0. | 49. | 10. | 03 | |
| | n+17 | 06 | 0. | 49. | 10. | 03 | |
| | n+18 | A0 | 0. | 01. | 00. | 00 | TRACK NUMBER OF FIRST TRACK OF DISC |
| | n+19 | A0 | 0. | 01. | 00. | 00 | |
| | n+20 | A0 | 0. | 01. | 00. | 00 | |
| | n+21 | A1 | 0. | 06. | 00. | 00 | TRACK NUMBER OF FINAL TRACK OF DISC |
| | n+22 | A1 | 0. | 06. | 00. | 00 | |
| | n+23 | A1 | 0. | 06. | 00. | 00 | |
| | n+24 | A2 | 0. | 52. | 48. | 41 | START POINT OF LEAD-OUT TRACK |
| | n+25 | A2 | 0. | 52. | 48. | 41 | |
| 00 | n+26 | A2 | 0. | 52. | 48. | 41 | |
| 00 | n+27 | 01 | 0. | 00. | 02. | 32 | REPEAT |
| | n+28 | 01 | 0. | 00. | 02. | 32 | |
| | . | . | . | | | | |

FIG. 32

(a) (SUB-CODE Q, LEAD-IN AREA)

| CTR | ADR | TNO | POINT | MIN | SEC | FRM | PMIN | PSEC | PFRM | CRC |
|---|---|---|---|---|---|---|---|---|---|---|
| | 1 | 00 | 01~9F | ABSOLUTE TIME | | | ABSOLUTE TIME AT WHICH EACH TRACK STARTS | | | |
| | 1 | 00 | A0 | ABSOLUTE TIME | | | 0 FIRST TNO | 00 | 00 | |
| | 1 | 00 | A1 | ABSOLUTE TIME | | | 0 FINAL TNO | 00 | 00 | |
| | 1 | 00 | A2 | ABSOLUTE TIME | | | ABSOLUTE TIME AT WHICH LEAD-OUT AREA STARTS | | | |
| | 1 | 00 | F0 | ABSOLUTE TIME | | | 0 PHSICAL INFORMATION OF MEDIUM | | | |

PHOUR
HOUR (b)

| PMIN | | | | PSEC | | | | PFRM | | | | |
|---|---|---|---|---|---|---|---|---|---|---|---|---|
| Q57 | Q58 | Q59 | Q60 | Q61 | Q62 | Q63 | Q64 | Q65 | Q66 | Q67 | Q68 | Q69 | Q70 | Q71 | Q72 | Q73 | Q74 | Q75 | Q76 | Q77 | Q78 | Q79 | Q80 |
| MATERIAL | | MEDIUM | | LINEAR VELOCITY | | TRACK PITCH | | CON-FIGU-RATION | | DISC SIZE | | |

MOMENT OF INERTIA

FIG. 33

Q77~Q80 (DISC SIZE)

| 0000 | 120mm |
|---|---|
| 0001 | 80mm |
| OTHERS | RESERVED |

FIG. 34

Q75, Q76 (CONFIGURATION)

| 00 | CIRCULAR |
|---|---|
| 01 | TRIANGULAR |
| 10 | QUADRILATERAL |
| 11 | OTHER CONFIGURATIONS |

FIG. 35

Q73, Q74 (INERTIA)

| 00 | LESS THAN $0.01 \text{g} \cdot \text{m}^2$ |
|---|---|
| 01 | $0.01 \text{g} \cdot \text{m}^2$ OR GREATER BUT LESS THAN $0.02 \text{g} \cdot \text{m}^2$ |
| 10 | $0.02 \text{g} \cdot \text{m}^2$ OR GREATER BUT LESS THAN $0.03 \text{g} \cdot \text{m}^2$ |
| 11 | $0.03 \text{g} \cdot \text{m}^2$ OR GREATER |

FIG. 36

Q69~Q72 (TRACK PITCH)

| | |
|---|---|
| 0000 | 1.05 μm |
| 0001 | 1.10 μm |
| 0010 | 1.15 μm |
| 0011 | 1.20 μm |
| 1000 | 1.50 μm |
| 1001 | 1.55 μm |
| 1010 | 1.60 μm |
| 1011 | 1.65 μm |
| 1100 | 1.70 μm |
| OTHERS | RESERVED |

FIG. 37

Q65~Q68 (LINEAR VELOCITY)

| | |
|---|---|
| 0000 | 0.84 m/s |
| 0001 | 0.86 m/s |
| 0010 | 0.88 m/s |
| 0011 | 0.90 m/s |
| 0100 | 0.92 m/s |
| 0101 | 0.94 m/s |
| 0110 | 0.96 m/s |
| 0111 | 0.98 m/s |
| 1000 | 1.15 m/s |
| 1001 | 1.20 m/s |
| 1010 | 1.25 m/s |
| 1011 | 1.30 m/s |
| 1100 | 1.35 m/s |
| 1101 | 1.40 m/s |
| 1110 | 1.45 m/s |
| 1111 | RESERVED |

FIG. 38

Q61 ~ Q64 (MEDIUM TYPE)

| | |
|---|---|
| 0000 | RO (READ ONLY) |
| 0001 | R (RECORDABLE) |
| 0010 | RW (REWRITABLE) |
| 0011 | RESERVED |
| 0100 | RO/R (HYBRID) |
| 0101 | RO/RW (HYBRID) |
| 0110 | R/RO (HYBRID) |
| 0111 | RW/DRAW (WORM) (HYBRID) |
| 1000 | RO (STANDARD DENSITY) / RO (HIGH DENSITY) (HYBRID) |
| OTHERS | RESERVED |

FIG. 39

Q57 ~ Q60 (MATERIAL TYPE)

| | |
|---|---|
| 0000 | EMBOSSED |
| 0001 | RESERVED |
| 0010 | RESERVED |
| 0011 | RESERVED |
| 0100 | RESERVED |
| 0101 | RESERVED |
| 0110 | RESERVED |
| 0111 | RESERVED |
| 1000 | CYANINE |
| 1001 | PHTALOCYANINE |
| 1010 | AZO COMPOUND |
| 1011 | FOR PHASE-CHANGE MEDIA |
| OTHERS | RESERVED |

(SUB-CODE Q, LEAD-IN AREA)

| CTR | ADR | TNO | POINT | MIN | SEC | FRM | PHOUR / HOUR | PMIN | PSEC | PFRM | CRC |
|---|---|---|---|---|---|---|---|---|---|---|---|
|  | 1 | 00 | 01~9F | ABSOLUTE TIME |  |  |  | ABSOLUTE TIME AT WHICH EACH TRACK STARTS |  |  |  |
|  | 1 | 00 | A0 | ABSOLUTE TIME |  |  |  | FIRST TNO | 00 | 00 |  |
|  | 1 | 00 | A1 | ABSOLUTE TIME |  |  |  | FINAL TNO | 00 | 00 |  |
|  | 1 | 00 | A2 | ABSOLUTE TIME |  |  |  | ABSOLUTE TIME AT WHICH LEAD-OUT AREA STARTS |  |  |  |
|  | 1 | 00 | F0 | ABSOLUTE TIME |  |  |  | PHSICAL INFORMATION OF MEDIUM |  |  |  |

(b)

| PMIN | | | PSEC | | | | PFRM | | | |
|---|---|---|---|---|---|---|---|---|---|---|
| Q57 | Q58 Q59 | Q60 Q61 Q62 Q63 | Q64 Q65 | Q66 Q67 | Q68 Q69 Q70 Q71 | Q72 Q73 | Q74 Q75 | Q76 Q77 | Q78 Q79 | Q80 |
| MEDIUM TYPE | MEDIUM VERSION | MATERIAL TYPE | LINEAR VELOCITY | TRACK PITCH | RESERVED | MOMENT OF INERTIA | DISC SIZE/ CONFIGU- RATION |

| | |
|---|---|
| 0000 | 120mm |
| 0001 | 80mm |
| 0010 ⌇ 1111 | RESERVED (OTHER SIZES AND CONFIGURATIONS) |

| | |
|---|---|
| 00 | 1.10μm |
| OTHERS | RESERVED |

| | |
|---|---|
| 00 | 0.90m/s |
| OTHERS | RESERVED |

| 0000 | VER.0.9 |
|---|---|
| 0001 | VER.1.0 |
| OTHERS | RESERVED |

| 0000 | HIGH DENSITY READ ONLY |
|---|---|
| 0001 | HIGH DENSITY RECORDABLE |
| 0010 | HIGH DENSITY REWRITABLE |
| OTHERS | RESERVED |

FIG. 46

(SUBCODE-Q, LEAD-IN AREA)

| CTR | ADR | TNO | POINT | MIN | SEC | FRM | PMIN | PSEC | PFRM | CRC |
|---|---|---|---|---|---|---|---|---|---|---|
| | 5 | 00 | B0 | ABSOLUTE TIME AT WHICH PROGRAM AREA OF SUBSEQUENT UNIT AREA STARTS | | | ABSOLUTE TIME AT WHICH LEAD-OUT AREA OF FINAL UNIT AREA STARTS | | | |
| | 5 | 00 | C0 | ATIP SPECIAL INFORMATION 1 | | 0 | ABSOLUTE TIME AT WHICH LEAD-IN AREA OF FIRST UNIT AREA STARTS | | | |
| | 5 | 00 | C1 | COPY OF ATIP SPECIAL INFORMATION 1 | | 0 | RESERVED | | | |
| | 5 | 00 | CF | ABSOLUTE TIME AT WHICH LEAD-OUT AREA OF CURRENT UNIT AREA ENDS | | | ABSOLUTE TIME AT WHICH LEAD-IN AREA OF SUBSEQUENT UNIT AREA STARTS | | | |

MIN SEC FRM → HOUR
PMIN PSEC PFRM → PHOUR

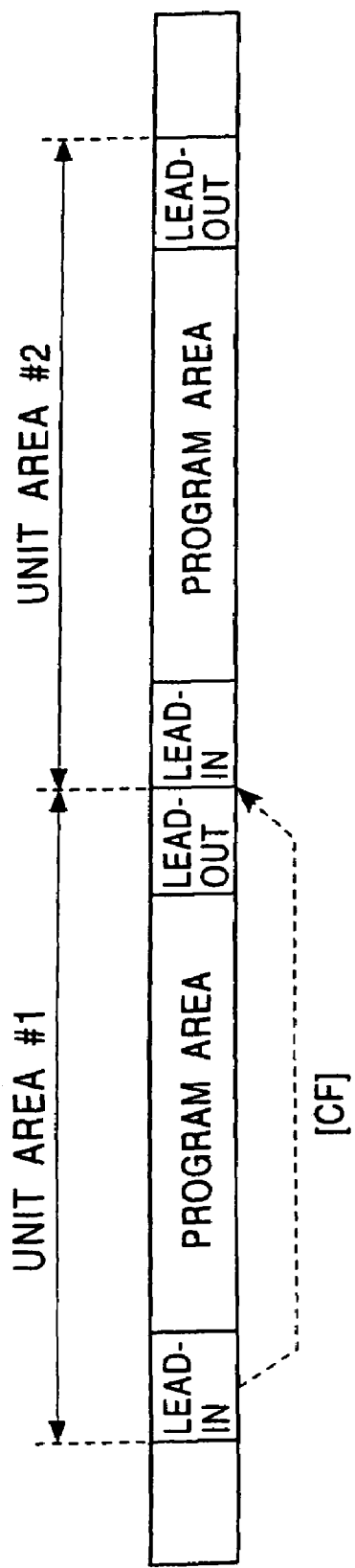
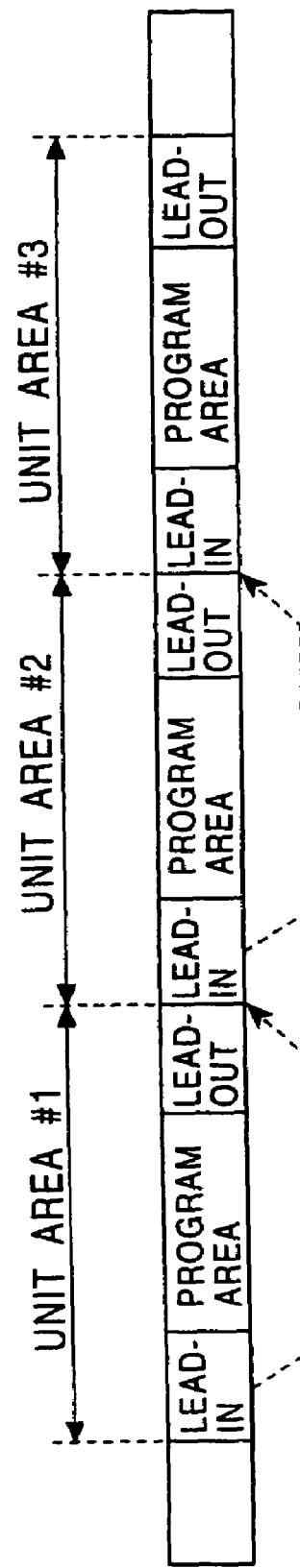
FIG. 47A
FIG. 47B

FIG. 58

| FIELD ID | CONTENTS OF DISC INFORMATION | POSITION |
|---|---|---|
| ID0 | ECC BLOCK ADDRESS | ALL AREAS |
| ID1 | APPLICATION CODE/PHYSICAL DATA | LEAD-IN AREA |
| ID2 | OPC SUGGESTED CODE/WRITE STRATEGY CODE (WS1) | LEAD-IN AREA |
| ID3 | MANUFACTURER ID (MID1) | LEAD-IN AREA |
| ID4 | MANUFACTURER ID (MID2) | LEAD-IN AREA |
| ID5 | WRITE STRATEGY CODE (WS2) | LEAD-IN AREA |

FIG. 59

| PRE-PIT FRAME | RELATIVE ADDRESS | USER DATA (8 BITS) | | PART |
|---|---|---|---|---|
| PF0 | 0000 | ECC BLOCK ADDRESS | | PART A |
| PF1 | 0001 | | | |
| PF2 | 0010 | | | |
| PF3 | 0011 | PARITY A | | |
| PF4 | 0100 | | | |
| PF5 | 0101 | | | |
| PF6 | 0110 | (FIELD ID)　　ID 1 | | PART B |
| PF7 | 0111 | DISC INFOR- MATION | APPLICATION CODE | |
| PF8 | 1000 | | DISC PHYSICAL CODE | |
| PF9 | 1001 | | LAST ADDRESS OF DATA RECORDABLE AREA | |
| PF10 | 1010 | | | |
| PF11 | 1011 | | | |
| PF12 | 1100 | | PART VERSION/ EXTENSION CODE | |
| PF13 | 1101 | PARITY B | | |
| PF14 | 1110 | | | |
| PF15 | 1111 | | | |

FIG. 60A

| | CONTENTS | DEFINITION | |
|---|---|---|---|
| b7 | TRACK PITCH | 0 : 0.80μm | 1 : 0.74μm |
| b6 | REFERENCE VELOCITY | 0 : 3.84m/s | 1 : 3.49m/s |
| b5 | DISC SIZE | 0 : 12cm | 1 : 8cm |
| b4 | INDEX OF REFLECTION | 0 : 45~85% | 1 : 18~30% |
| b3 | MOMENT OF INERTIA | J1 | |
| b2 | MEDIUM TYPE (1) | 0 : OTHERS | 1 : PHASE CHANGE MEDIUM |
| b1 | MEDIUM TYPE (2) | 0 : RECORDABLE | 1 : REWRITABLE |
| b0 | MOMENT OF INERTIA | J2 | |

FIG. 60B

| J1,J2 | DEFINITION |
|---|---|
| 00 | LESS THAN 0.01g·m² |
| 01 | 0.01g·m² OR GREATER BUT LESS THAN 0.02g·m² |
| 10 | 0.02g·m² OR GREATER BUT LESS THAN 0.03g·m² |
| 11 | 0.03g·m² OR GREATER |

| BYTE POSITION | CONTENTS | NUMBER OF BYTES |
|---|---|---|
| 0 | MEDIUM TYPE/PART VERSION | 1 |
| 1 | MOMENT OF INERTIA/DISC SIZE/MAXIMUM TRANSFER RATE | 1 |
| 2 | DISC STRUCTURE | 1 |
| 3 | RECORDING DENSITY | 1 |
| 4 ~ 15 | RESERVED | 12 |
| 16 | BCA DESCRIPTOR | 1 |
| 17 ~ 31 | RESERVED | 15 |
| 32 | DISC TYPE ID | 1 |
| 33 ~ 499 | RESERVED | 467 |
| ⋮ | ⋮ | ⋮ |

| BYTE POSITION | CONTENTS | NUMBER OF BYTES |
|---|---|---|
| 0 | DISC CATEGORY/VERSION NUMBER | 1 |
| 1 | DISC SIZE | 1 |
| 2 | DISC STRUCTURE | 1 |
| 3 | RECORDING DENSITY | 1 |
| 4 ~ 15 | DATA ZONE ALLOCATION | 12 |
| 16 | RESERVED | 1 |
| 17 | MOMENT OF INERTIA/DISC CONFIGURATION | 1 |
| 18 ~ 30 | RESERVED | 13 |
| ⋮ | ⋮ | ⋮ |

RECORDING MEDIUM, RECORDING APPARATUS, AND READING APPARATUS

BACKGROUND OF THE INVENTION

1. Field of the Invention

The present invention relates to a recording medium, and also to a recording apparatus and a reading apparatus compatible with such a recording medium.

2. Description of the Related Art

As a recording medium, a compact disc (CD) is known. Various types of CD-format discs, such as compact disc digital audio (CD-DA), compact disc read only memory (CD-ROM), compact disc recordable (CD-R), compact disc rewritable (CD-RW), and CD-TEXT, all of which belong to the so-called "CD family", have been developed and are commonly used.

The CD-DA and CD-ROM are read only, while the CD-R is a write-once medium using an organic pigment on a recording layer, and the CD-RW is a rewritable medium using a phase change technique.

On such CD-format discs, data, such as music, video, and computer data, are recorded, and also, track numbers, indexes, and addresses are recorded as sub-codes.

The track number is a number representing a piece of music (track). The indexes are units which form a track, for example, units which partition the movements of a track.

The addresses include absolute addresses represented by consecutive values covering the whole disc and relative addresses represented in units of tracks (which are also referred to as "programs" represented in units of pieces of music). Accordingly, by extracting sub-codes, the absolute address and the relative address at each position of a disc can be identified.

The address is represented by a time value, such as minute/second/frame. Thus, in the CD format, the "time" can be synonymous with the "position (address)", for example, the "absolute time" corresponds to the "absolute address".

For example, in the CD format, the sub-code address is represented by minute/second/frame, each having eight bits. Since the eight-bit address is represented in binary coded decimal (BCD), it can express a range from 0 to 99. Accordingly, the "minute" can be designated from 0 to 99 minutes. However, the "second" is inevitably expressed from 0 to 59, and the "frame" is expressed from 0 to 74 since 75 frames, such as frame 0 to frame 74 are defined in the CD format.

On the innermost portion of a disc, sub-code information, such as table-of-content (TOC) information, is recorded. The TOC information indicates an address representing the head and the extent of each track. The content of the address (type of address) can be identified by point information.

For example, if the point information designates a special value, the information described in the corresponding sub-code frame indicates the start address of each track or the first/last track number rather than the absolute address or the relative address.

In recordable discs, such as a CD-R and a CD-RW, a recording track is formed by wobbling grooves. The wobbling waveforms of the grooves are formed by modulating waveforms based on the absolute address information, and thus, the absolute addresses can be identified by the wobbling information of the grooves. Since sub-codes are not yet recorded on a disc without recorded data, the address information is read by the wobbling groove when data is recorded.

In addition to the above-described various types of CD-format (CD-standard) discs, larger capacity discs with high density are being developed, and discs having a plurality of areas whose physical characteristics are different, which are referred to as "hybrid discs", are also being developed. The variety of the materials and configurations of discs is also being increased.

Under these circumstances, in order to achieve sufficient recording and reading performance of a recording apparatus and a reading apparatus, it becomes necessary to optimize various settings in accordance with the physical characteristics of a loaded disc. For example, the servo gain, laser power, and access range should be optimized.

It is, however, difficult to sufficiently determine the physical characteristics of the individual discs loaded in a recording apparatus or a reading apparatus. Certain calibration may be performed when a disc is loaded, and even so, it is still difficult to precisely determine the physical characteristics of the loaded disc. Additionally, since the burden is increased by the calibration operation, the amount of software and hardware must be increased, and also, it takes a longer time before a recording or reading operation is started.

Accordingly, there is still a demand for easy and precise determination of the physical characteristics of discs without impairing the compatibility with known CD-format discs or increasing the complexity of hardware and software used in a recording apparatus and a reading apparatus.

SUMMARY OF THE INVENTION

Accordingly, in view of the above background, it is an object of the present invention to easily and precisely determine the physical characteristics of recording media while being compatible with various types of recording media and maintaining the compatibility with known recording media.

In order to achieve the above object, according to one aspect of the present invention, there is provided a recording medium including configuration information recorded therein, the configuration information indicating a configuration of the recording medium.

On the recording medium, a recording track may be formed by a groove, the groove representing predetermined information by wobbling of the groove. In this case, the configuration information may be recorded as information represented by the wobbling of the groove. The wobbling of the groove may be obtained by performing the frequency modulation or the phase modulation on the groove.

Alternatively, on the recording medium, a recording track may be formed by a groove, and a pit may be pre-formed on a land located between adjacent grooves. In this case, the configuration information may be recorded as information represented by the pit.

Alternatively, on the recording medium, a recording track may be formed by a groove, and an embossed pit may be pre-formed on a predetermined area. In this case, the configuration information may be recorded as information represented by the embossed pit.

The configuration information may be recorded in a lead-in area formed on the recording medium.

The recording medium may further include material information indicating a material of a recording layer of the recording medium. The material information is recorded according to the same technique as the technique for recording the configuration information.

According to another aspect of the present invention, there is provided a recording medium including moment-of-inertia information recorded therein, the moment-of-inertia information indicating a moment of inertia of the recording medium.

On the recording medium, a recording track may be formed by a groove on the recording medium, the groove representing predetermined information by wobbling of the groove. The moment-of-inertia information may be recorded as information represented by the wobbling of the groove. The wobbling of the groove may be obtained by performing the frequency modulation or the phase modulation on the groove.

Alternatively, on the recording medium, a recording track may be formed by a groove, and a pit may be pre-formed on a land of located between adjacent grooves. In this case, the moment-of-inertia information may be recorded as information represented by the pit.

Alternatively, on the recording medium, a recording track may be formed by a groove, and an embossed pit may be pre-formed on a predetermined area. In this case, the moment-of-inertia information may be recorded as information represented by the embossed pit.

The moment-of-inertia information may be recorded in a lead-in area formed on the recording medium.

The recording medium may further include material information indicating a material of a recording layer of the recording medium. The material information may be recorded according to the same technique as the technique for recording the moment-of-inertia information.

According to still another aspect of the present invention, there is provided a recording apparatus compatible with a recording medium which stores at least one of configuration information indicating a configuration of the recording medium and moment-of-inertia information indicating a moment of inertia of the recording medium. The recording apparatus includes a determining unit for determining physical characteristics of the recording medium by reading at least one of the configuration information and the moment-of-inertia information. A recording control unit performs settings for a recording operation according to the physical characteristics determined by the determining unit, and allows the recording operation to be performed.

The determining unit may read at least one of the configuration information and the moment-of-inertia information from a wobbling groove formed on the recording medium. The wobbling of the wobbling groove may be obtained by performing the frequency modulation or the phase modulation on the groove.

On the recording medium, a recording track may be formed by a groove, and a pit may be pre-formed on a land located between adjacent grooves. In this case, the determining unit may read at least one of the configuration information and the moment-of-inertia information from the pit.

Alternatively, on the recording medium, a recording track may be formed by a groove, and an embossed pit may be pre-formed on a predetermined area. In this case, the determining unit may read at least one of the configuration information and the moment-of-inertia information from the embossed pit.

The recording control unit may set an access range of recording head used for the recording operation on the recording medium according to the physical characteristics determined by the determining unit.

The recording control unit may set servo parameters of a spindle used for driving the rotation of the recording medium according to the physical characteristics determined by the determining unit.

The recording control unit may issue warning or eject the recording medium when determining that the recording medium is not a suitable recording medium based on the physical characteristics determined by the determining unit.

In accordance with a main-data recording operation performed on the recording medium, the recording control unit may generate main-data management information by incorporating at least one of the configuration information and the moment-of-inertia information read from the recording medium, and may record the generated main-data management information on the recording medium.

According to a further aspect of the present invention, there is provided a reading apparatus compatible with a recording medium which stores at least one of configuration information indicating a configuration of the recording medium and moment-of-inertia information indicating a moment of inertia of the recording medium. The reading apparatus includes a determining unit for determining physical characteristics of the recording medium by reading at least one of the configuration information and the moment-of-inertia information. A reading control unit performs settings for a reading operation according to the physical characteristics determined by the determining unit, and allows the reading operation to be performed.

The determining unit may read at least one of the configuration information and the moment-of-inertia information from a wobbling groove formed on the recording medium. The wobbling of the wobbling groove may be obtained by performing the frequency modulation or the phase modulation on the groove.

On the recording medium, a recording track may be formed by a groove, and a pit may be pre-formed on a land located adjacent grooves. In this case, the determining unit may read at least one of the configuration information and the moment-of-inertia information from the pit.

Alternatively, on the recording medium, a recording track may be formed by a groove, and an embossed pit may be pre-formed on a predetermined area. In this case, the determining unit may read at least one of the configuration information and the moment-of-inertia information from the embossed pit.

The reading control unit may set an access range of a reading head used for the reading operation on the recording medium according to the physical characteristics determined by the determining unit.

The reading control unit may set servo parameters of a spindle used for driving the rotation of the recording medium according to the physical characteristics determined by the determining unit.

The reading control unit may issue warning or eject the recording medium when determining that the recording medium is not a suitable recording medium based on the physical characteristics determined by the determining unit.

In a recording medium, the physical characteristic information of the recording medium, such as the disc configuration (shape and size) and the moment of inertia, is recorded. Accordingly, a recording apparatus or a reading apparatus is able to easily and correctly determine the physical characteristic of the disc.

It is thus possible to perform various settings for the recording or reading operation, such as the servo parameters of a spindle motor and the access range of the optical pick-up, thereby enhancing the recording and reading performance according to the type of disc.

The physical characteristics of the recording medium are not determined by a calibration operation. Theoretically, therefore, they can be determined with 100% precision, and the time required for starting the recording or reading operation can be shortened.

Additionally, since the physical characteristic information is recorded as wobbling groove data, the compatibility with known recording media can be maintained. The disc configuration and the moment of inertia of an unrecorded recording medium can also be determined, thereby making it possible to provide suitable setting for the recording operation.

In particular, since highly precise control of the rotation of the spindle is demanded in performing the recording operation. Thus, if the servo parameters are suitably set according to the recording medium, the recording performance can be considerably enhanced.

Additionally, the configuration and the moment of inertia of a recording medium can be determined as the physical characteristics of the recording medium. Accordingly, the recording media which cannot be handled by a recording apparatus or a reading apparatus can be determined. In this case, a warning may be issued to the user or the host apparatus, or the loaded recording medium may be ejected.

In accordance with the main-data recording operation on a recording medium, the recording apparatus generates main-data, management information (for example, sub-code, which forms the TOC) by incorporating the configuration/moment of inertia information read from the recording medium. Accordingly, the configuration information and the moment-of-inertia information are reflected in the management information to be recorded as data. This enables a read only apparatus without a decoding function of decoding groove information to read such information, and thus to provide suitable setting for the reading operation according to the configuration and the moment of inertia of the recording medium.

BRIEF DESCRIPTION OF THE DRAWINGS

FIGS. 1A through 1D illustrate types of discs according to an embodiment of the present invention;

FIG. 2 illustrates a standard density disc and a high density disc according to an embodiment;

FIGS. 3A through 3C illustrate types of discs according to an embodiment of the present invention;

FIGS. 5A and 5B illustrate types of hybrid discs according to an embodiment of the present invention;

FIG. 11 illustrates an ATIP frame used in an embodiment of the present invention;

FIG. 12 illustrates the content of an ATIP frame used in an embodiment of the present invention;

FIG. 13 illustrates details of part of the ATIP frame shown in FIG. 12;

FIG. 14 illustrates material data contained in the wobble information shown in FIG. 13;

FIG. 15 illustrates disc density data contained in the wobble information shown in FIG. 13;

FIG. 16 illustrates physical structure data contained in the wobble information shown in FIG. 13;

FIG. 17 illustrates disc configuration data contained in the wobble information shown in FIG. 13;

FIG. 22 illustrates an example of moment-of-inertia data contained in the wobble information shown in FIG. 13;

FIG. 23 illustrates another example of the moment-of-inertia data contained in the wobble information shown in FIG. 13;

FIGS. 29A and 29B illustrate an example of sub-Q data of a disc according to an embodiment of the present invention;

FIGS. 30A and 30B illustrate another example of the sub-Q data of a disc according to an embodiment of the present invention;

FIG. 31 illustrates the TOC structure of a disc according to an embodiment of the present invention;

FIG. 32 illustrates an example of the content of the sub-Q data used in an embodiment of the present invention;

FIG. 33 illustrates an example of disc size information contained in the sub-Q data used in an embodiment of the present invention;

FIG. 34 illustrates an example of disc configuration information contained in the sub-Q data used in an embodiment of the present invention;

FIG. 35 illustrates an example of moment-of-inertia information contained in the sub-Q data used in an embodiment of the present invention;

FIG. 36 illustrates an example of track pitch information contained in the sub-Q data used in an embodiment of the present invention;

FIG. 37 illustrates an example of linear velocity information contained in the sub-Q data used in an embodiment of the present invention;

FIG. 38 illustrates an example of medium type information contained in the sub-Q data used in an embodiment of the present invention;

FIG. 39 illustrates an example of material type information contained in the sub-Q data used in an embodiment of the present invention;

FIG. 40 illustrates another example of the content of the sub-Q data used in an embodiment of the present invention;

FIG. 41 illustrates another example of disc size/configuration information contained in the sub-Q data used in an embodiment of the present invention;

FIG. 42 illustrates another example of track pitch information contained in the sub-Q data used in an embodiment of the present invention;

FIG. 43 illustrates another example of linear velocity information contained in the sub-Q data used in an embodiment of the present invention;

FIG. 44 illustrates another example of medium version information contained in the sub-Q data used in an embodiment of the present invention;

FIG. 45 illustrates another example of medium type information contained in the sub-Q data used in an embodiment of the present invention;

FIG. 46 illustrates the content of the sub-Q data used in an embodiment of the present invention;

FIGS. 47A and 47B illustrate access made according to the content of the sub-Q data shown in FIG. 46;

FIG. 58 illustrates the field ID of the land pre-pit data;

FIG. 59 illustrates the structure of a pre-pit block of a land pre-pit;

FIGS. 60A and 60B illustrate physical characteristic information recorded in a land pre-pit;

DESCRIPTION OF THE PREFERRED EMBODIMENTS

Figure 4A:
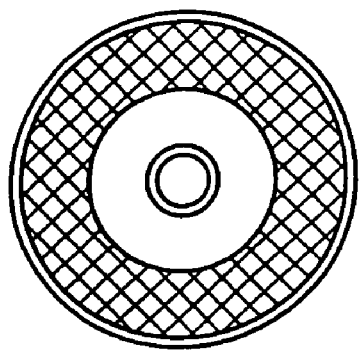
FIGS. 4A through 4C illustrate types of hybrid discs according to an embodiment of the present invention.

The present invention is described below in detail with reference to the accompanying drawings through illustration of preferred embodiments.

Discs provided as recording media of the present invention, a disc drive unit provided as a recording apparatus and a reading apparatus of the present invention are discussed below in the following order.

1. Overview of CD-system signal processing
2. Types of CD-format discs
3. Recordable discs and grooves
   3-1 Rewritable discs
   3-2 Wobble information
   3-3 Recording area format
4. Sub-code and TOC
5. Configuration of disc drive unit
6. Examples of processing of disc drive unit
7. Examples of digital versatile disc (DVD)-format discs
   7-1 DVD-RW, DVD-R
   7-2 DVD-RAM
   7-3 DVD+RW 1. Overview of CD-system Signal Processing A description is now given of an overview of signal processing of CD-system discs, such as a CD-DA, a CD-ROM, a CD-R, and a CD-RW.

An overview of the CD-system signal processing, and more specifically, the recording operation of a stereo audio signal on a disc, is as follows.

Audio signals on left and right channels (L-Ch and R-Ch) are sampled at a sampling frequency of 44.1 kHz and are then linearly quantized with sixteen bits. Sixteen bits of the audio signal data is determined to be one word, and is further divided into eight-bit data units, and each eight-bit data is determined to be one symbol (one symbol=eight bits=½ word).

Six samples for each channel, i.e., 16 bits (2 channels (6 samples=192 bits=24 symbols, are extracted, and four symbols of error correcting code (ECC) are added to 24 symbols as Q-parity, resulting in 28 symbols. In the CD system, Reed-Solomon codes are generated and added as the ECC. To handle continuous burst defects on a disc substrate, the 28-symbol audio signal is interleaved (rearranged).

Thereafter, four symbols of Reed-Solomon codes (P-parity) are further added to the 28-symbol audio signal, resulting in 32 symbols, and one symbol for a control operation (subcode) is further added. The resulting signal is subjected to eight-to-fourteen modulation (EFM). According to the EFM operation, eight bits are expanded to fourteen bits.

According to the EFM operation, a 16-bit quantized signal is divided into upper eight bits and lower eight bits, and an eight-bit signal is set as the smallest unit and is converted into a 14-bit signal. In this case, the smallest number of consecutive bits is three, and the greatest number of consecutive bits is eleven, i.e., two to ten "0"s are inserted between "1"s. After conversion, "1" represents a polarity inversion (non return to zero inverted (NRZ-I) recording).

According to the EFM, an eight-bit signal is converted into a 14-bit signal in which two to ten "0"s are inserted between "1"s, and three coupling bits are provided for satisfying the condition that at least two "0"s are inserted between "1"s over adjacent symbols. Accordingly, in the EFM-modulated signals, i.e., in the recording data streams, there are nine types of bit lengths ranging from the minimum length (time) Tmin=3 T (0.9 ns) to the maximum length (time) Tmax=11 T (3.3 ns).

A frame synchronization signal and a control signal, which forms sub-codes, are added to the EFM modulated data (frame), and the resulting data stream is recorded on a disc. The frame synchronization signal and the sub-code are discussed in detail below.

Conversely, when reading the data stream recorded as described above, it is decoded in the reverse order to the recording processing. That is, the EFM demodulation is performed on a data stream read from the disc, and error correcting, deinterleaving, and channel separation are further performed. Then, L and R audio data signals quantized with 16 bits and sampled at 44.1 kHz are converted into analog signals, which are then output as a stereo music signal.

2. Types of CD-format Discs

The types of discs implemented as CD-format discs in this embodiment are discussed below with reference to FIGS. 1A through 5B.

FIGS. 1A through 1D schematically illustrate the types of discs based on the recording density. More specifically, FIG. 1A illustrates a known disc with a standard recording density. In this example, the whole disc is recorded at a standard recording density. Currently used discs, such as a CD-DA, a CD-ROM, a CD-R, and a CD-RW, correspond to this type of disc.

FIG. 1B illustrates a high density disc which has recently been developed, and in this example, the whole disc can be recorded at a high density. For example, by comparison with the standard disc, 2 (or 3 (high density discs have been developed. In particular, recordable high density discs, such as a CD-R and a CD-RW, have been developed.

FIG. 1C illustrates a hybrid disc whose inner portion is a high density area and whose outer portion is a standard density area. Conversely, FIG. 1D illustrates a hybrid disc whose outer portion is a high density area and whose inner portion is a standard density area.

The characteristics/parameters of the standard density disc and those of the high density disc are shown in FIG. 2.

Concerning the capacity of user data (main data to be recorded), the standard density disc has 650 Mbytes (disc having a diameter of 12 cm) or 195 Mbytes (disc having a diameter of 8 cm), while the high density disc has 1.3 Gbytes (disc having a diameter of 12 cm) or 0.4 Gbytes (disc having a diameter of 8 cm). Thus, the high density disc has a capacity twice as large as the standard density disc.

The program area start position (radius) (area at which the user data is recorded) of the standard density disc is 50 mm from the center of the disc, and that of the high density disc is 48 mm from the center of the disc.

The track pitch of the standard density disc (standard density area) is 1.6 (m, while that of the high density disc (high density area) is 1.1 (m.

The scanning speed of the standard density disc (standard density area) is 1.2 to 1.4 m/s, while the scanning speed of the high density disc (high density area) is 0.9 m/s.

The numerical aperture (NA) for the standard density disc (standard disc area) is 0.45, while the NA for the high density disc (high density area) is 0.55 or 0.50.

As to the error correcting method, the cross-interleaved Reed-Solomon code4 (CIRC4) method is employed for the standard density disc (standard density area), while the CIRC7 method is employed for the high density disc (high density area).

The characteristics and parameters other than the above-described factors, such as the center hole size, disc thickness, laser wavelength, modulation method, and channel bit rate, are the same, as shown in FIG. 2, for the standard density disc (standard density area) and the high density disc (high density area).

When one of the standard density disc, such as the one shown in FIG. 1A, and the high density disc, such as the one shown in FIG. 1B, is loaded in a disc drive unit, it is necessary for the disc drive unit to determine the type of disc.

When a hybrid disc, such as the one shown in FIG. 1C or 1D, is loaded in a disc drive unit, it is necessary for the disc drive unit to determine the area type, i.e., whether the area on or from which data is currently recorded or read, is a high density area or a standard density area.

That is, after determining the disc type or the area type, the setting of the recording/reading operation is changed in accordance with the designated parameters shown in FIG. 2.

FIGS. 3A through 4C schematically illustrate disc types according to data recording/reading systems.

FIG. 3A illustrates a read only disc, such as a CD-DA or a CD-ROM, which is a disc on which all the data is recorded in an embossed bit form.

FIG. 3B illustrates a direct read after write (DRAW) disc, such as a CD-R. In this DRAW disc, a recording layer is formed of an organic pigment, and data is recorded by utilizing a change in the pigment (change in the index of reflection) caused by the irradiation with laser light. Such a DRAW disc is also referred to as a "write-once, read-many disc (WORM)" disc since it can be recorded to only once.

FIG. 3C illustrates a rewritable disc utilizing a phase change technique, such as a CD-RW.

In the DRAW (WORM) disc shown in FIG. 3B and the rewritable disc shown in FIG. 3C, the recording track is formed by a spiral groove. In contrast, in the read only disc shown in FIG. 3A, the recording track is formed by an embossed pit stream rather than a groove.

As is described in detail below, grooves in the DRAW (WORM) disc and rewritable disc wobble (meander), which makes it possible to express information, such as absolute addresses. Accordingly, in recording data, tracking control is performed on the wobbling groove, and based on the data, such as addresses, read from the wobbling groove (hereinafter sometimes referred to as "wobble information"), the recording operation can be controlled.

In contrast, in read only discs, a recording track is formed by a pit stream in advance, and data, such as addresses, is recorded by sub-codes. Thus, the provision of groove data is unnecessary. Accordingly, some read-only disc drive units are not provided with a function of reading groove information.

Figure 4B:
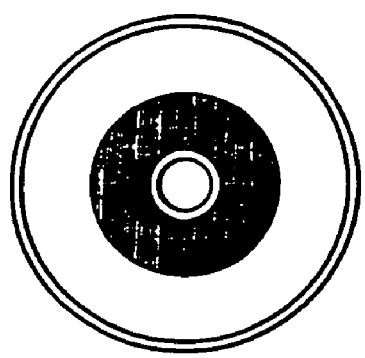
Figure 4C:
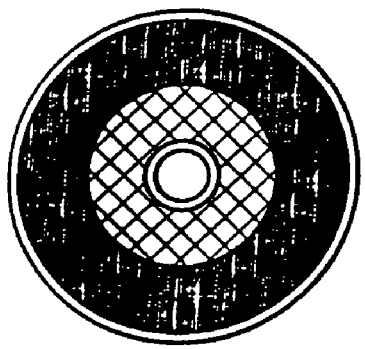

FIGS. 4A, 4B, and 4C illustrate hybrid discs. More specifically, FIG. 4A illustrates a disc whose inner portion is a read only area and whose outer portion is a DRAW (WORM) area. FIG. 4B illustrates a disc whose inner portion is a rewritable area and whose outer portion is a read only area. FIG. 4C illustrates a disc whose inner portion is a DRAW (WORM) area and whose outer portion is a rewritable area.

Accordingly, a hybrid disc, that is, a single disc having a mixture of different areas, such as a read only area, a DRAW (WORM) area, and a rewritable area, is available.

A hybrid disc having three areas may also be considered, though it is not shown. For example, there may be a hybrid disc whose inner portion is a read only area, whose intermediate portion is a DRAW (WORM) area, and whose outer portion is a rewritable area, or a hybrid disc whose inner portion is read only area, whose intermediate area is a rewritable area, and whose outer area is a read only area. A hybrid disc having four or more areas is also possible.

As discussed above, discs can be differentiated according to the recording density or the recording/reading types, that is, according to the physical characteristics. The types of discs can be summarized as shown in FIGS. 5A and 5B.

FIG. 5A illustrates the regular disc type, namely, the whole disc is formed of an area having one physical characteristic ("regular disc" means that disc is not a hybrid disc). Considering that there are two types of recording densities, such as the standard density and high density, and there are three recording/reading types, such as the read only type, DRAW (WORM) type, and rewritable type, six types of discs, type 1 through type 6, can be considered, as shown in FIG. 5A.

FIG. 5B illustrates the types of hybrid discs, each having two areas whose physical characteristics are different. By utilizing type 1 to type 6 shown in FIG. 5A, 30 types of hybrid discs, from type HD1 whose inner portion is type 1 and whose outer portion is type 2 to type HD30 whose inner portion is type 6 and whose outer portion is type 5, can be considered.

Apparently, if hybrid discs, each having three or more areas whose physical characteristics are different, are considered, more types of discs are available.

Along with such a variety of discs in view of the physical characteristics, it is necessary for a disc drive unit to precisely determine the physical characteristics of a loaded disc (or physical characteristics of an area on or from which data is to be recorded or read) and to perform processing according to the determined physical characteristics. Then, the recording/reading performance can be enhanced.

Generally, a "disc" is a disc-shaped medium. As is discussed below, however, a triangular "disc" or a quadrilateral "disc" may be provided. Although such "discs" may sound contradictory in view of the shape of a "disc", media other than disc-shaped media are also referred to as "discs" in this specification.

3. Recordable Discs and Grooves 3-1 Rewritable Discs

Generally, a CD-system disc has a single spiral recording track starting from the center (inner periphery) of the disc to the end (outer periphery) of the disc.

On a disc on which data can be recorded by a user, such as a CD-R or a CD-RW, only a guide groove for guiding laser light is formed on a disc substrate as a recording track before data is recorded on the disc. When laser light modulated with high power is applied to the disc, the index of reflection or the phase of the recording layer is changed, thereby making it possible to record data on the disc. In contrast, a groove as a recording track is not physically formed on a read only disc, such as a CD-DA or a CD-ROM.

On a CD-R, a write-once recording layer, which is formed of an organic pigment, is formed. High-power laser light is applied to the disc, thereby making it possible to record data by punching (making pits on the disc).

Regarding a rewritable disc, such as a CD-RW, whose recording layer can be rewritten many times, a phase change technique is employed for recording data, and more specifically, data is recorded by utilizing a difference in the index of reflection between a crystalline state and an amorphous state.

In terms of physical characteristics, the index of reflection of a CD-ROM and a CD-R is 0.7 or higher, while that of a CD-RW is as low as about 0.2. Accordingly, in a reading apparatus designed to be compatible with the index of reflection of 0.7 or higher, a CD-RW cannot be read in that apparatus. Thus, an auto gain control (AGC) function of amplifying a low signal is added to such a reading apparatus.

In a CD-ROM, the lead-in area at the inner periphery of the disc is disposed in a range from 46 to 50 mm from the center of the disc, and there are no pits farther inwards than the lead-in area.

Figure 6:
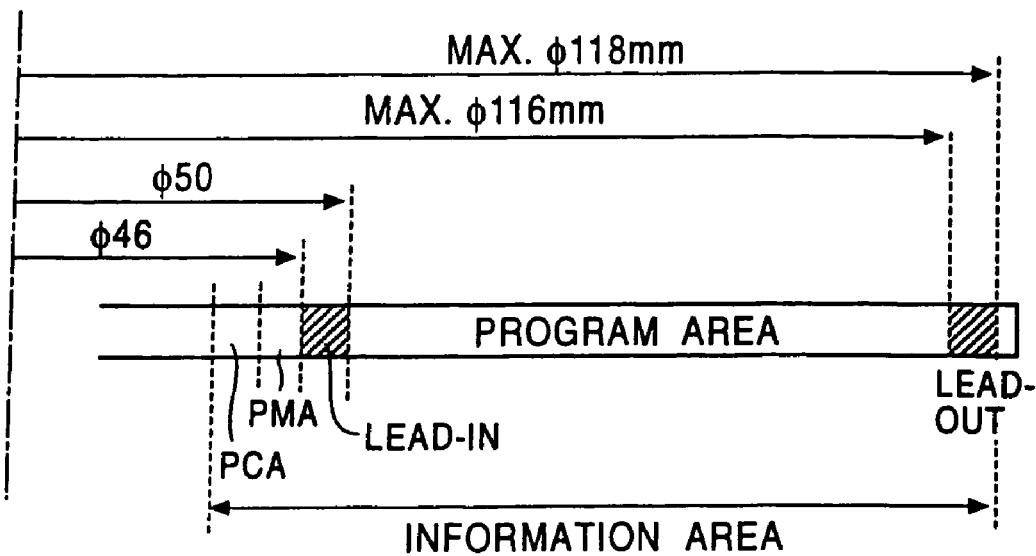
FIG. 6 illustrates the layout of a CD-R or CD-RW disc.

In contrast, in a CD-R and a CD-RW, a program memory area (PMA) and a power calibration area (PCA) are provided, as shown in FIG. 6, farther inwards than the lead-in area.

The lead-in area and the subsequent program area, which is used for recording user data, are used for performing a recording operation by a drive unit compatible with a CD-R or a CD-RW, and are also used for reading data therefrom, as in a CD-DA.

In the PMA, a recording signal mode and time information of each track, such as the start time and the end time, are temporarily stored. When all the tracks become full with the recorded data, the TOC is formed in the lead-in area based on the data stored in the PMA. The PCA is an area in which data is temporarily written in order to obtain the optimal value of laser power when data is recorded.

In a CD-R and a CD-RW, in order to control the recording position and the rotation of a spindle, a groove (guide groove), which is to form a data track, is formed in a wobbling (meandering) shape.

This wobbling groove is formed based on a signal modulated by information, such as absolute addresses. That is, wobble information, such as absolute addresses, can be read from the wobbling groove. The absolute time (address) information represented by the wobbling groove is referred to as "absolute time in pregroove (ATIP)".

Figure 7:
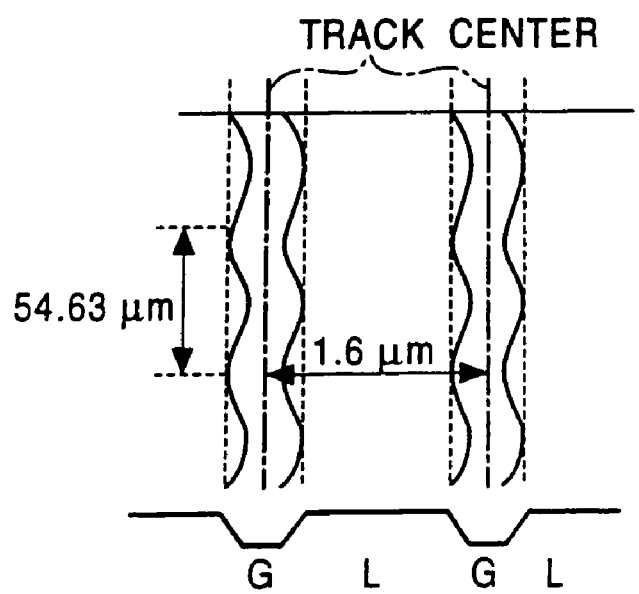
FIG. 7 illustrates a wobbling groove.

The wobbling groove is wobbling slightly in a sinusoidal waveform, as shown in FIG. 7, and the center frequency of the groove is 22.05 kHz and the amount of wobbling is approximately (0.03 (m.

In this embodiment, in the wobbling groove, not only absolute time information, but also other types of information, are encoded by frequency modulation (FM). Details of the wobble information represented by the wobbling groove are given below.

3-2 Wobble Information

According to the wobble information detected at a push-pull channel from a CD-R/CD-RW groove, when the rotation of the spindle motor is controlled so that the center frequency of the wobble information becomes 22.05 kHz, the spindle motor is rotated at a linear velocity defined in the CD system (for example, 1.2 to 1.4 m/s for a standard density disc).

For a CD-DA or a CD-ROM, the absolute time information encoded in sub-code Q can be relied upon. In a CD-R or a CD-RW without data recorded thereon (blank disc), however, sub-code is not yet recorded, and thus, the absolute time information is obtained from the wobble information.

One sector (ATIP sector) of the wobble information is equivalent to one data sector (2352 bytes) of the main channel after data is recorded on a disc. Thus, the recording operation is performed while providing synchronization of the ATIP sector with the data sector.

Figure 8:
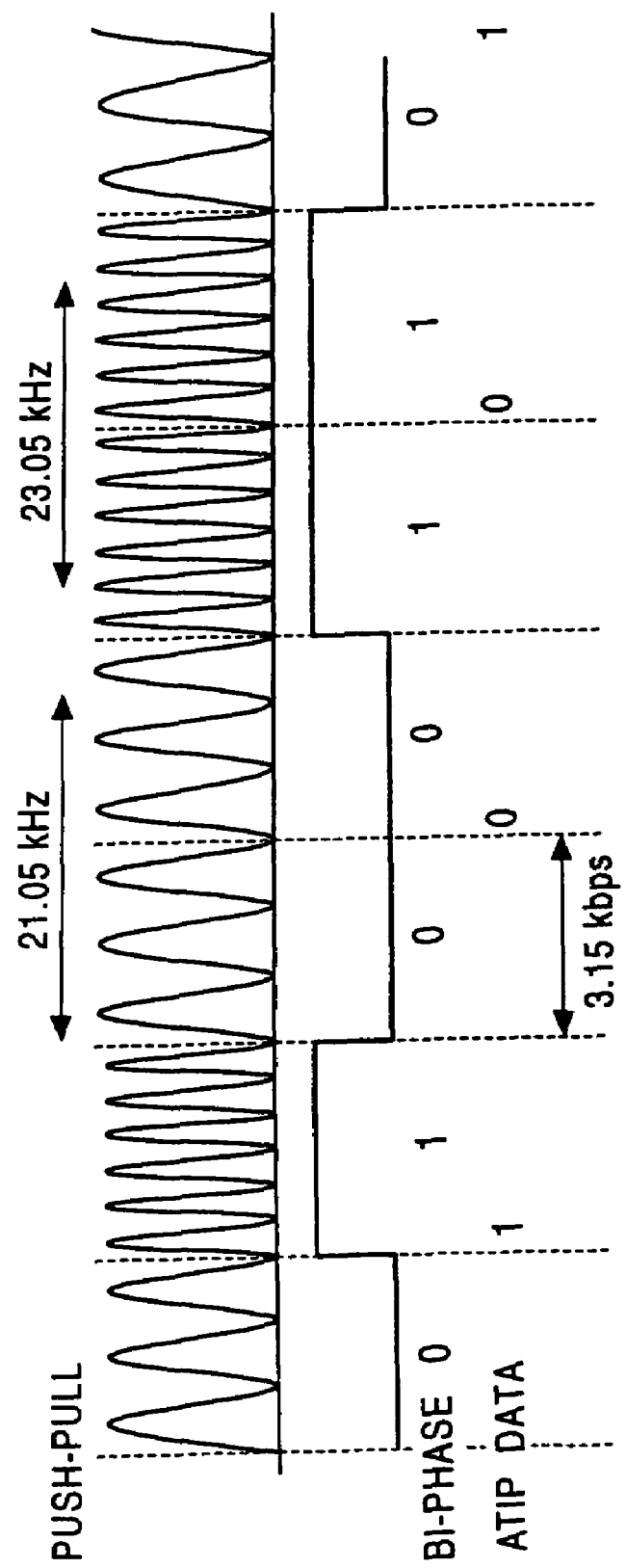
FIG. 8 illustrates ATIP encoding.

The ATIP information is not encoded in the wobble information as it is. Instead, it is first subjected to bi-phase modulation, as shown in FIG. 8, and then to phase modulation. This is because the wobble signal is also used for controlling the rotation of the spindle motor. More specifically, according to the bi-phase modulation, 1 and 0 alternate at predetermined intervals so that the ratio of the numbers of 1's and 0's becomes 1:1 and the average frequency of the FM-modulated wobble signal becomes 22.05 kHz.

As will be discussed in detail below, not only the time information, but also special information, such as information for setting the recording laser power, is encoded in the wobble information. In a CD-RW, by expanding the special information, power and recording pulse information for the CD-RW is encoded.

FIG. 11 illustrates the configuration of one ATIP frame of the wobble information.

The ATIP frame is formed of 42 bits, as indicated by (a) of FIG. 11, and is sequentially provided with a four-bit synchronization pattern, a three-bit discriminator (identifier), 21-bit wobble information, such as the physical frame address, and a 14-bit cyclic redundancy check (CRC) code.

Alternatively, in some ATIP frames, a four-bit discriminator and 20-bit wobble information may be provided, as indicated by (b) of FIG. 11.

Figure 9:
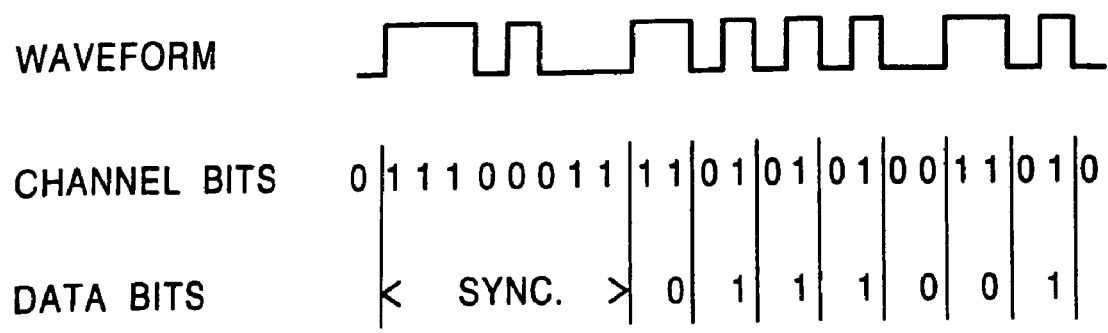
FIGS. 9 and 10 illustrate ATIP waveforms.
Figure 10:
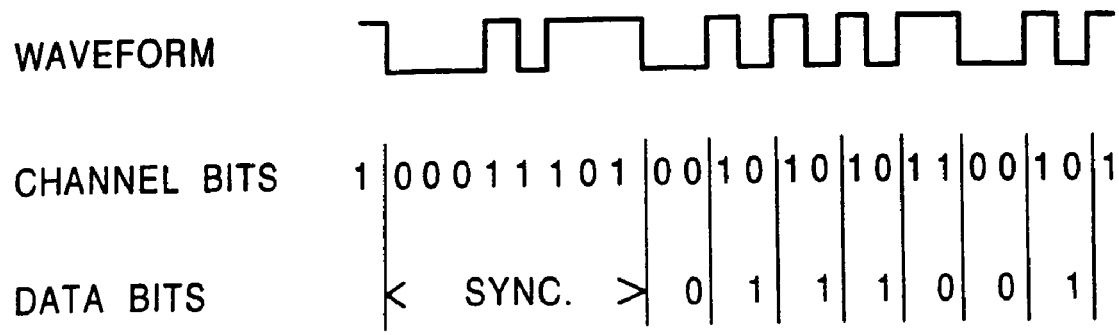

As the synchronization pattern disposed at the head of the ATIP frame, "11100011" is provided when the preceding bit is 0, as show in FIG. 9, and "00011101" is provided when the preceding bit is 1, as shown in FIG. 10.

The three- or four-bit discriminator is an identifier indicating the content of the subsequent 20- or 21-bit wobble information, and is defined as shown in FIG. 12.

The 24 bits from bits M23 to M0 shown in FIG. 12 correspond to the 24 bits at bit positions 5 to 28 shown in FIG. 11.

Bits M23, M22, and M21 (or bits M23, M22, M21, and M20) are used for the discriminator. When the value of the discriminator is "000", the content of the wobble information (M20 to M0) of the corresponding frame indicates the addresses of, the lead-in area, the program area, and the lead-out area. When the value of the discriminator is "100", the content of the wobble information (M20 to M0) of the corresponding frame indicates the address of the lead-in area. The above-mentioned addresses correspond to absolute addresses as the above-described ATIP. The time domain information as the ATIP is recorded radially outward starting from the head of the program area so that it simply increments, and is used for controlling the addresses during the recording operation.

When the value of the discriminator is "101", the wobble information (M20 to M0) of the frame indicates special information 1. When the value of the discriminator is "110", the wobble information (M20 to M0) of the frame indicates special information 2. When the value of the discriminator is "111", the wobble information (M20 to M0) of the frame represents special information 3.

When four bits are used for the discriminator, and its value is "0010", the wobble information (M19 to M0) of the frame indicates special information 4.

When the value of the discriminator is "010", the wobble information (M20 to M0) of the frame indicates additional information 1. When the value of the discriminator is "011", the wobble information (M20 to M0) of the frame indicates additional information 2. When four bits are used for the discriminator, and its value is "0011", the wobble information (M19 to M0) of the frame represents supplemental information. The discriminators "1000" and "1001" are reserved for copyright information in which copyright protection code is filled.

The contents of special information 1 to 4, additional information 1 and 2, and supplemental information are shown in FIG. 13.

Special information 1 includes a four-bit target recording power, a three-bit reference velocity, a seven-bit disc application code, a one-bit disc type, and a three-bit disc sub-type. Three-bit reserve is a reserved area for expanding data in the future.

As the target recording power, the laser power level at the reference velocity is recorded. As the disc application code, the purpose of use, such as general business purpose, specific application (for example, photo-CD or karaoke CD), or commercial audio, is recorded. As the disc type, for example, "0" represents a DRAW (WORM) disc, while "1" indicates a rewritable disc. The disc sub-type represents the rotational velocity and constant angular velocity (CAV)/constant linear velocity (CLV).

Special information 2 includes the start address of the lead-in area. Special information 3 includes the start address of the lead-out area.

Special information 4 contains a manufacturer code, product type, and material code. The name of the disc manufacturer is recorded as the manufacture code. The type of product (type number, product code, etc.) manufactured by the manufacturer is recorded as the product type. In the material code, the material of the recording layer of the disc is recorded.

Details of the information of the three-bit material code are shown in FIG. 14.

Material code "000" indicates that the material is cyanine. Material code "001" represents that the material is phthalocyanine. Material code "010" indicates that the material is an azo compound. The above-mentioned materials are organic pigments for a CD-R.

In contrast, material code "100" designates a material for phase change media.

Normally, the material of the recording layer of a disc can be determined by the manufacturer code and the product type. This is based on a system of the media manufacturing field in which the products and the materials are registered in correspondence with each other.

That is, by storing the registered information in a disc drive unit, the material of the recording layer of a loaded disc can be identified from the manufacturer code and the product type.

However, if new discs are registered, or if discs of non-registered product types or discs manufactured by non-registered manufacturers are loaded after the disc drive unit has been manufactured, the disk drive unit is unable to determine the material of the disc.

Thus, by the provision of the material code as discussed above, the disc drive unit is able to correctly determine the material of a loaded disc regardless of the registration status.

Accordingly, various settings, such as laser power and laser emitting pattern, can be made according to the type of material, thereby achieving a high-precision recording operation.

Even when the material of a loaded disc can be determined from the manufacturer code and the product type, the material code may be used for confirming the determination result.

Additional information 1 includes, as shown in FIG. 13, information concerning the rotation of the spindle motor and laser power control, such as the lowest CLV recording velocity, the highest CLV recording velocity, power multiplication factor (, target ( value, and erasing/recording power ratio.

Additional information 2 also contains information concerning the rotation of the spindle motor and laser power control, such as target recording power at the lowest recording velocity and that at the highest recording velocity, the power multiplication factor ( at the lowest recording velocity and that at the highest recording velocity, and the erasing/recording power ratio at the lowest recording velocity and that at the highest recording velocity.

The supplemental information includes inertia (moment of inertia), disc configuration, physical structure, disc density, and so on.

Details of the one-bit disc density information are shown in FIG. 15.

The value "0" indicates that the disc density is the standard density (single density), while the value "1" designates that the disc density is the high density (double density). By determining the type of disc density, the characteristics and parameters of the disc can be identified by the table shown in FIG. 2.

Details of the two-bit physical structure information are shown in FIG. 16.

The value "0" indicates that a loaded disc is a regular recordable disc, while the value "1" is reserved.

Details of the two-bit disc configuration information are shown in FIG. 17.

The value "00" indicates a regular (circular) disc, which is a 12-cm disc or an 8-cm disc. The value "01" designates a triangular disc. The value "10" indicates a quadrilateral disc. The value "11" represents a disc having a configuration other than the above-described discs.

Examples of the disc configuration are shown in FIGS. 18A through 20C.

Figure 18A:
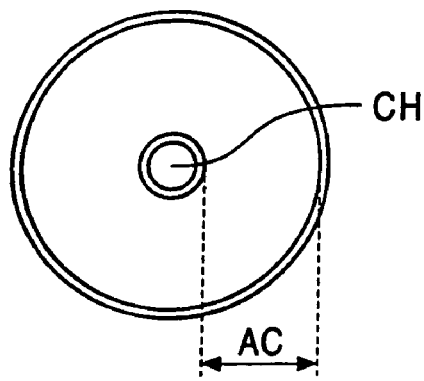
FIGS. 18A and 18B illustrate circular discs represented by the disc configuration data shown in FIG. 17.
Figure 18B:
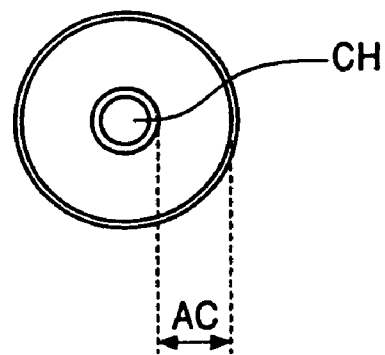

FIG. 18A illustrates a 12-cm regular disc and FIG. 18B illustrates an 8-cm regular disc. The diameter of the center hole CH is 15 mm. In FIGS. 18A through 20C, the access range AC is a range accessible by an optical pick-up of a disc drive unit, in other words, the radial range in which a recording track can be formed.

Although some discs are configured differently from the above-mentioned regular discs, they can be loaded, and the recording/reading operation can be performed on such discs as long as the size and the configuration of the discs can be accommodated within a 12-cm circular disc and the center hole CH has a 15-cm diameter.

Figure 19A:
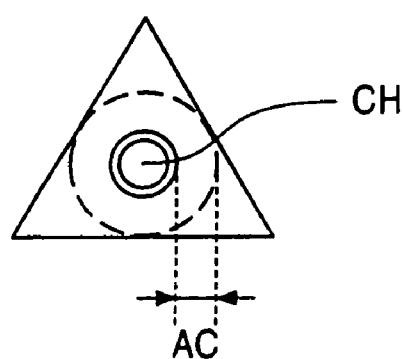
FIGS. 19A and 19B illustrate triangular discs represented by the disc configuration data shown in FIG. 17.
Figure 19B:
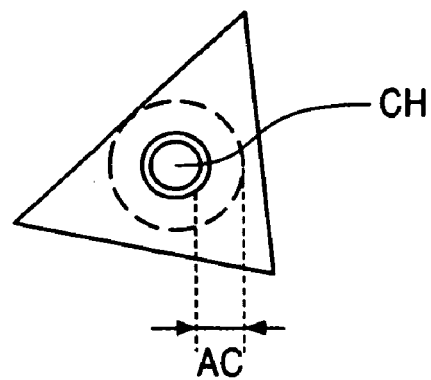

FIGS. 19A and 19B illustrate triangular discs represented by the value "01" of the disc configuration. More specifically, FIG. 19A illustrates a regular triangular disc, and FIG. 19B illustrates another triangular shape other than the regular triangle. The diameter of the center hole CH of such triangular discs is 15 mm.

The access range AC of such triangular discs is smaller than that of regular discs, as shown in FIGS. 19A and 19B. Yet, the triangular discs can be loaded in a disc drive unit and can be used for recording or reading data.

Figure 20A:
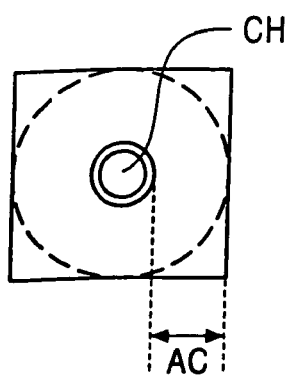
FIGS. 20A, 20B, and 20C illustrate quadrilateral discs represented by the disc configuration shown in FIG. 17.
Figure 20B:
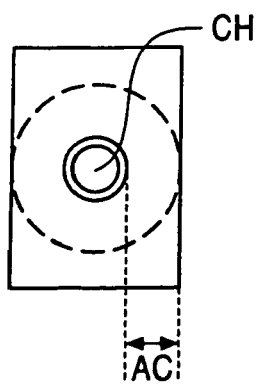
Figure 20C:
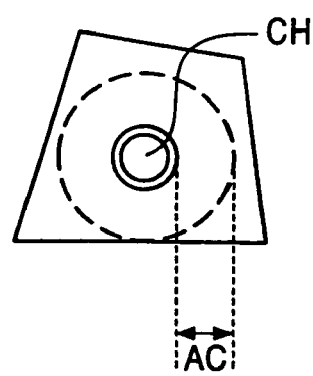

FIGS. 20A, 20B, and 20C illustrate quadrilateral discs represented by the value "10" of the disc configuration. More specifically, FIG. 20A illustrates a square disc, FIG. 20B illustrates a rectangular disc, and FIG. 20C illustrates another type of quadrilateral disc. The diameter of such quadrilateral discs is 15 mm.

As in the triangular discs, the access range AC of such quadrilateral discs is smaller than that of regular discs. However, the quadrilateral discs can still be loaded in a disc drive unit and can be used for recording or reading data.

Discs having configurations other than triangles and quadrilaterals, represented by the value "11" of the disc configuration, are not shown. In this case, however, pentagonal or hexagonal discs, or discs having more than six sides, or circular discs having a diameter other than 8 or 12 cm, elliptical discs, specifically configured discs, such as star-shaped discs or cloud-shaped discs, can be considered.

Such discs can also be used for recording or reading data as long as the size and the configuration of such discs can be accommodated within a 12-cm diameter disc and the center hole CH is 15 mm.

As indicated by the examples of triangular and quadrilateral discs shown in FIGS. 19A through 20C, they are not limited to regular triangles or squares. Thus, if it is desired that the configuration of such discs be accurately identified, the dimensions of such discs may be recorded in, for example, part of the reserved area (M19 to M7) of the supplemental information.

Figure 21A:
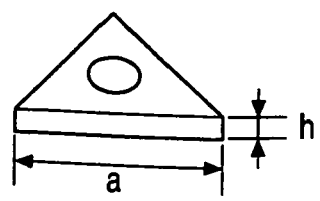
FIGS. 21A and 21B illustrate disc dimensions contained in the wobble information shown in FIG. 13.
Figure 21B:
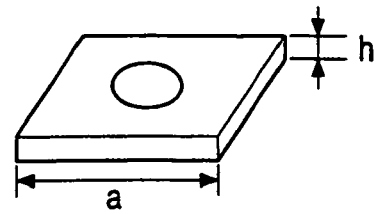

Alternatively, as bits representing "a" and "h" shown in FIGS. 21A and 21B, four bits may be used for each of "a" and "h" as follows.

When the four-bit value indicating "a" is represented by Av and the four-bit value indicating "h" is represented by Hv, $a=Av$ [mm] (0 to 15 mm are indicated in increments of 1 mm)

$h=Hv/10$ (0 to 1.5 mm are indicated in increments of 0.1 mm).

Details of the two-bit inertia (moment of inertia) of the supplemental information are shown in FIG. 22.

When the value of inertia is "00", the moment of inertia is less than 0.01 g?m2. When the value of inertia is "01", the moment of inertia is 0.01 g?m2 or greater but less than 0.02 g?m2. When the value of inertia is "10", the moment of inertia is 0.02 g?m2 or greater but less than 0.03 g?m2. When the value of inertia is "11", the moment of inertia is 0.03 g?m2 or greater.

When the moment of inertia is represented by J, it is expressed by the following equation:

$J=((mi ( ri2)$ wherein ri represents the distance from the origin (i.e., the center of the rotation of the disc), and mi designates a minute mass at the position ri.

According to the above-described equation, the moment of inertia J is the sum of the product of the minute mass mi and the squared distance ri, and never becomes zero. Accordingly, with a larger disc, the moment of inertia J is increased.

The physical meaning of the moment of inertia J is an amount expressed in an equation of the rotation. That is, the following equation holds true:

$J ((=T$ wherein ( represents a second-order differential of the rotational angle ( (=angular velocity), and T designates the moment of force (torque).

This equation reveals that the moment of inertia J is equivalent to the mass m in an equation of the particle rotation. That is, the moment of inertia J is an important physical mass in terms of the rotation of a rigid material.

Generally, the imbalance Im of a disc is expressed by the following equation.

$Im=((mi ( ri)$

That is, the imbalance Im is the sum of the product of the minute mass mi and the squared distance ri. If a disc is perfectly symmetrical and free from non-uniformities in the thickness, the imbalance Im is zero. However, although the imbalance Im is zero, the moment of inertia J is not zero, and there is no correlation between the moment of inertia J and the imbalance Im.

As is seen from the foregoing description, the moment of inertia of a disc is used for controlling a spindle motor which rotates a disc.

As discussed above, discs are not restricted to 8- or 12-cm circular discs, and there are various configurations and sizes of discs. The moment of inertia of a disc is different according to the size and configuration of the disc. Accordingly, by providing the moment of inertia, as discussed above, the rotation driving system of the spindle motor can be controlled correspondingly (i.e., according to the size and configuration of the disc). More specifically, the optimal spindle servo gain can be set according to the size and configuration of the disc.

Although in this embodiment the moment of inertia is represented by two bits, it may be expanded to three bits by using bit M7 for the reserved area of the supplemental information. In this case, the moment of inertia may be represented as shown in FIG. 23.

The value "000" indicates that the moment of inertia is less than 0.004 g?m2. The value "001" indicates that the moment of inertia is 0.004 g?m2 or greater but less than 0.01 g?m2. The value "010" indicates that the moment of inertia is 0.01 g?m2 or greater but less than 0.022 g?m2. The value "011" indicates that the moment of inertia is 0.022 g?m2 or greater but less than 0.032 g?m2. The value "100" indicates that the moment of inertia is 0.032 g?m2 or greater but less than 0.037 g?m2. The value "101" indicates that the moment of inertia is 0.037 g?m2 or greater. The values "110" and "111" are reserved. If a greater value of the moment of inertia is expected, the above-described definition is effective.

As a example, considering the standard thickness, configuration, and mass (material), a 60-mm disc has a moment of inertia equivalent to "000", an 80-mm disc has a moment of inertia equivalent to "001", a 100-mm disc has a moment of inertia equivalent to "010", and a 120-mm disc has a moment of inertia equivalent to "011". The moment of inertia of some 120-mm discs may be "100" according to the type of material. A disc having a thickness larger than the standards, or a disc having a non-uniform mass distribution in the radial direction, for example, a disc in which the mass on the outer periphery is larger than that of the inner periphery, may have a moment of inertia equivalent to "101".

In the examples shown in FIGS. 22 and 23, the moment of inertia is represented by the predetermined ranges. However, the moment of inertia may be found by an equation, in which case, the corresponding information is recorded.

For example, inertia information is recorded by using four bits, such as M5 to M8. When the four-bit value is represented by Jv [hex], Jcal [g?m2] (moment of inertia) may be expressed by the following equation.

$$Jcal = Jval \cdot (1/500)$$

Details of the wobble information contained in the ATIP frame have thus been discussed.

In the foregoing example, the value "00" of the disc configuration indicates both 8- and 12-cm regular (circular) discs, and they are not differentiated. This is because they can be differentiated by referring to the value of the moment of inertia.

More specifically, the moment of inertia of an 8-cm regular disc is less than 0.01 g?m2, while that of a 12-cm regular disc is 0.03 g?m2 or greater. Accordingly, if the value of the disc configuration is "00" and the value of inertia is "00", the disc is an 8-cm regular disc. Conversely, if the value of the disc configuration is "00" and the value of inertia is "11", the disc is a 12-cm regular disc.

Alternatively, by using part of the reserved area of the supplemental information, information for differentiating an 8-cm disc and a 12-cm disc may be recorded.

3-3 Recording Area Format

Figure 24:
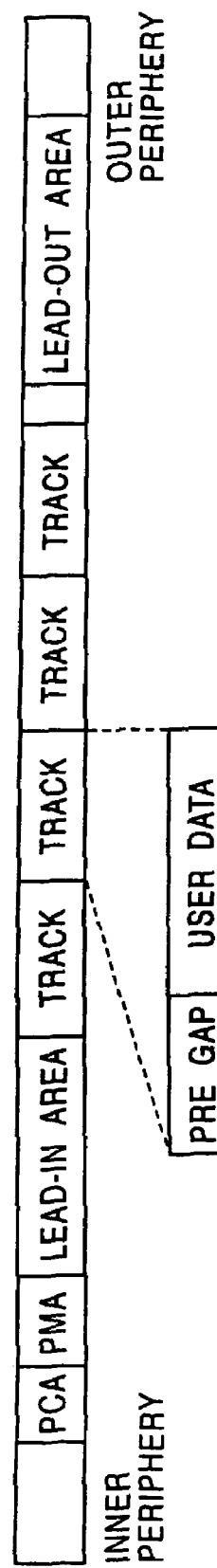
FIG. 24 illustrates a recording area format.

A description is now given of the format when a disc drive unit records data in a recording area of a recordable optical disc. FIG. 24 illustrates the format of a recording area of a recordable optical disc, and FIG. 25 illustrates the format of a track shown in FIG. 24.

The disc drive unit sequentially formats the recording area, as shown in FIG. 24, such as the PCA, the PMA, the lead-in area, one or a plurality of tracks, and the lead-out area from the inner periphery to the outer periphery of the disc.

Figure 25:
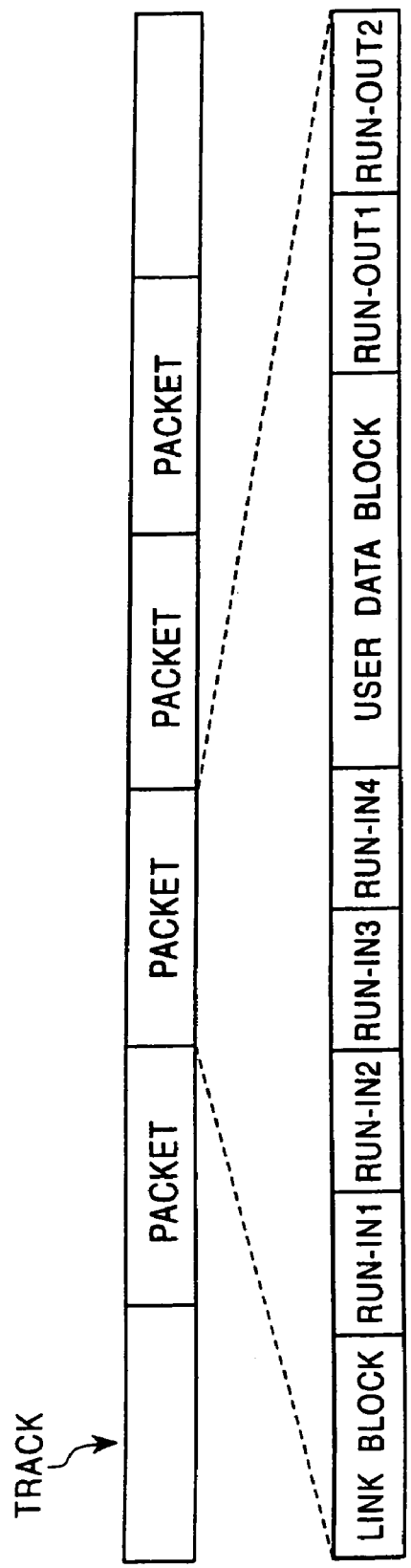
FIG. 25 illustrates a track format.

Then, the disc drive unit partitions, as shown in FIG. 25, each track into a plurality of packets according to the packet write method, and records user data thereon.

The PCA shown in FIG. 24 is an area in which test-recording is performed for adjusting the output power of laser light. Each track is an area in which user data is recorded. The lead-in area and the lead-out area store the TOC, such as the start address and the end address of each track, and various items of information concerning the corresponding optical disc, respectively. The PMA is an area in which the TOC of each track is temporarily stored. Each track is formed of a pre-gap for recording track information and a user data area for recording user data.

Each packet shown in FIG. 25 includes at least one readable user data block, five linking blocks, which are formed of one link block and four run-in blocks, disposed before the user data block, and two linking blocks formed of two run-out blocks disposed after the user data block. The link block is used for coupling packets.

According to the fixed-length packet write method, a plurality of tracks are formed in a recording area of a rewritable disc, and each track is divided into a plurality of packets. Then, the number of user data blocks (block length) is made the same among the packets within one track, and data is recorded at one time in each packet.

Thus, according to the fixed-length packet write method, the recording area is formatted in such a manner that the packet length of the individual packets within one track is the same, and the number of user data blocks is the same among the packets.

Figure 26:
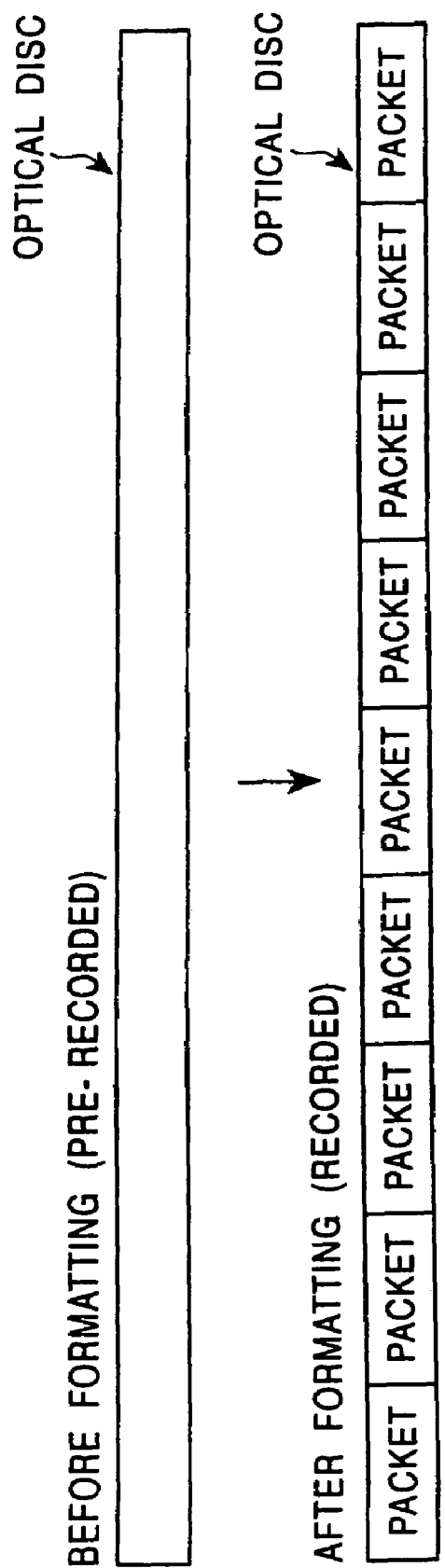
FIG. 26 illustrates a disc format including fixed-length packets.

FIG. 26 illustrates the format of a recording area of an optical disc formatted by a disc drive unit. By wholly or partially formatting the pre-format recording area with fixed-length packets, the formatted recording area is filled with the fixed-length packets.

4. Sub-code and TOC

The TOC and sub-code recorded on the lead-in area of a CD-format disc are as follows.

The minimum unit of data recordable on a CD-format disc is a frame. Ninety-eight frames form one block. The structure of one frame is shown in FIG. 27.

One frame is formed of 588 bits in which the first 24 bits are synchronization data, the subsequent 14 bits are sub-code data, and the remaining bits are data and parity.

Figures 27, 28A:
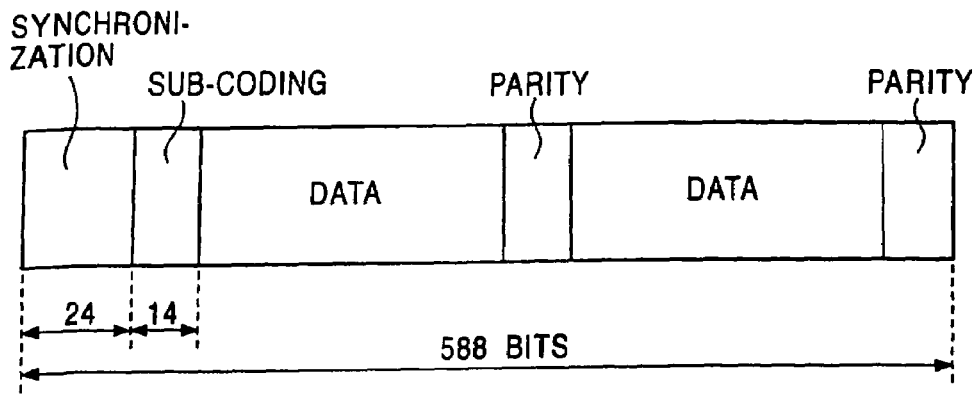
FIG. 27 illustrates the frame structure of a disc according to an embodiment of the present invention.
FIGS. 28A and 28B illustrate a sub-coding frame of a disc according to an embodiment of the present invention.

The 98 frames configured as described above form one block, and sub-code data extracted from the 98 frames are collected so as to form sub-code data (sub-coding frame) of one block, as shown in FIG. 28A.

The sub-code data extracted from the first and second frames (frame $98n+1$ and $98n+2$) of the 98 frames are used as synchronization patterns. The third through 98th frames (frames $98n+3$ through $98n+98$) form a plurality of items of channel data, i.e., sub-code data P, Q, R, S, T, U, V, and W, each having 96 bits, are formed.

Figure 28B:
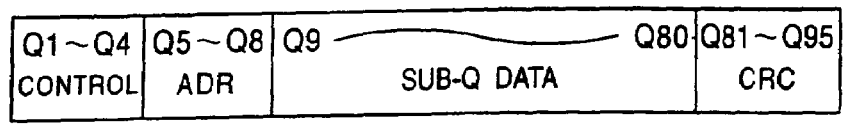

Among these sub-code data, the P channel and Q channel are used for controlling access. However, since the P channel merely indicates a pause between tracks, more precise control is performed by the Q channel (Q1 through Q96). The 96-bit Q channel data is configured as shown in FIG. 28B.

The four bits, i.e., Q1 through Q4, are used as control data for identifying whether the number of audio channels is two or four, whether emphasis processing has been executed on the data (music) recorded on the disc, whether the disc is a CD-ROM, and whether digital copying is allowed.

Then, the subsequent four bits, i.e., Q5 through Q8, are used as (ADR), which indicates the mode of sub-Q data. More specifically, the following modes (content of sub-Q data) can be represented by the four-bit ADR.

0000: mode 0 . . . basically, all the sub-Q data is zero (except for CD-RW)
    0001: mode 1 . . . normal mode
    0010: mode 2 . . . catalog number of disc
    0011: mode 3 . . . International Standard Recording Code (ISRC)
    0100: mode 4 . . . used for CD-V
    0101: mode 5 . . . used for multi-session type, such as CD-R, CD-RW, and CD-EXTRA After the ADR, the 72 bits Q9 through Q80 are used as sub-Q data, and the remaining Q81 through Q96 are used as a CRC.

Addresses (absolute addresses and relative addresses) can be expressed by the sub-Q data when the ADR represents mode 1.

Concerning the address formats represented by the sub-Q data, the format employed for known standard density discs, such as CD-DA, is discussed below with reference to FIGS. 29A and 29B, while the format employed for high density discs, such as CD-R and CD-RW, is discussed below with reference to FIGS. 30A and 30B. In the high density mode, it is necessary to expand the maximum value of the absolute address along with a larger capacity of discs. Accordingly, the address value of the high density discs is represented by hour/minute/second/frame, while that of the standard density discs is represented by minute/second/frame.

The sub-Q data when the ADR is mode 1 is described below with reference to FIGS. 29A through 30B, and the TOC structure of the sub-Q data is discussed below with reference to FIG. 31.

The sub-Q data stored in the lead-in area of a disc serves as the TOC information. That is, the 72-bit sub-Q data from Q9 to Q80 of the Q channel data read from the lead-in area contains information shown in FIG. 29A or 30A. The sub-Q data shown in FIG. 29A or 30A provides details of the 72-bit sub-Q data (Q9 through Q80) of the Q channel data shown in FIG. 28B. The sub-Q data is divided into eight-bit portions and represents the TOC information.

In the sub-Q data for the standard density disc shown in FIG. 29A, the eight bits Q9 through Q16 designate the track number (TNO). In the lead-in area, the track number is set to "00".

The subsequent eight bits Q17 through Q24 indicate point (POINT). Q25 through Q32, Q33 through Q40, and Q41 through Q48, each having eight bits, represent the minute (MIN), the second (SEC), and the frame (FRAME), respectively as the absolute address. "00000000" is set in Q49 through Q56. Further, PMIN, PSEC, PFRAME are recorded in Q57 through Q64, Q65 through Q72, and Q73 through Q80, respectively. The meanings of PMIN, PSEC, and PFRAME are determined by the value of POINT.

On the other hand, in the sub-Q code for the high density disc shown in FIG. 30A, by using each four bits of the eight bits of Q49 through Q56, the "time", which is a higher concept than the minute/second/frame, is indicated.

More specifically, in the lead-in area, by using the four bits Q49, Q50, Q51, and Q52, the time "HOUR", which is a higher concept than the "MIN", "SEC", and "FRAME", is recorded. By using the remaining four bits Q53, Q54, Q55, and Q56, the time "PHOUR", which is higher concept than the "PMIN", "PSEC", and "PFRAME", is recorded.

In the sub-Q data of the lead-in area shown in FIG. 29A or 30A, the following information is defined by the value of the point (POINT).

In the sub-Q code shown in FIG. 29A, when the value of POINT is represented by "01" through "9F" in BCD (or is represented by "01" through "FF" in binary code), it means the track number. In this case, in the PMIN, PSEC, and PFRAME, the minute (PMIN), the second (PSEC), and the frame (PFRAME) of the start point (absolute time address) of the track number are recorded.

When the POINT value is "A0", the track number of the first track in the program area is recorded in PMIN. The specification (type) of disc, such as CD-DA, CD-Interactive (CD-I), CD-ROM (XA specifications), can be identified by the value of PSEC.

When the POINT value is "A1", the track number of the final track in the program area is recorded in PMIN.

When the POINT value is "A2", the start point of the lead-out area is recorded in PMIN, PSEC, and PFRAME as the absolute time address (minute (PMIN), second (PSEC), frame (PFRAME)).

On the other hand, in the sub-Q code shown in FIG. 30A, when the POINT value is designated by "01" through "9F", it means the track number. In this case, in PHOUR, PMIN, PSEC, and PFRAME, the start point (absolute time address) of the track number is recorded as the hour (PHOUR), the minute (PMIN), the second (PSEC), and the frame (PFRAME).

When the POINT value is "A0", the track number of the first track in the program area is recorded in PMIN, and the session format can be identified by the PSEC value. For the normal high density discs, PSEC is set to "00".

When the POINT value is "A1", the track number of the final track in the program area is recorded in PMIN.

When the POINT value is "A2", in PHOUR, PMIN, PSEC, and PFRAME, the start point of the lead-out area is recorded as the absolute time address (hour (PHOUR), minute (PMIN), second (PSEC), and frame (PFRAME)).

As the POINT values, values which have already been defined or to be defined in the future, such as "A3" and the subsequent values, for example, "B*", and "C*", are considered. An explanation of such values, however, is omitted.

In this embodiment, various types of physical information are recorded when the POINT value is "F0", and an explanation thereof is given in detail below.

Thus, the TOC is formed by the sub-Q data shown in FIG. 29A or 30A. For example, the TOC formed by the sub-Q data of a disc on which six tracks are recorded on the program area can be indicated by the one shown in FIG. 31.

All the track numbers TNO of the TOC are inevitably represented by "00". As stated above, the block number indicates the number of the sub-Q data which is read as the block data (sub-coding frame) formed of 98 frames.

In the TOC data, as shown in FIG. 31, the same data is recorded over three consecutive blocks. The values of POINT "01" through "06" are indicated for six tracks (pieces of music), tracks #1 through #6, respectively, and the start points of the first track #1 through sixth track #6 are indicated in PHOUR, PMIN, PSEC, and PFRAME. The TOC shown in FIG. 31 is based on the sub-Q data shown in FIG. 30A, and if a TOC is created based on the sub-Q data shown in FIG. 29A, PHOUR is not provided.

When the value of POINT is "A0", "01" is indicated in PMIN as the first track number. The type of disc can be identified by the PSEC value, and since the PSEC value is "20", the disc is a high density CD.

When the POINT value is "A1", the track number of the final track ("06") is recorded in PMIN. When the POINT value is "A2", the start point of the lead-out area is recorded in PHOUR, PMIN, PSEC, and PFRAME.

After the block n+26 (blocks n+27 and so on), the same data indicated for the blocks n through n+26 is repeated.

In the example shown in FIG. 31, only six tracks are recorded, and the number of blocks is limited so that the POINT value designates only "A0", "A1", and "A2". In practice, however, there may be more blocks so that the value of POINT designates "A3" and the subsequent values, for example, "F0" or "CF", which is discussed in detail below. The number of tracks may also be different among discs. Accordingly, one unit of TOC data is not restricted to 27 blocks shown in FIG. 31.

In the program area in which pieces of music, for example, tracks #1 through #n, are stored, and in the lead-out area, the sub-Q data is indicated by the information shown in FIG. 29B or FIG. 30B.

FIG. 29B or 30B provides details of the 72-bit sub-Q data (Q9 through Q80) of the Q channel data (Q1 through Q96) shown in FIG. 28B.

In the sub-Q data shown in FIG. 29B, eight bits Q9 through Q16 are used for recording the track number (TNO). That is, in the tracks #1 through #n, one of the values "01" to "99" in BCD is recorded. In the lead-out area, "AA" is recorded in the track number.

The subsequent eight bits Q17 through Q24 are used for recording the index (X). The index can be used for dividing each track.

Q25 through Q32, Q33 through Q40, and Q41 through Q48, each having eight bits, represent MIN (minute), SEC (second), and FRAME (frame) as the time elapsed (relative address) within the track. "00000000" is set in Q49 through Q56.

In Q57 through Q64, Q65 through Q72, and Q73 through Q80, each having eight bits, AMIN, ASEC, and AFRAME, are respectively recorded as the minute, second, and frame of the absolute address. The absolute addresses are addresses successively provided from the head of the first track (i.e., the head of the program area) to the lead-out area.

Conversely, for the sub-Q data shown in FIG. 30B, the track number (TNO) is recorded in the eight bits Q9 through Q16. In the tracks #1 through #n, one of the values "01" through "9F" in binary code is indicated. In terms of decimal notation, "0" through "159" can be recorded, and thus, track numbers up to 159 can be provided. In the lead-out area, "AA" is recorded.

In the subsequent eight bits Q17 through Q24, the index (X) is recorded. By using the index, each track can be divided into smaller portions. As the index number, one of the values "01" through "9F" in binary code is used.

In Q25 through Q32, Q33 through Q40, and Q41 through Q48, each having eight bits, MIN, SEC, and FRAME are indicated as the time elapsed (relative address) within the track.

By using the subsequent four bits Q49 through Q52, the time "HOUR", which is a higher concept than "MIN", "SEC", and "FRAME", is recorded. Accordingly, the relative address is represented by hour/minute/second/frame. For data discs, hFF, FF, FF, F are used for "MIN", "SEC", "FRAME", and "HOUR", so that the relative time is not employed.

In Q57 through Q64, Q65 through Q72, and Q73 through Q80, each having eight bits, AMIN, ASEC, and AFRAME, respectively, are recorded as the minute, second, and frame of the absolute address.

By using the four bits Q53 through Q56, the time "AHOUR", which is a higher concept than "AMIN", "ASEC", and "AFRAME", is recorded. Accordingly, the absolute address, as well as the relative address, is represented by hour/minute/second/frame.

The absolute addresses are addresses successively provided from the head of the first track (i.e., the head of the program area) to the lead-out area.

The sub-Q code of the CD format is represented as discussed above. In the sub-Q code, AMIN, ASEC, and AFRAME (and AHOUR) areas are provided for representing the absolute address, and MIN, SEC, and FRAME (and HOUR) areas are provided for designating the relative address. Additionally, as the address pointer indicating the heads of the track and the lead-out area, PMIN, PSEC, and PFRAME (and PHOUR) are disposed. These values indicate the address by the minute, second, and frame (and hour), each having eight bits (and hour having four bits) in BCD.

The BCD is a notation representing "0" through "9" in units of four bits. Thus, according to eight-bit BCD, the values from "00" to "99" can be represented, namely, the upper four bits represent the tens location, and the lower four bits designate the ones location. According to four-bit BCD, the values from "0" to "9" can be represented.

In the example shown in FIGS. 30A and 30B, the track number (TNO), the point (POINT), and the index (X) are represented by the eight-bit binary code ranging from "00" to "9F".

More specifically, the track number (TNO), for example, can be represented by a range from "0" to "9F(=159)" by taking the values "00000000" through "10011111", respectively. Accordingly, the number of tracks which can be managed on the format is expanded to 159.

As in the example shown in FIG. 29A, in FIG. 30A, it is determined that the track number "00" represents the lead-in area and "AA" (=10101010) designates the lead-out area.

The point (POINT) and the index (X) can also be represented by a range from "0" to "9F" by taking the values "00000000" through "10011111", respectively. It is thus possible to correspond the point (POINT) to the track number (TNO). By using the index (X), one track can be divided into 159 portions.

The reason for representing the track number and the index number by "00" through "9F" in binary code is as follows.

As described above, in the known CD format, i.e., in the sub-code information shown in FIG. 29A, a specific definition, such as "A0", "A2", "A3", "B*" or "C*", is used for the point (POINT) unless POINT indicates the track number. In both the examples shown in FIGS. 29A and 30A, "F0" can be used as the value of POINT, which is discussed in detail below.

Accordingly, if "A0" after "9F" is included to represent the track number, "A0", which is originally meant for a special code, must be used when the point (POINT) represents the track number.

If the point (POINT) uses "A0", "A2", "A3", "B*", "C*", and so on, as the track number in binary code, the definition of "A1" must be differentiated between the standard density mode and the high density mode, which impairs the compatibility. For example, in a recording/reading apparatus, the burden of software and hardware is increased in order to cope with the different definitions between the standard density mode and the high density mode.

Thus, it is determined that the track number is expanded only up to "9F" (=159), and "A0" and the subsequent code are not used for the track number. Even in the high density mode, "A0" and the subsequent code are used for defining factors other than the track number.

Accordingly, as the value of the point (POINT), "00" through "9F" are used for the track number, and "A0" and the subsequent code are used for the special definitions.

According to the allocation of code to the point (POINT), i.e., "00" to "9F" except for the special definitions, "00" through "9F" in binary code are also allocated to the index (X), which has the same bit allocation on the sub-code format.

Another reason for restricting the track number to "9F" is to enable the use of the track number "AA" in the standard density mode, i.e., the definition of the track number representing the lead-out area, also in the high density mode.

As discussed above, in the sub-Q data in the lead-in area (i.e., the TOC data), the value of the point (POINT) determines the content of the information of the sub-coding frame. The definitions of the sub-coding frames when the point (POINT) indicates "01" through "9F", "A0", "A1", and "A2" have been discussed.

In this embodiment, information to be recorded in the sub-coding frame when the value of the point (POINT) indicates "F0" is described below.

FIG. 32 illustrates the content of the sub-coding frame, i.e., MIN, SEC, FRAME, HOUR, PHOUR, PMIN, PSEC, and PFRAME, according to the value of the point (POINT) when the ADR is 1, i.e., when the sub-Q data is in the normal mode.

As discussed above, various types of information indicated by (a) of FIG. 32 are recorded when the value of the point (POINT) is one of "01" through "9F", "A0", "A1", and "A2".

When the value of the point (POINT) is "F0", physical information of a medium is recorded in PMIN, PSEC, PFRAME.

The sub-coding frame shown in FIG. 32 is based on the sub-Q data structured as shown in FIG. 30A. If it is based on the sub-Q data structured as shown in FIG. 29A, physical information of a medium can also be recorded in PMIN, PSEC, and PFRAME when the value of the point (POINT) is "F0".

The content of the physical information is indicated by (b) of FIG. 32. In PMIN, PSEC, and PFRAME, i.e., in Q57 through Q80, information, such as the material, the medium type, the linear velocity, and the track pitch, each having four bits, the moment of inertia, the configuration, and the disc size, each having two bits, are recorded, as indicated by (b) of FIG. 32.

The information of the four-bit disc size is shown in FIG. 33. The value "0000" indicates that the disc size is 120 mm. The value "0001" indicates that the disc size is 80 mm. The other values are reserved.

The information of the two-bit disc configuration is shown in FIG. 34. The value "00" indicates that the disc is circular. The normal circular disc is a 12- or 8-cm disc. The value "01" indicates that the disc is a triangle. The value "10" indicates that the disc is a quadrilateral. The value "11" indicates that the disc has a configuration other than the above-described configurations. The other values are reserved The two-bit moment-of-inertia information is shown in FIG. 35. The value "00" indicates that the moment of inertia is less than 0.01 g?m2. The value "01" indicates that the moment of inertia is 0.01 g?m2 or greater but less than 0.02 g?m2. The value "10" indicates that the moment of inertia is 0.02 g?m2 or greater but less than 0.03 g?m2. The value "11" indicates that the moment of inertia is 0.03 g?m2 or greater.

By referring to the disc configuration and the moment-of-inertia information, a disc drive unit is able to determine them. Additionally, various configurations of discs, details of the information, such as the disc size, the configuration, and the moment of inertia, and modifications of such information, can be considered. However, these factors have been discussed above while referring to the wobble information. An explanation thereof is thus omitted.

The four-bit track pitch information is shown in FIG. 36. When the value is "0000", the track pitch is 1.05 (m. When the value is "0001", the track pitch is 1.10 (m. When the value is "0010", the track pitch is 1.15 (m. When the value is "0011", the track pitch is 1.20 (m. When the value is "1000", the track pitch is 1.50 (m. When the value is "1001", the track pitch is 1.55 (m. When the value is "1010", the track pitch is 1.60 (m. When the value is "1011", the track pitch is 1.65 (m. When the value is "1100", the track pitch is 1.70 (m. The other values are reserved.

The track pitch indirectly designates the disc density (standard density/high density). That is, "0000" through "0011" indicates that the disc is a high density disc, while "1000" through "1100" indicates that the disc is a standard density.

The four-bit linear velocity information is shown in FIG. 37. When the value is "0000", the linear velocity is 0.84 m/s. When the value is "0001", the linear velocity is 0.86 m/s. When the value is "0010", the linear velocity is 0.88 m/s. When the value is "0011", the linear velocity is 0.90 m/s. When the value is "0100", the linear velocity is 0.92 m/s. When the value is "0101", the linear velocity is 0.94 m/s. When the value is "0110", the linear velocity is 0.96 m/s. When the value is "0111", the linear velocity is 0.98 m/s. When the value is "1000", the linear velocity is 1.15 m/s. When the value is "1001", the linear velocity is 1.20 m/s. When the value is "1010", the linear velocity is 1.25 m/s. When the value is "1011", the linear velocity is 1.30 m/s. When the value is "1100", the linear velocity is 1.35 m/s. When the value is "1101", the linear velocity is 1.40 m/s. When the value is "1110", the linear velocity is 1.45 m/s. The value is "1111" is reserved.

The linear velocity also directly designates the disc density (standard density/high density). That is, "0000" through "0111" indicates a high density disc, while "1000" through "1110" indicates a standard density disc.

The four-bit medium type information is shown in FIG. 38. The value "0000" indicates that the medium is a read only medium. The value "0001" indicates that the medium is a DRAW (WORM) medium. The value "0010" indicates that the medium is a rewritable medium. The value "0011" is reserved. The value "0100" indicates that the medium is a hybrid medium having a read only area and a DRAW (WORM) area. The value "0101" indicates that the medium is a hybrid medium having a read only area and a rewritable area. The value "0110" indicates that the medium is a hybrid medium having a DRAW (WORM) area and a read only area. The value "0111" indicates that the medium is a hybrid medium having a rewritable area and a DRAW (WORM) area. The value "1000" indicates that the medium is a hybrid medium having a standard-density read only area and a high density read only area. The other values are reserved.

The four-bit material information is shown in FIG. 39. When the value is "0000", embossed pits are formed on the recording layer, i.e., the material of the recording layer is a material used for read only discs. When the value is "1000", the material of the recording layer is cyanine used for DRAW (WORM) media. When the value is "1001", the material of the recording layer is phtalocyanine used for DRAW (WORM) media. When the value is "1010", the material of the recording layer is an azo compound used for DRAW (WORM) media. When the value is "1011", the material of the recording layer is a phase change material used for rewritable media. The values "0001" through "0111" and "1100" through "1111" are reserved.

As discussed above, the physical information of the medium is recorded in the sub-Q data (TOC) of the lead-in area. This enables a disc drive unit to easily and precisely determine the disc size, the configuration, the moment of inertia, the track pitch, the linear velocity, the medium type, and the material of the recording layer.

Instead of the physical information of the recording medium in the sub-Q data (TOC) of the lead-in area shown in FIGS. 32 through 39, physical information shown in FIGS. 40 45 may be employed.

As the sub-Q data indicated by (a) of FIG. 32, the content of the sub-Q data when ADR is 1, i.e., the content of the sub-Q data in the normal mode, is shown in (a) of FIG. 40. More specifically, the content of the sub-coding frame according to the value of the point (POINT), i.e., the content of MIN, SEC, FRAME, HOUR, PHOUR, PMIN, PSEC, and PFRAME, is shown.

The information indicated in (a) of FIG. 40 is similar to that indicated in (a) of FIG. 32. However, the physical information of a medium to be recorded in PMIN, PSEC, and PFRAME when the value of the point (POINT) is "F0" may be recorded as indicated in (b) of FIG. 40 rather than that indicated in (b) of FIG. 32.

The sub-Q data indicated in (a) of FIG. 40, as well as that indicated in (a) of FIG. 32, is based on the structure of the sub-Q data shown in FIG. 30A. If it is based on the structure of the sub-Q data shown in FIG. 29A, and the value of the point (POINT) is "F0", the physical information of the medium indicated in (b) of FIG. 40 can also be recorded in PMIN, PSEC, and PFRAME.

In the physical information designated in (b) of FIG. 40, in the 24 bits of PMIN, PSEC, and PFRAME, i.e., in Q57 through Q80, a four-bit medium type, a four-bit medium version, a four-bit material type, a two-bit linear velocity, a two-bit track pitch, a three-bit moment of inertia, and a four-bit disc size/configuration are recorded.

The four-bit disc size/configuration is shown in FIG. 41.

When the value is "0000", the disc size is 120 mm. When the value is "0001", the disc size is 80 mm. The other values are reserved. By utilizing the reserved values, the other disc sizes and configurations may be recorded.

For example, Q79 and Q80 may be used for the disc size information, and Q77 and Q78 may be used for the disc configuration.

The two-bit disc configuration may be defined as in the information shown in FIG. 34. More specifically, when the value is "00", the disc is a regular circular disc. When the value is "01", the disc is a triangular disc. When the value is "10", the disc is a rectangular disc. When the value is "11", the disc has a configuration other than the above-described configurations.

Alternatively, if the number of combination types of the disc size and the disc configuration is within 16, they may be defined in the four bits Q77 through Q80 by using "0000" through "1111".

As the three-bit moment-of-inertia information recorded in Q74 through Q76, the definition shown in FIG. 23 may be used.

More specifically, the value "000" indicates that the moment of inertia is less than 0.004 g?m2. The value "001" indicates that the moment of inertia is 0.004 g?m2 or greater but less than 0.01 g?m2. The value "010" indicates that the moment of inertia is 0.01 g?m2 or greater but less than 0.022 g?m2. The value "011" indicates that the moment of inertia is 0.022 g?m2 or greater but less than 0.032 g?m2. The value "100" indicates that the moment of inertia is 0.032 g?m2 or greater but less than 0.037 g?m2. The value "101" indicates that the moment of inertia is 0.037 g?m2 or greater. The values "110" and "111" are reserved.

The two-bit track pitch information is shown in FIG. 42. When the value is "00", the track pitch is 1.10 (m. The other values are reserved.

The two-bit linear velocity information is shown in FIG. 43. The value "00" indicates that the linear velocity is 0.9 m/s. The other values are reserved.

As the four-bit material type information from Q65 through Q68, the definition from Q57 to Q60 shown in FIG. 39 may be used.

The four-bit medium version information is shown in FIG. 44. The value "0000" indicates that the version is 0.9. The value "0001" indicates that the version is 1.0. The other values are reserved.

The four-bit medium type information is shown in FIG. 45. The value "0000" indicates that the disc is a high-density (double-density) read only medium. The value "0001" indicates that the disc is a high-density DRAW (WORM) medium. The value "0010" indicates that the disc is a high density rewritable medium. The other values are reserved.

According to the above-described physical information of a medium in the sub-Q data (TOC) of the lead-in area, the disc drive unit is able to easily and correctly determine the disc size, the disc configuration, the moment of inertia, the track pitch, the linear velocity, the medium type, the material of the recording layer, and the version.

As discussed above, in the multi-session type, such as CD-R, CD-RW, CD-EXTRA, etc., the value of the ADR of the sub-Q data may be "0101", i.e., mode 5.

In this embodiment, when the ADR in the sub-Q data (TOC) in the lead-in area is mode 5, the information shown in FIG. 46 is recorded according to the value of the point (POINT). The information shown in FIG. 46 is useful for a hybrid disc having a plurality of areas, each having a lead-in area, a program area, and a lead-out area, which are referred to as a "unit area" for a recording/reading operation.

When the value of the point (POINT) is "B0", the absolute time (absolute address) at which the program area of the subsequent unit area starts is recorded in MIN, SEC, FRAME, and HOUR. In PHOUR, PMIN, PSEC, and PFRAME, the absolute time (absolute address) at which the lead-out area of the final unit area of the disc starts is recorded.

When the value of the point (POINT) is "C0", special information 1 of the above-described wobble information is recorded in MIN, SEC, FRAME, and HOUR. In PHOUR, PMIN, PSEC, and PFRAME, the absolute time (absolute address) at which the lead-in area of the first unit area of the disc starts is recorded.

When the value of the point (POINT) is "C1", the above-described special information 1 is copied in MIN, SEC, FRAME, and HOUR. PHOUR, PMIN, PSEC, and PFRAME are reserved.

When the value of the point (POINT) is "CF", the absolute time (absolute address) at which the lead-out area of the current unit area ends is recorded in MIN, SEC, FRAME, and HOUR. In PHOUR, PMIN, PSEC, and PFRAME, the absolute time (absolute area) at which the lead-in area of the subsequent unit area starts is recorded.

When the value of the point (POINT) is "CF" in the final unit area, the information in PHOUR, PMIN, PSEC, and PFRAME is set to zero since there is no subsequent unit area. Alternatively, the sub-code frame in which the point (POINT) is "CF" is not provided.

As described above, in this embodiment, by referring to the information of the sub-Q data of a hybrid disc, in particular, the "absolute time at which the lead-in area of the subsequent unit area starts" when the value of the point (POINT) is "CF", the position of the lead-in area of the subsequent unit area can be precisely determined.

For example, FIG. 47A schematically illustrates a disc having two unit areas #1 and #2, and FIG. 47B schematically illustrates a disc having three unit areas #1, #2, and #3. According to the sub-Q data read from the lead-in area of a unit area, the position of the lead-in area of the subsequent unit area can be identified, as shown in FIGS. 41A and 41B. This enables a disc drive unit to sequentially access the lead-in areas of the individual unit areas, as indicated by the one-dot-chain arrows, thereby easily reading the TOC data of each unit area.

In the sub-code of the lead-in area of each unit area, the absolute time at which the current lead-out area of the unit area ends is recorded. Thus, any gap between the lead-out area of the current unit area and the lead-in area of the subsequent unit area can be correctly identified.

5. Configuration of Disc Drive Unit

A description is now given of a disc drive unit for performing a recording/reading operation in accordance with the above-described various types of discs.

Figure 48:
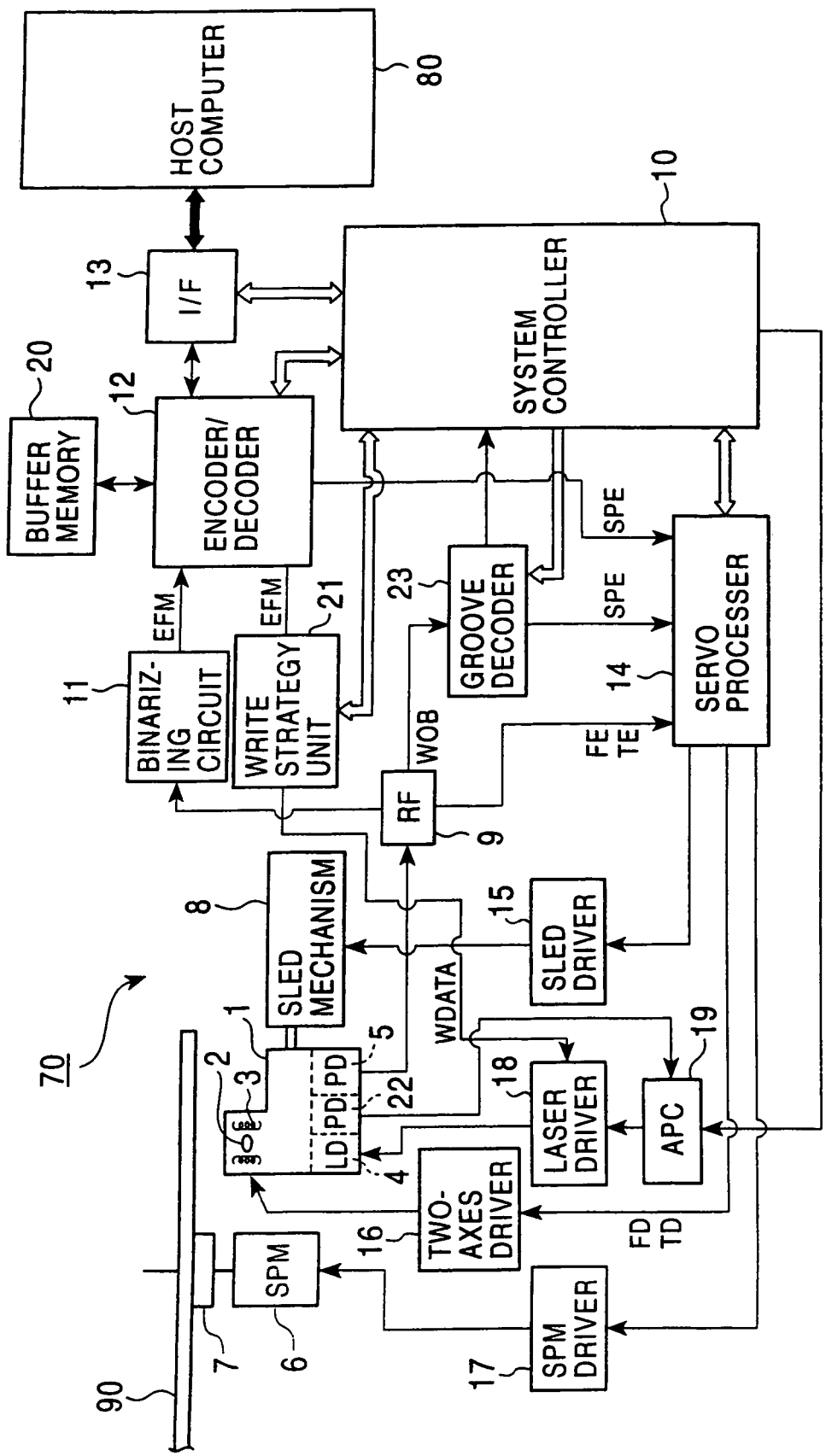
FIG. 48 is a block diagram illustrating a disc drive unit according to an embodiment of the present invention.

FIG. 48 is a block diagram illustrating the configuration of a disc drive unit 70. In FIG. 48, a disc 90 is a CD format disc, such as a CD-R, a CD-RW, a CD-DA, or a CD-ROM. Various types of discs, as discussed with reference to FIGS. 1A through 5B, may be loaded in the disc drive unit 70.

The disc 90 is loaded on a turntable 7, and is rotated at a CLV or a CAV by a spindle motor 6 during a recording/reading operation. Then, pit data is read from the disc 90 by an optical pick-up 1. As the pit data, when the disc 90 is a CD-RW, pits formed by a phase change are read. When the disc 90 is a CD-R, pits formed by a change in an organic pigment (index of reflection) are read. When the disc 90 is a CD-DA or a CD-ROM, embossed pits are read.

The optical pick-up 1 contains a laser diode 4, which serves as a laser light source, a photodetector 5 for detecting reflected light, an objective lens 2, which serves as an output terminal of laser light, and an optical system (not shown) for applying the laser light to the recording surface of the disc via the objective lens 2 and also for guiding the light reflected by the disc to the photodetector 5. A monitoring detector 22 for receiving part of the light output from the laser diode 4 is also provided for the optical pick-up 1.

The objective lens 2 is held by a two-axes mechanism 3 movably in the tracking direction and the focusing direction. The entire optical pick-up 1 is movable along the radius of a disc by a sled mechanism 8. The laser diode 4 of the optical pick-up 1 is driven by a drive signal (drive current) from a laser driver 18.

The reflected light information from the disc 90 is detected by the photodetector 5 and is converted into an electrical signal based on the amount of received light. The electrical signal is then supplied to an RF amplifier 9.

Generally, the RF amplifier 9 is provided with an AGC circuit. This is because the amount of light reflected by a CD-RW considerably changes according to whether data is recorded on the disc 90 or whether data is currently recorded on the disc 90 in comparison with a CD-ROM, and also, the index of reflection of a CD-RW is very different from that of a CD-ROM or a CD-R.

The RF amplifier 9 is also provided with a current-to-voltage conversion circuit, a matrix-computing/amplifying circuit, etc. to cope with the output currents from a plurality of light receiving devices, which form the photodetector 5, thereby generating signals by performing matrix computation. For example, an RF signal (read data), a focus error signal FE and a tracking error signal TE for performing servo control are generated.

The read RF signal output from the RF amplifier 9 is supplied to a binarizing circuit 11, while the focus error signal FE and the tracking error signal TE are supplied to a servo processor 14.

As described above, a groove for guiding a recording track is pre-formed on the disc 90, such as a CD-R or a CD-RW. The groove wobbles (meanders) according to a signal formed by performing frequency modulation on time information indicating the absolute address on the disc. Accordingly, during the recording/reading operation, by referring to the groove information, tracking servo can be performed, and the absolute address and various physical information can be obtained. The RF amplifier 9 extracts wobble information WOB by performing matrix computation, and supplies it to a groove decoder 23.

The groove decoder 23 demodulates the received wobble information WOB so as to extract the absolute address and supplies it to a system controller 10.

The groove information is also input into a phase locked loop (PLL) circuit so as to obtain rotational velocity information of the spindle motor 6. By comparing the rotational velocity information with the reference velocity information, a spindle error signal SPE is generated and output.

Recordable discs, such as CD-R and CD-RW, include two types of disc, such as a standard density disc and a high density disc. The groove decoder 23 switches the decode system according to the density type information output from the system controller 10. More specifically, the groove decoder 23 switches the matching pattern of a frame synchronization.

The read RF signal obtained in the RF amplifier 9 is binarized in the binarizing circuit 11 so as to be converted to an eight-to-fourteen (EFM) signal. The EFM signal is supplied to an encoder/decoder 12.

The encoder/decoder 12 has both functions, such as a decoder function required for reading data, and an encoder function required for recording data. When data is read, the encoder/decoder 12 performs EFM demodulation, CIRC error correcting, deinterleaving, CD-ROM decoding, etc., thereby outputting CD-ROM formatted data.

The encoder/decoder 12 also extracts the sub-code from the data read from the disc 90 and supplies it to the system controller 10 as the TOC and address information as sub-code (Q data).

Additionally, the encoder/decoder 12 generates a reading clock in synchronization with the EFM signal by performing PLL processing, and executes the above-described decoding operation based on the reading clock. In this case, the encoder/decoder 12 extracts the rotational velocity information of the spindle motor 6 from the reading clock, and compares it with the reference velocity information, thereby generating the spindle error signal SPE and outputting it.

The encoder/decoder 12 is able to switch the processing method according to whether the disc (or unit area) to be read or recorded is a standard density disc or a high density disc.

During the reading operation, the encoder/decoder 12 stores the above-described decoded data in a buffer memory 20. When outputting the read data from the disc drive unit 70, the data stored in the buffer memory 20 is read and output.

An interface 13 is connected to an external host computer 80, and recording data, read data, and various commands are sent and received therebetween. As the interface 13, a small computer system interface (SCSI) or an AT attachment packet interface (ATAPI) is used. When reading data, the read data decoded and stored in the buffer memory 20 is transferred to the host computer 80 via the interface 13.

A read command, a write command, and other commands from the host computer 80 are supplied to the system controller 10 via the interface 13.

When recording data, recording data (such as audio data or CD-ROM data) is transferred from the host computer 80, and is then stored in the buffer memory 20 via the interface 13.

In this case, the encoder/decoder 12 performs encoding processing on the CD-ROM format data (when the supplied data is CD-ROM data), such as CIRC encoding, interleaving, sub-code addition, and EFM modulation, thereby forming CD-format data.

The EFM signal obtained by the encoding processing of the encoder/decoder 12 is supplied to a write strategy unit 21 in which the waveform of the EFM signal is shaped. Then, the EFM signal is supplied to the laser driver 18 as a laser drive pulse (write data WDATA).

The write strategy unit 21 provides compensation for recording data, that is, finely adjusting the optimal recording power and shaping the laser drive pulse waveform, according to the characteristics of the recording layer, the spot configuration of laser light, and the recording linear velocity.

The laser driver 18 applies the laser drive pulse supplied as the write data WDATA to the laser diode 4, thereby driving the emission of laser light. Accordingly, pits (phase change pits or pigment change pits) in accordance with the EFM signal are formed on the disc 90.

An auto power control (APC) circuit 19 controls the laser output to be maintained at a constant value without being influenced by the temperature while monitoring the laser output power from the monitoring detector 22. Given by the target laser output value from the system controller 10, the APC circuit 19 controls the laser driver 18 so that the target value is reached.

The servo processor 14 generates various servo drive signals, such as focus, tracking, sled, and spindle signals, from the focus error signal FE and the tracking error signal TE output from the RF amplifier 9 and the spindle error signal SPE output from the encoder/decoder 12 or the groove decoder 23.

More specifically, the servo processor 14 generates a focus drive signal FD and a tracking drive signal TD based on the focus error signal FE and the tracking error signal TE, respectively, and supplies them to a two-axes driver 16. The two-axes driver 16 then drives a focus coil and a tracking coil of the two-axes mechanism 3 of the optical pick-up 1. Accordingly, a tracking servo loop and a focus servo loop are formed by the optical pick-up 1, the RF amplifier 9, the servo processor 14, the two-axes driver 16, and the two-axes mechanism 3.

In response to a track jump command from the system controller 10, the tracking servo loop can be turned off, and a jump drive signal is output to the two-axes driver 16. The two-axes driver 16 then performs the track jump operation.

The servo processor 14 also generates a spindle drive signal based on the spindle error signal SPE and supplies it to a spindle motor driver 17. In response to the spindle drive signal, the spindle motor driver 17 applies, for example, a three-phase drive signal, to the spindle motor 6, which is then rotated at a CLV or CAV.

The servo processor 14 also generates a spindle drive signal based on a spindle kick/brake control signal from the system controller 10, and causes the spindle motor driver 17 to start, stop, accelerate, and decelerate the spindle motor 6.

Additionally, the servo processor 14 generates a sled error signal obtained as a low frequency component of the tracking error signal TE, and a sled drive signal based on the access control by the system controller 10, and supplies them to a sled driver 15. In response to the sled drive signal, the sled driver 15 drives the sled mechanism 8. The sled mechanism 8 is provided with a main shaft, a sled motor, and a transfer gear (none of which is shown), for holding the optical pick-up 1. By driving the sled mechanism 8 by the sled driver 15 according to the sled drive signal, the optical pick-up 1 slides on the disc 90.

The above-described various operations by the servo system and the recording/reading system are controlled by the system controller 10, which is formed of a microcomputer.

The system controller 10 executes the above-described operations in response to commands from the host computer 80. For example, upon receiving a read command, which instructs the system controller 10 to transfer certain data recorded on the disc 90, from the host computer 80, the system controller 10 first controls the seek operation to the designated address. That is, the system controller 10 instructs the servo processor 14 to cause the optical pick-up 1 to access the address designated by the seek command.

Thereafter, the system controller 10 performs the operation required for transferring the read data to the host computer 80. That is, the data is read from the disc 90, decoded, and temporarily stored. Then, the requested data is transferred to the host computer 80.

In contrast, in response to a write command from the host computer 80, the system controller 10 first moves the optical pick-up 1 to the address at which data is to be written. Then, the encoder/decoder 12 performs encoding processing, as discussed above, on the data transferred from the host computer 80, so as to be converted into an EFM signal.

Subsequently, the write data WDATA output from the write strategy unit 21 is supplied to the laser driver 18, thereby recording the requested data on the disc 90.

In the example shown in FIG. 48, the disc drive unit 70 is connected to the host computer 80. However, the disc drive unit 70, such as an audio CD player or CD recorder, which forms the recording/reading apparatus of the present invention, does not have to be connected to the host computer 80. In this case, the configuration of the interface 13 is different from that shown in FIG. 48, for example, the interface 13 may be provided with an operation unit and a display unit. That is, data may be recorded and read by the user's operation, and a terminal for inputting and outputting audio data may be formed. On the display unit, the currently recorded or read track number and the time (absolute address or relative address) may be displayed.

Various other configurations of the disc drive unit 70 are considered, for example, a record only apparatus or a read only apparatus may be provided.

6. Examples of Processing of Disc Drive Unit

Various processing examples of the disc drive unit 70 are discussed below.

Figure 49:
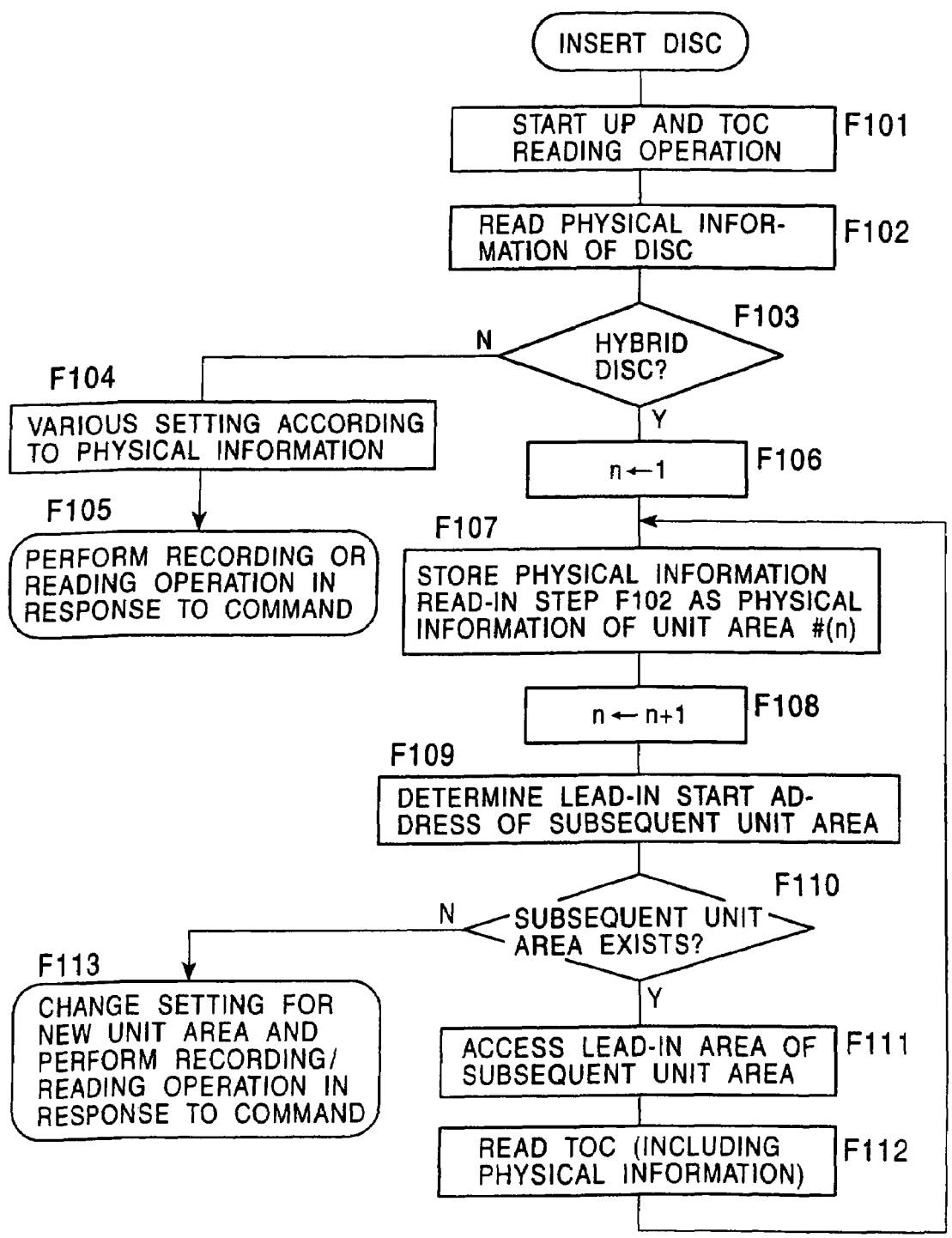
FIGS. 49 and 50 are flow charts illustrating the processing executed by the disc drive unit when a disc is inserted according to an embodiment of the present invention.
Figure 50:
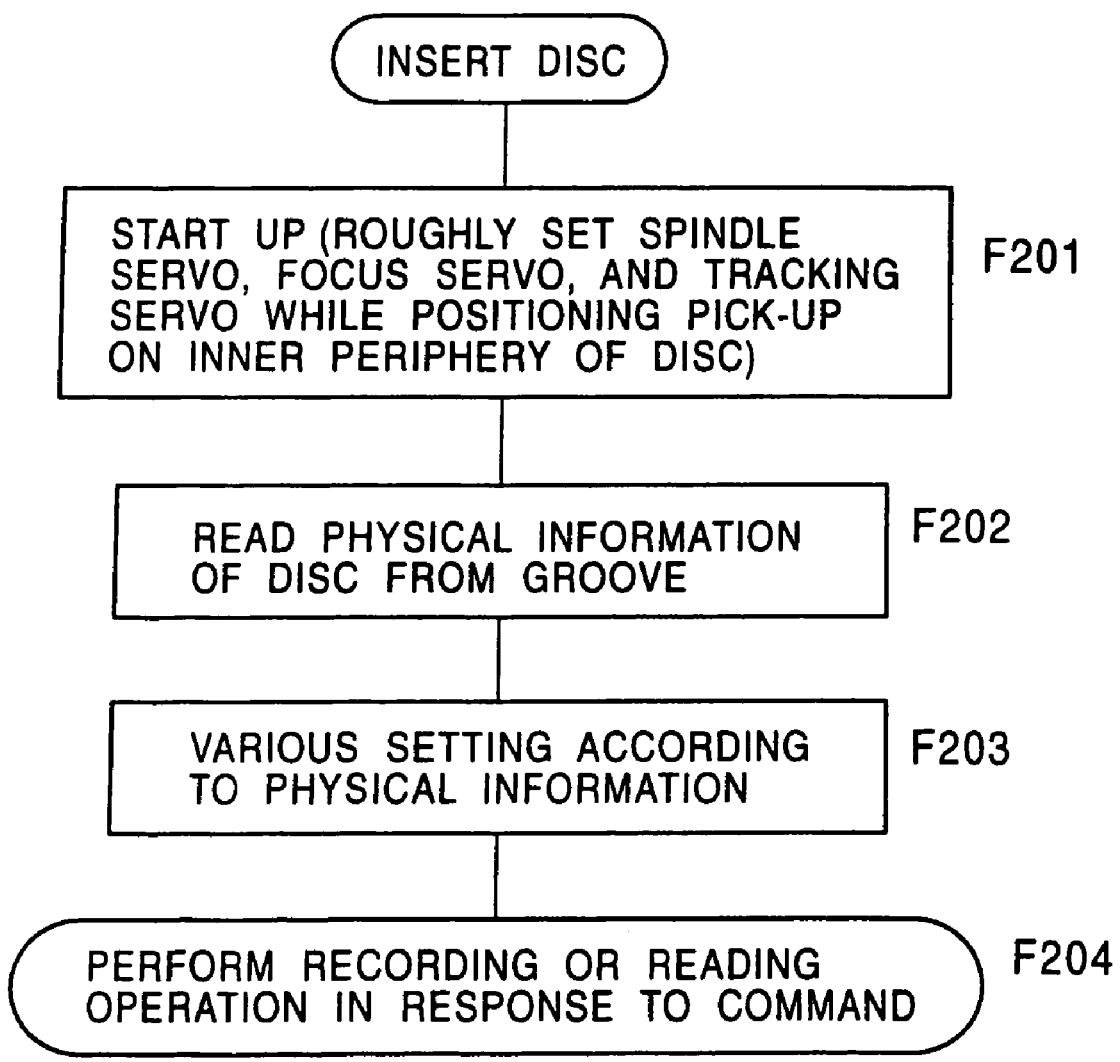

FIG. 49 is a flow chart of an example of the processing executed by the disc drive unit 70 when the disc 90 is inserted. It should be noted that the TOC formed by the sub-Q data is recorded in the lead-in area of the disc 90. If a virgin disc (unrecorded disc) is loaded as a CD-R or a CD-RW, the processing shown in FIG. 50 is performed rather than the processing shown in FIG. 49 since the TOC is not recorded on such a disc.

The processing indicated by the flow charts of FIGS. 49 through 52 is executed by the system controller 10.

In FIG. 49, when the disc 90 is loaded, in step F101, the system controller 10 performs the start-up operation and reads the TOC. More specifically, the system controller 10 starts the spindle motor 6, maintains the servo mechanism at a predetermined rotational velocity, starts laser emission, activates and maintains focus servo, and maintains tracking servo so that data can now be read from the disc 90, and then reads the TOC information.

Then, in step F102, the system controller 10 reads the physical information of the disc 90 from the TOC information, thereby determining the physical characteristics of the disc 90. This operation can be performed by checking the information shown in FIGS. 32 through 39.

It is then determined in step F103 whether the disc 90 is a hybrid disc. This can be determined by the medium type shown in FIG. 38. If the outcome of step F103 is no, the process proceeds to step F104 in which the recording/reading system is set according to the physical information of the type of the disc 90. The setting operation is discussed in detail below with reference to FIG. 51.

A recording/reading operation is now ready to be performed on the disc 90. In step F105, the system controller 10 waits for a command from the host computer 80, and executes a reading or recording operation in response to a read command or a write command, respectively.

If it is found in step F103 that the disc 90 is a hybrid disc, a variable n is set to 1 in step F106, and the loop processing from steps F107 to F112 is performed.

More specifically, in step F107, the physical information read in step F102 is stored as physical information of a unit area #(n), namely, physical information of, for example, the unit area #1 shown in FIG. 47A or 47B.

Subsequently, in step F108, the variable n is incremented. Then, in step F109, the start address of the lead-in area of the subsequent unit area is determined.

As discussed with reference to FIG. 46, in the sub-code frame in which the ADR is mode 5 and the point (POINT) is CF, the start address of the lead-in area of the subsequent unit area is recorded. Thus, in step F109, this information is checked.

If the start address of the lead-in area of the subsequent unit area is recorded in the above-described sub-code frame, the presence of the subsequent unit area can be automatically confirmed, and thus, the process proceeds from F110 to F111. In step F111, the system controller 10 controls the servo processor 14 to access the recorded start address of the lead-in area.

When the optical pick-up 1 reaches the lead-in area of the subsequent unit area, in step F112, the system controller 10 reads the TOC information. The TOC information contains the physical information shown in FIGS. 32 through 39.

The process then returns to step F107 in which the read physical information is stored as the physical information of the unit area #(n). In this case, the physical information of the unit area #2 is stored.

The above-described processing is repeated until the physical information of the final unit area is incorporated. That is, when the start address of the lead-in area of the subsequent unit area is read from the sub-code frame in which the ADR is mode 5 and the point (POINT) is CF in step F109, the address value is zero, or such a sub-code frame itself does not exist. In this case, it can be determined that the current unit area is the final unit area.

Accordingly, it is determined in step F110 that there is no subsequent unit area, and the process proceeds to step F113.

That is, the system controller 10 waits for a command from the host computer 80 after storing the physical information of all the unit areas, and performs a reading or recording operation in response to the read command or the write command, respectively. Then, before performing the recording or reading operation, the system controller 10 sets the recording/reading system based on the physical characteristics of the unit area from or into which data is read or recorded.

In contrast, when a virgin disc without TOC information is loaded as a CD-R or a CD-RW, the system controller 10 performs the processing shown in FIG. 50.

In step F201, the system controller 10 starts the spindle motor 6, begins the emission of laser light, and then roughly maintains the spindle servo, activates and maintains the focus servo, and maintains tracking servo while positioning the optical pick-up 1 on the inner periphery of the disc 90. The reading operation can now be performed on the disc 90.

Subsequently, in F202, wobble information is read from the groove on the disc 90. The physical information of the disc 90 is read from the wobble information so as to determine the physical characteristics of the disc 90. This operation can be performed by checking the information shown in FIGS. 13 through 23.

Then, in step F203, the recording/reading system is set according to the physical information of the disc 90. The setting information is discussed in detail below with reference to FIG. 51.

Thus, the recording operation can be performed on the disc 90. In step F204, the system controller 10 waits for a command from the host computer 80, and executes the recording operation according to the write command.

As discussed above, in this embodiment, when the disc 90 is loaded, the physical characteristics of the disc 90 are determined from the sub-Q data (TOC) or the wobble information, and various settings are made according to the determined physical characteristics.

Figure 51:
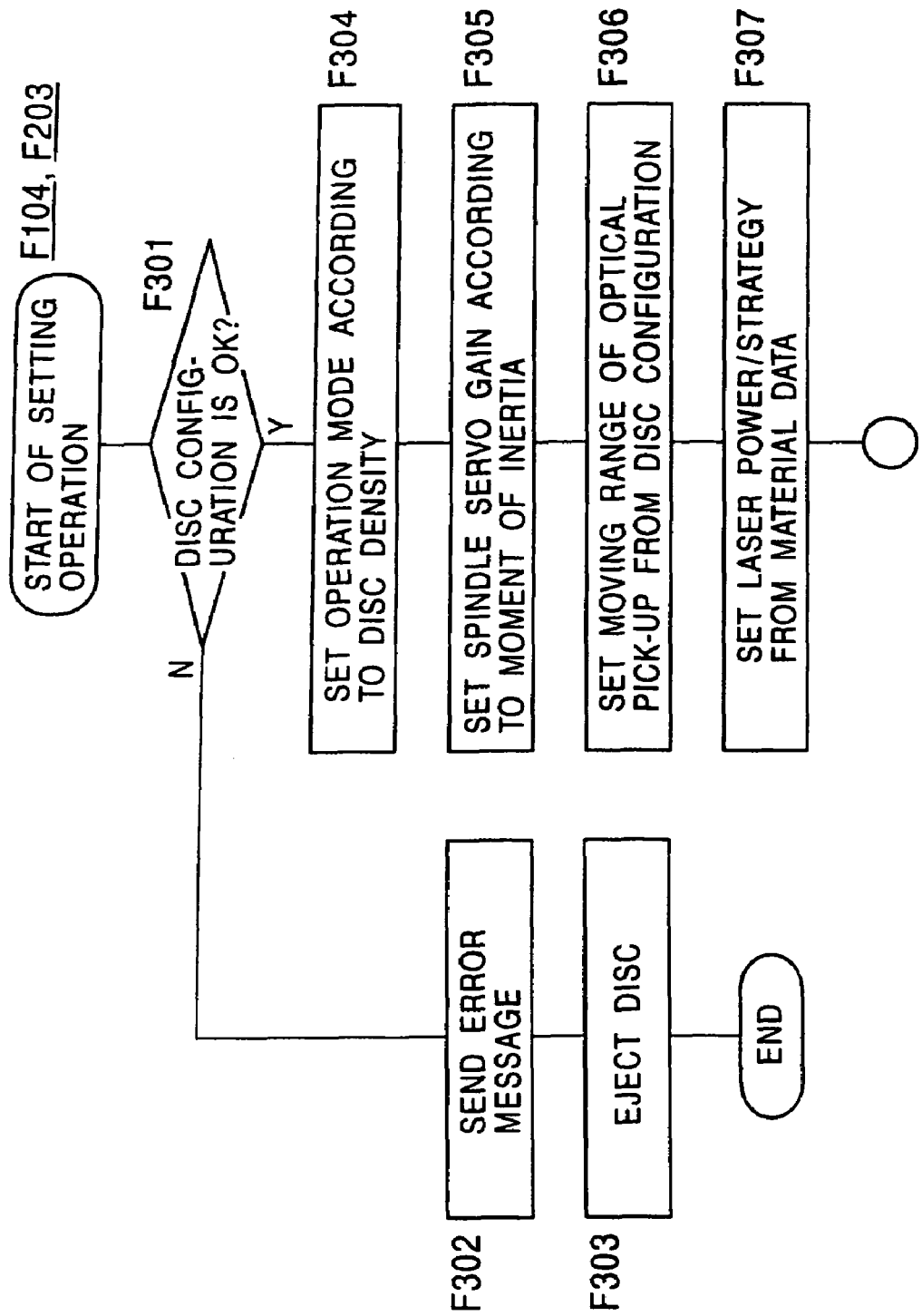
FIG. 51 is a flow chart illustrating setting processing executed by the disc drive unit according to an embodiment of the present invention.

The setting operation executed in step F104 of FIG. 49 or F203 of FIG. 50 is performed by, for example, the processing shown in FIG. 51.

In step F301, the disc configuration is first checked. That is, in the case of the wobble information, the configuration information described with reference to FIGS. 17 through 21B, and if necessary, the moment-of-inertia information shown in FIG. 22 is checked. In the case of the sub-Q data, the configuration information shown in FIG. 34 and the moment-of-inertial information shown in FIG. 35 are checked.

The system controller 10 then determines whether the configuration of the disc 90 is suitable to perform the reading or recording operation by the disc drive unit 70. This can be determined by the design of the disc drive unit 70, such as the structure of the unit itself, and the variable range of various parameters, such as the servo coefficient.

If it is found in step F301 that the configuration of the disc 90 is not suitable, the process proceeds to F302 in which an error message is output. Then, in step F303, the disc 90 is ejected, and the processing is ended.

The error message is sent to the host computer 80, and may be displayed on the monitor display of the host computer 80, or may be displayed on a display unit of the disc drive unit 70. An audio warning may be issued.

If it is found in step F301 that the configuration of the disc 90 is suitable, the process proceeds to step F304 in which the operation mode is set according to the disc density. In step F304, the disc density can be determined by the disc density information shown in FIG. 15 when using the wobble information. Or, when using the sub-Q data, the medium type shown in FIG. 38, the track pitch shown in FIG. 36, or the linear velocity shown in FIG. 37 can be checked.

Then, the processing mode in the encoder/decoder 12 or the processing mode in the groove decoder 23 is switched according to whether the disc density is high density or standard density.

According to the disc density, the RF gain and the equalizing characteristics of the RF amplifier 9, various servo gains, such as focusing and tracking gains, and the setting of the computation coefficients used for the seeking operation, which is required to cope with a difference in the track pitch, are also switched.

Thereafter, in step F305, the spindle servo gain is set according to the value of the moment of inertia.

This is explained in detail below with reference to FIGS. 53A and 53B.

Figure 53A:
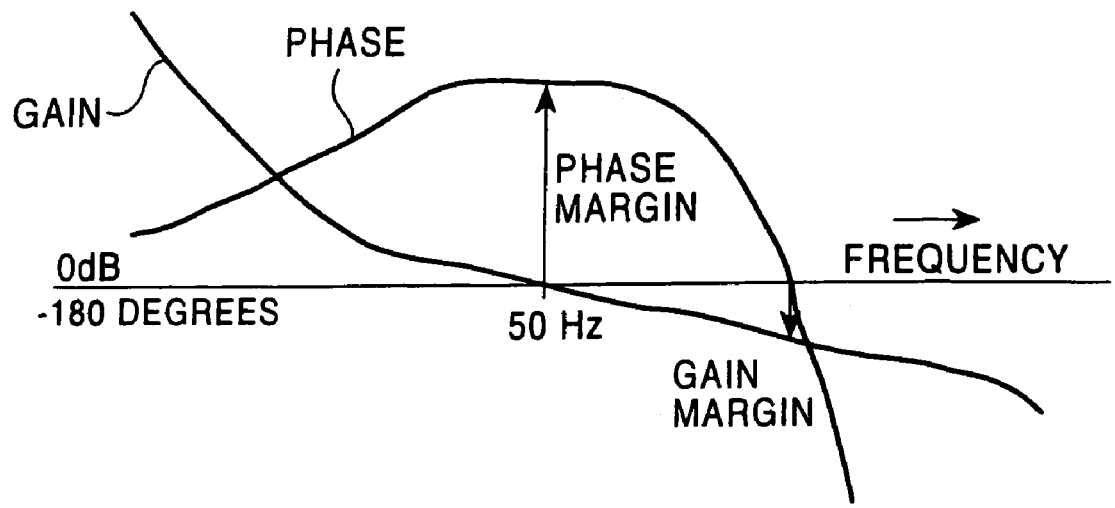
FIGS. 53A and 53B are Bode diagrams illustrating the servo open loop for setting the moment of inertia used in an embodiment of the present invention.

FIG. 53A is a Bode diagram of a servo open loop when a spindle servo gain suitable for a loaded disc having a large moment of inertia is set. According to the relationship between the gain and the phase, as shown in FIG. 53A, a sufficient phase margin and gain margin can be obtained.

Figure 53B:
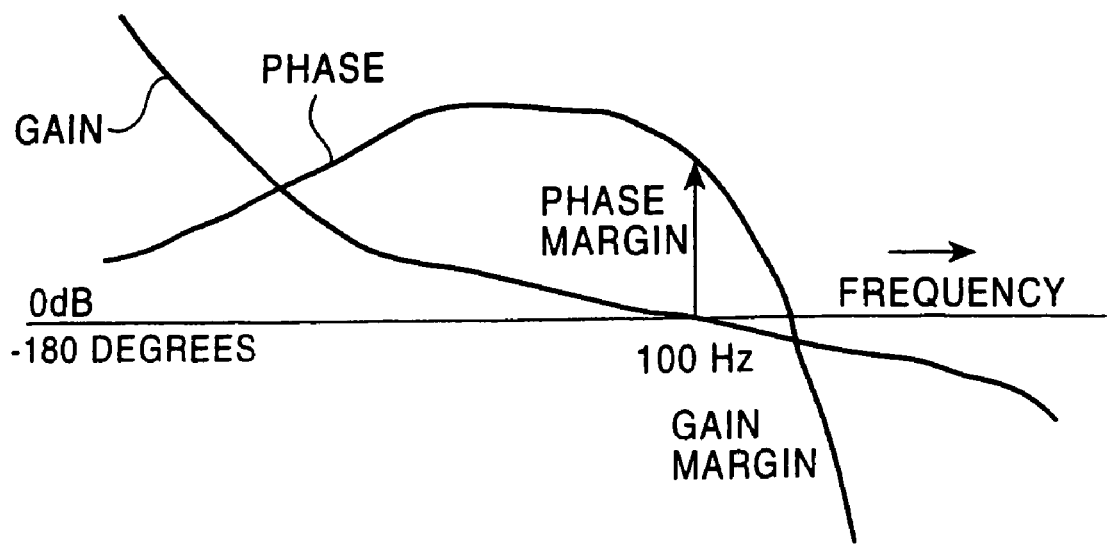

FIG. 53B is a Bode diagram of a servo open loop when a spindle servo gain which is not suitable for a loaded disc having a small moment of inertia is set.

In this case, according to the gain and the phase, as shown in FIG. 53B, a sufficient phase margin and gain margin cannot be obtained, thereby impairing the stability of the system.

If the servo gain is reduced from the value shown in FIG. 53B to the suitable value shown in FIG. 53A, a sufficient phase margin and gain margin can be achieved.

That is, there is a suitable value for the spindle servo gain according to the moment of inertia of a disc. Accordingly, in the processing of step F305, the spindle servo gain is set to an appropriate value by checking the moment of inertia. Thus, the spindle servo system can be stably operated with high precision. In particular, since highly precise rotation of the spindle is demanded in performing the recording operation, this processing is effective.

In step F306, the moving range of the optical pick-up 1 is set based on the disc configuration.

As described with reference to FIGS. 18A through 20C, the access range AC varies according to the disc configuration. Accordingly, based on the disc configuration (and maybe the above-described dimensions), it is determined where the optical pick-up 1 can access on the outer periphery of the disc 90, thereby setting the sled moving range of the optical pick-up 1. It is thus possible to prevent the erroneous operation of the optical pick-up 1, i.e., the application of laser light to a portion of the disc 90 without a recording track.

Step F307 is performed only when the disc 90 is a CD-R or a CD-RW. Based on the material data, the processing to be executed by the write strategy unit 21 is set. The material data, i.e., the material of the recording layer, can be checked by the material data shown in FIG. 14 contained in the wobble information, and by the material type shown in FIG. 39 contained in the sub-Q data.

In the write strategy unit 21, as stated above, the pulse waveform is shaped as the laser drive pulse.

Figure 54:
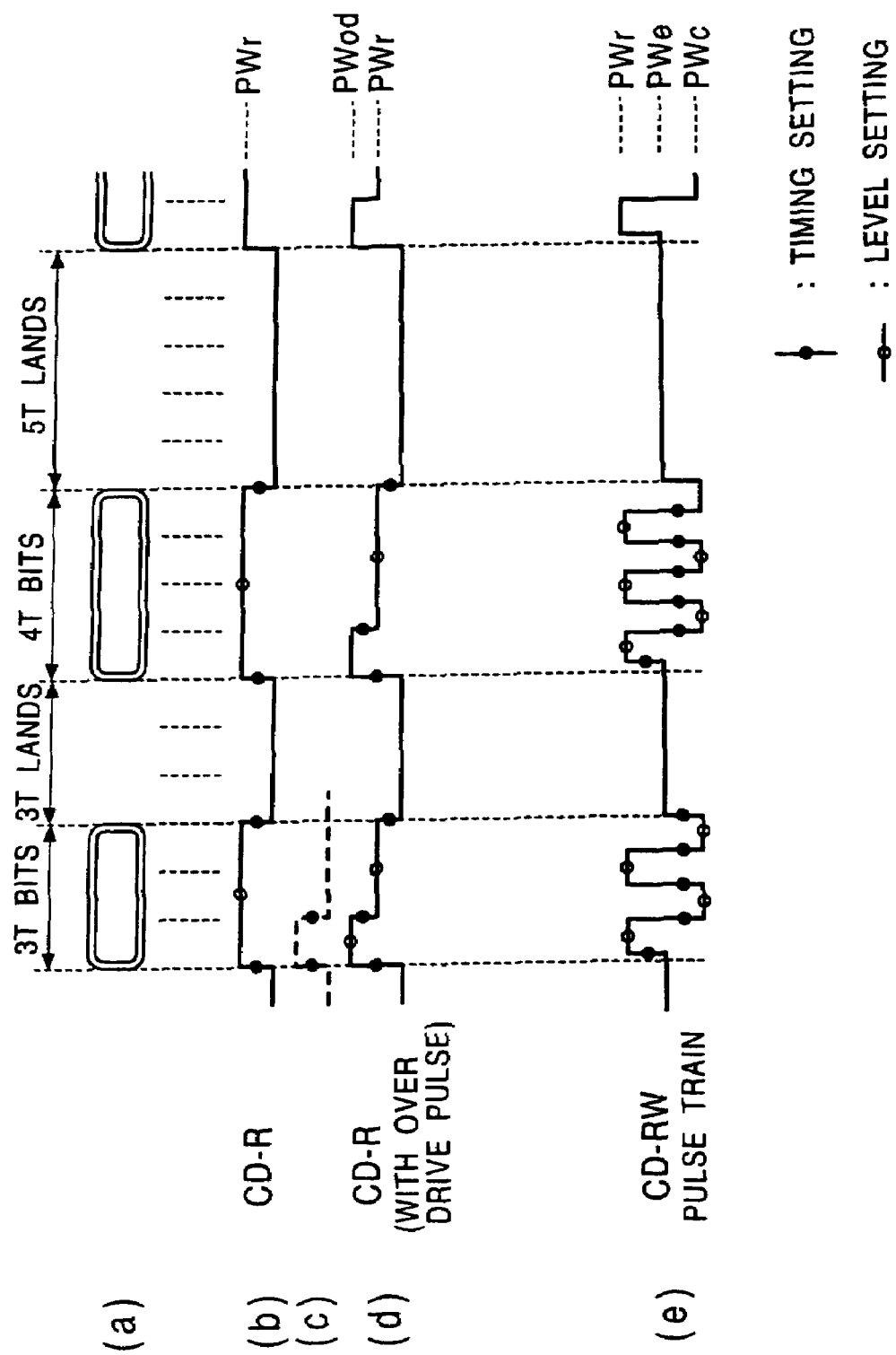
FIG. 54 illustrates laser drive pulses used in an embodiment of the present invention.

In the case of a CD-R on which data is recorded by a pigment change, laser drive pulses, such as those indicated by (b) of FIG. 54, are generated according to the lengths of pits/lands to be recorded, such as those indicated by (a) of FIG. 54, thereby driving the emission of laser light. The level PWr of the laser drive pulses indicates the laser recording power.

In a CD-R, pulses indicated by (b) and (c) of FIG. 54 may be combined, thereby synthesizing step-like laser drive pulses, such as those indicated by (d) of FIG. 54. According to the step-like laser pulses, the laser power is increased to PWod in part of the pulse zone in which pits are generated, and such part is referred to as an "over drive pulse". By applying the over drive pulses, the laser level can be more precisely controlled within the pulse period.

In the case of a CD-RW for recording data by a phase change technique, as indicated by (e) of FIG. 54, laser drive pulses (pulse train) are generated in which the laser power is switched between the recording power PWr and cooling power PWc in the pit forming zone, thereby driving laser light. During the land period, the laser power is set to erasing power PWe.

By finely adjusting the laser drive pulses for a CD-R and a CD-RW according to the material of the recording layer, the recording precision can be enhanced.

More specifically, in each pulse waveform shown in FIG. 54, according to the material of the recording layer, the timing adjustment (i.e., laser-pulse width adjustment) is performed by controlling the rising portions and the falling portions indicated by 1, and the level adjustment (i.e., laser power adjustment) is performed by controlling the pulse level indicated by !.

The reason for controlling the pulse waveform according to the pulse width and the laser power is as follows.

For example, in the case of a DRAW (WORM) disc, such as a CD-R, in order to record a longer pit, the ratio of the recording laser power to the reading laser power should be increased. Accordingly, a large amount of heat is accumulated so as to increase a region in which a chemical reaction is caused. As a result, the pit to be actually recorded becomes longer than a prescribed length. This phenomenon is more noticeable when the thermal sensitivity or the heat conduction of the recording layer of a disc is higher.

The length of the pit to be recorded is also influenced by the length of the preceding land. That is, as the land located immediately before the pit to be recorded becomes shorter, the heat accumulated in the preceding pit becomes less dissipated, thereby encouraging heat interference from the preceding pit.

For example, among some pits to be recorded, even if the lengths of the pits are the same, and the time for applying laser and power are the same, a pit adjacent to a shorter land results in a longer pit.

Since the heat accumulation and dissipation varies according to the material of the recording layer, the pulse width, the pulse configuration (laser emission pattern), and the pulse level (laser level) are adjusted according to the material, thereby contributing to the formation of a high-precision pit string.

As discussed above, according to the physical characteristics of the disc 90, the setting operation shown in FIG. 51 is performed, thereby improving the recording/reading performance.

If it is found in step F103 of FIG. 49 that the disc 90 is a hybrid disc, the setting operation shown in FIG. 51 is performed in step F113 in a unit area into and from which data is recorded or read.

The physical-characteristic determining operation shown in FIG. 49 or 50 and the setting operation shown in FIG. 51 may be performed not only when a disc is inserted, but also when power is turned on while a disc is loaded in the disc drive unit 70, or when a command is generated by the host computer 80.

TOC is not initially recorded on a CD-R or a CD-RW, and the disc drive unit 70 writes TOC information according to the data recording operation on the disc. The TOC writing operation is shown in FIG. 52.

Figure 52:
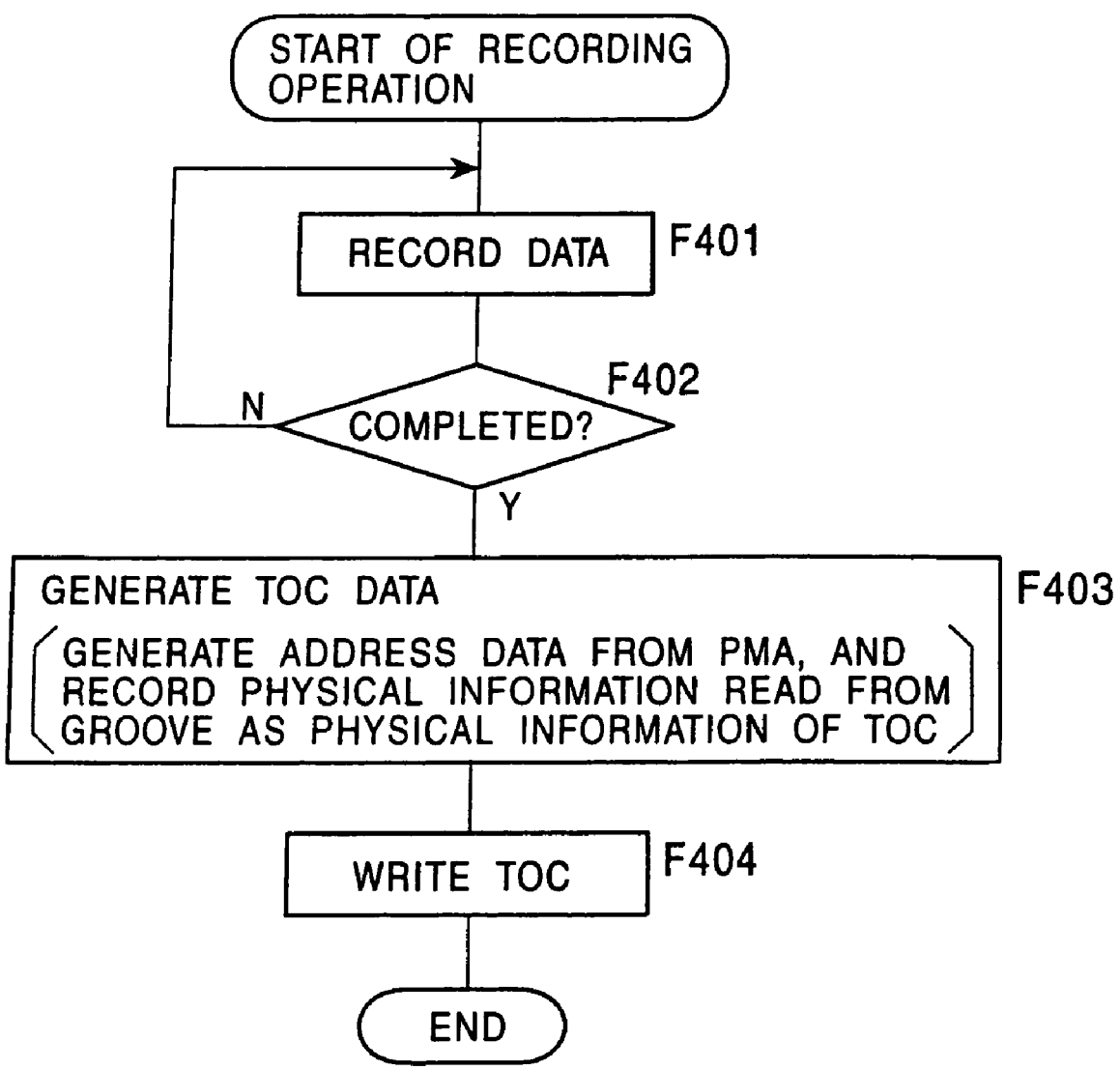
FIG. 52 is a flow chart illustrating recording processing executed by the disc drive unit according to an embodiment of the present invention.

FIG. 52 is a flow chart illustrating processing after data is recorded in a program area of the disc 90, which serves as a CD-R or a CD-RW. Steps F401 and F402 indicate the recording operation in response to a command from the host computer 80.

Upon completion of the recording of user data, in step F403, the system controller 10 generates TOC data according to the content of the recorded data.

That is, the system controller 10 generates information, such as the address of each track, from the values stored in the PMA, and also generates physical information, such as the one shown in FIGS. 32 through 39. In this case, the physical information is determined from the wobble information.

More specifically, the information indicated in (b) of FIG. 32 is generated from the physical information read from the wobble information. The value of the material information indicated in (b) of FIG. 32 is generated based on the material data shown in FIG. 14. The value of the medium type (in this case, whether the disc is a CD-R or CD-RW, and the density of the disc) indicated in (b) of FIG. 32 is generated based on the disc density shown in FIG. 15, the physical structure shown in FIG. 16, and the disc type of special information 1 shown in FIG. 13.

The linear velocity and the track pitch indicated in (b) of FIG. 32 can be generated based on the disc density shown in FIG. 15, special information 1 and 4 shown in FIG. 13, and the setting determined when user data is recorded. The moment of inertia represented in (b) of FIG. 32 is generated based on the moment of inertia shown in FIG. 22. The configuration designated in (b) of FIG. 32 is generated based on the disc configuration shown in FIG. 17. The disc size indicated in (b) of FIG. 32 is generated based on the disc configuration shown in FIG. 17 and the moment of inertia shown in FIG. 22.

It is not essential, however, that the information indicated in (b) of FIG. 32 be generated as discussed above.

Then, in step F404, the sub-code frame having the generated TOC information is recorded in the lead-in area.

Accordingly, in this embodiment, concerning a CD-R or a CD-RW without TOC information, the physical characteristics (physical information) of such a disc can be determined by wobble information. When recording the TOC information later, the physical characteristics determined from the wobble information are recorded in the disc as the TOC information. This makes it possible to determine the physical characteristics of the disc from the TOC, as well as from the wobble information.

A disc drive unit provided with a recording function is designed to decode wobble information. However, some read-only disc drive units are not provided with a decoding function for wobble information. Thus, by transferring the physical information of the disc obtained from the wobble information into TOC data, such read-only disc drive units are able to determine the physical information of the disc, and correspondingly perform the setting.

7. Examples of DVD-Format Discs

In the foregoing embodiment, the present invention has been discussed in the context of a CD-R and a CD-RW. The present invention is also applicable to other types of discs, and the physical characteristics, such as the moment of inertia and the disc configuration, of the other discs may also be recorded on them. In this case, advantages similar to those exhibited by the foregoing embodiment can be obtained in performing a recording or reading operation by a recording apparatus or a reading apparatus.

As an example of the other types of discs, DVD-format discs are discussed below. As recordable DVD-format discs, a DVD-RW, a DVD-R, a DVD-RAM, and a DVD+RW have been developed, which are described below.

Although a detailed configuration of a disc drive unit (recording/reading apparatus) compatible with such DVD-format discs is slightly different from that of the disc drive unit 70 compatible with CD-format discs shown in FIG. 48 due to differences in the data format, the modulation/demodulation method, the optical characteristics, and so on, the basic configuration of a DVD drive unit is similar to that of a CD drive unit. Thus, an explanation thereof is omitted. As in the operations described with reference to FIGS. 49 through 54, a disc drive unit compatible with DVD discs, which is discussed below, is able to determine the physical characteristics of a loaded disc, provide various settings according to the physical characteristics, and perform the recording and reading operation correspondingly.

The recording of the physical characteristics of a DVD disc therein is discussed below.

7-1 DVD-RW, DVD-R

In a DVD-RW, which is a rewritable disc using a phase-change recording technique, and a DVD-R, which is a DRAW (WORM) disc using an organic-pigment change technique, a wobbling groove is formed as a pre-format on the disc, and a pre-pit is formed on a land located between grooves (hereinafter referred to as a "land pre-pit").

The wobbling groove is used for controlling the rotation of the disc and for generating the recording master clock. The land pre-pit is used for determining the accurate recording position of each bit and for obtaining various items of information concerning the disc, such as the pre-address. Thus, the physical characteristic information of the disc is recorded in the land pre-pit.

Figure 55:
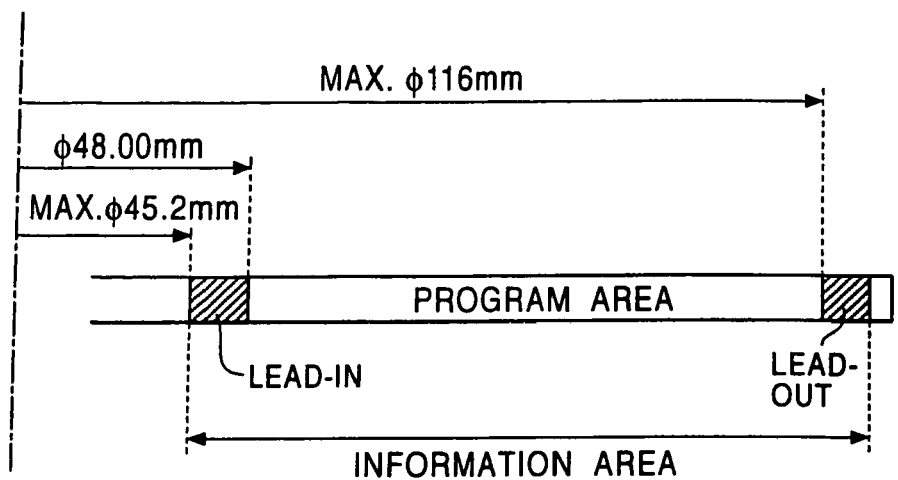
FIG. 55 illustrates the layout of a DVD-RW or DVD-R disc.

FIG. 55 illustrates the layout of a disc, which serves as a DVD-RW or a DVD-R.

The lead-in area on the inner periphery of the disc is disposed in a range from 45.2 to 48 mm from the center of the disc. The lead-out area is formed at a position away from 116 mm from the center of the disc. The area between the lead-in area and the lead-out area serves as a program area in which real data is recorded.

Figure 56:
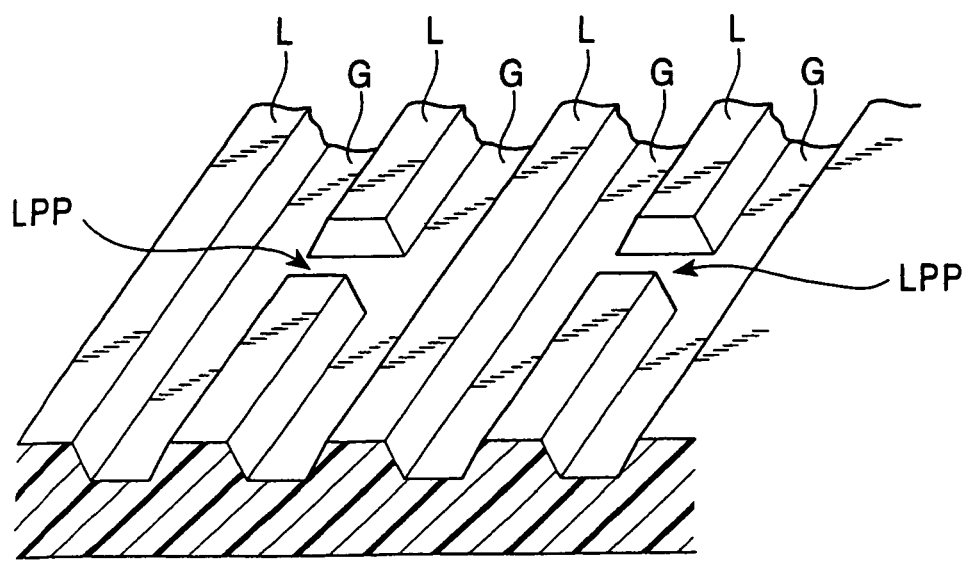
FIG. 56 illustrates land pre-pits.

In the information area including the lead-in area, the program area, and the lead-out area, the groove (guide groove), which forms a data track, is formed in a wobbling (meandering) shape. Additionally, a land pre-pit LPP is formed, as shown in FIG. 56, at a predetermined position of a land L between wobbling grooves G, G.

The wobbling groove G information and the land pre-pit LPP information are obtained by a so-called push-pull signal representing the light reflected by the disc detected by an optical pick-up.

The structure of the pre-formatted data recorded as the land pre-pit LPP is as follows.

Figure 57A:
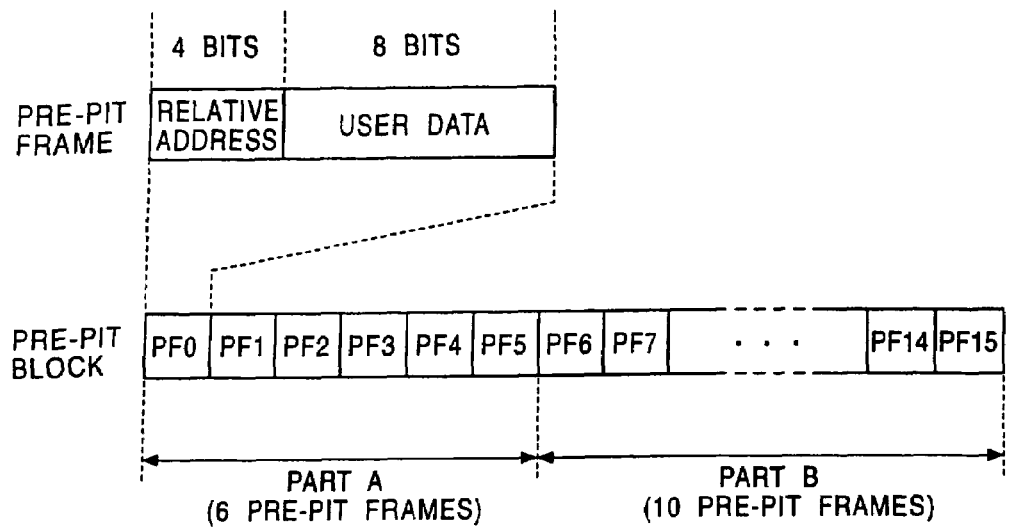
FIGS. 57A, 57B, and 57C illustrate the data structure formed by a land pre-pit.

FIG. 57A illustrates a pre-pit frame, which is a minimum unit of the pre-formatted data as the land pre-pit LPP. The pre-pit frame has twelve bits consisting of a four-bit relative address and eight-bit user data. Then, 16 pre-pit frames (PF0 through PF15) form one pre-pit block. The four-bit relative addresses of the individual pre-pit frames indicate the addresses of the corresponding pre-pit frames (PF0 through PF15).

The pre-pit block is formed of part A consisting of the six pre-pit frames PF0 through PF5 and part B consisting of the ten pre-pit frames PF6 through PF15.

Figure 57B:
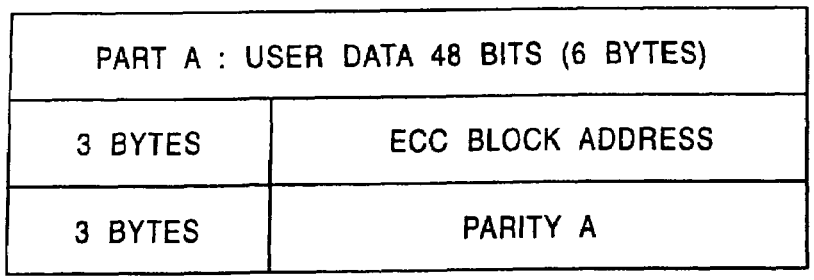

Since one pre-pit frame has eight-bit user data, part A has 48-bit (six bytes) user data. Among the six-byte user data, as shown in FIG. 57B, three bytes are used as an ECC block address, and three bytes are used as parity A for part A.

Figure 57C:
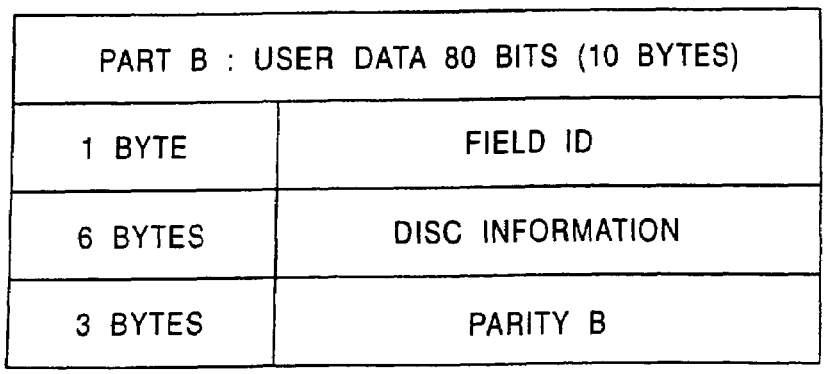

Part B, which consists of the ten pre-pit frames PF6 through PF15, has 80-bit (10-byte) user data. The 10-byte user data has, as shown in FIG. 57C, a one-byte field ID, six-byte disc information, and three-byte parity B for part B.

The six-byte disc information varies, as shown in FIG. 58, according to the field ID. In the pre-bit block in which the field ID is ID0, three bytes of the six-byte disc information of part B are used for recording the same value of the ECC block address of part A. The pre-pit block in which the field ID is ID0 is formed on the entire area of the disc.

The pre-pit block in which the field ID is one of ID1 through ID5 is formed in the lead-in area. In the pre-pit block in which the field ID is ID1, the application code or physical data is recorded as the six-byte disc information. In the pre-pit block in which the field ID is ID2, the OPC suggested code or write strategy code (WS1) is recorded as the six-byte disc information. In the pre-pit block in which the field ID is ID3, the manufacturer ID (MID1) is recorded as the disc information. In the pre-pit block in which the field ID is ID4, the manufacturer ID (MID2) is recorded as the disc information. In the pre-pit block in which the field ID is ID5, write strategy code (WS2) is recorded as the six-byte disc information.

Details of the structure of the pre-pit block in which the field ID is ID1 are shown in FIG. 59. In this case, the six-byte disc information of the user data of PF7 through PF12 of the pre-pit frames is formed of one-byte application code, one-byte disc physical data, a three-byte last address of the data recordable area, one-byte part version/extension code.

The contents of the one-byte (eight-bit) disc physical code are defined as shown in FIG. 60A.

Among the eight bits b0 through b7, b7 indicates track pitch information. When bit b7 is "0", the track pitch is 0.80 (m. When bit b7 is "1", the track pitch is 0.74 (m. Bit b6 represents the reference velocity. The value "0" indicates that the reference velocity is 3.84 m/s, while the value "1" indicates that the reference velocity is 3.49 m/s. Bit b5 designates the disc size. The value "0" indicates that the disc size is 12 cm, while the value "1" indicates that the disc size is 8 cm. Bit 4 represents the index of reflection. The value "0" indicates that the index of reflection ranges from 45 to 85%, while the value "1" indicates that the index of reflection ranges from 18 to 30%.

The medium type is recorded in bit 2 and bit 1. When bit b2 is "1", the medium type is a phase change medium. When bit 2 is "0", the medium type is another type. When bit 1 is "0", the medium type is a recordable type. When bit 1 is "1", the medium type is a rewritable type.

The moment of inertia is recorded in bit b3 and bit b0. When the values of bit 3 and bit 0 are represented by J1 and J2, respectively, the moment of inertia can be defined by the two bits J1 and J2, as shown in FIG. 60B.

When the values of J1 and J2 are "00", the moment of inertia is less than 0.01 g?m2. When the values of J1 and J2 are "01", the moment of inertia is 0.01 g?m2 or greater but less than 0.02 g?m2. When the values of J1 and J2 are "10", the moment of inertia is 0.02 g?m2 or greater but less than 0.03 g?m2. When the values of J1 and J2 are "11", the moment of inertia is 0.03 g?m2 or greater.

In the case of a DVD-RW and a DVD-R, as described above, the physical information of a recording medium is recorded in the lead-in area as the pre-bit block of the land pre-bit LPP. This enables a disc drive unit to accurately and easily determine the disc size, the moment of inertia, the track pitch, the linear velocity, the medium type, etc. Accordingly, the disc drive unit is able to perform suitable settings according to the physical characteristics of the disc, thereby performing a suitable recording/reading operation correspondingly.

7-2 DVD-RAM

In a DVD-RAM, which is a DVD-format rewritable disc using a phase-change recording technique, high density recording is implemented by employing a land/groove recording method. In the DVD-RAM, the lead-in area includes a portion in which control information is recorded as embossed pits, and an information rewritable portion. The physical characteristic information of a disc can be recorded in the embossed pit area of the lead-in area.

Figure 61:
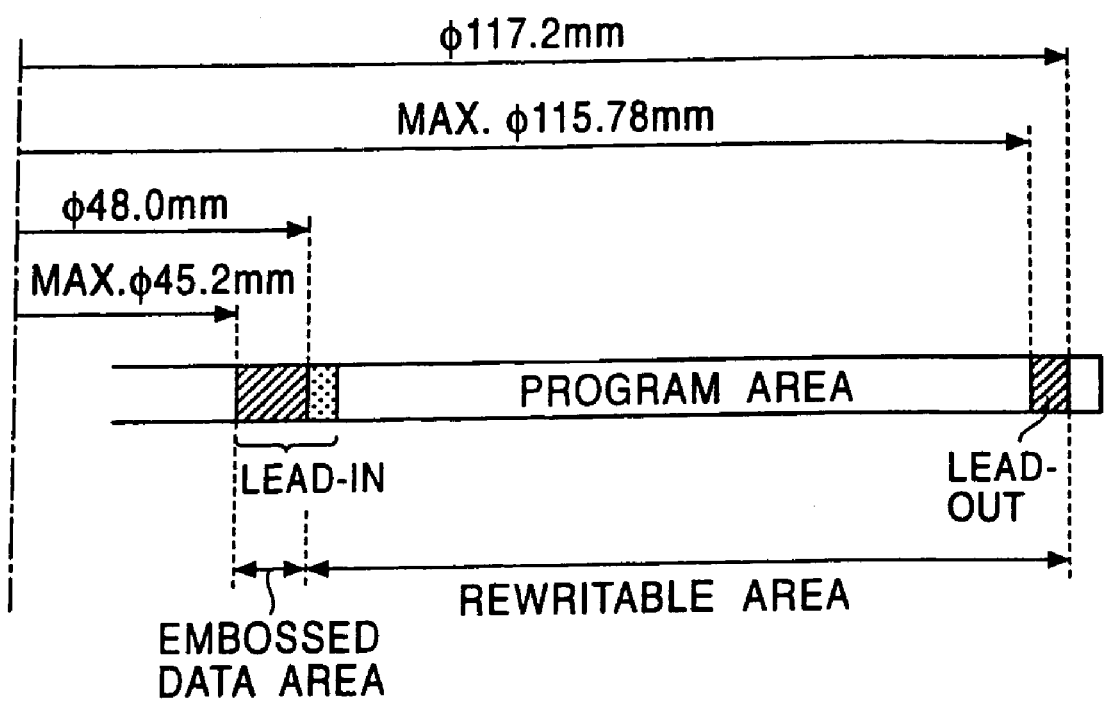
FIG. 61 illustrates the layout of a DVD-RAM disc.

FIG. 61 illustrates the layout of a DVD-RAM. The lead-in area is formed, as shown in FIG. 61, from 45.2 mm from the center of the disc. The area from 45.2 to 48.0 mm is an embossed pit area in which control information is recorded. The lead-in area further extends to the rewritable area in which data is recorded. The lead-out area is formed from 115.78 to 117.2 mm. The area between the lead-in area and the lead-out area is used as a program area in which real data is recorded.

Figure 62:
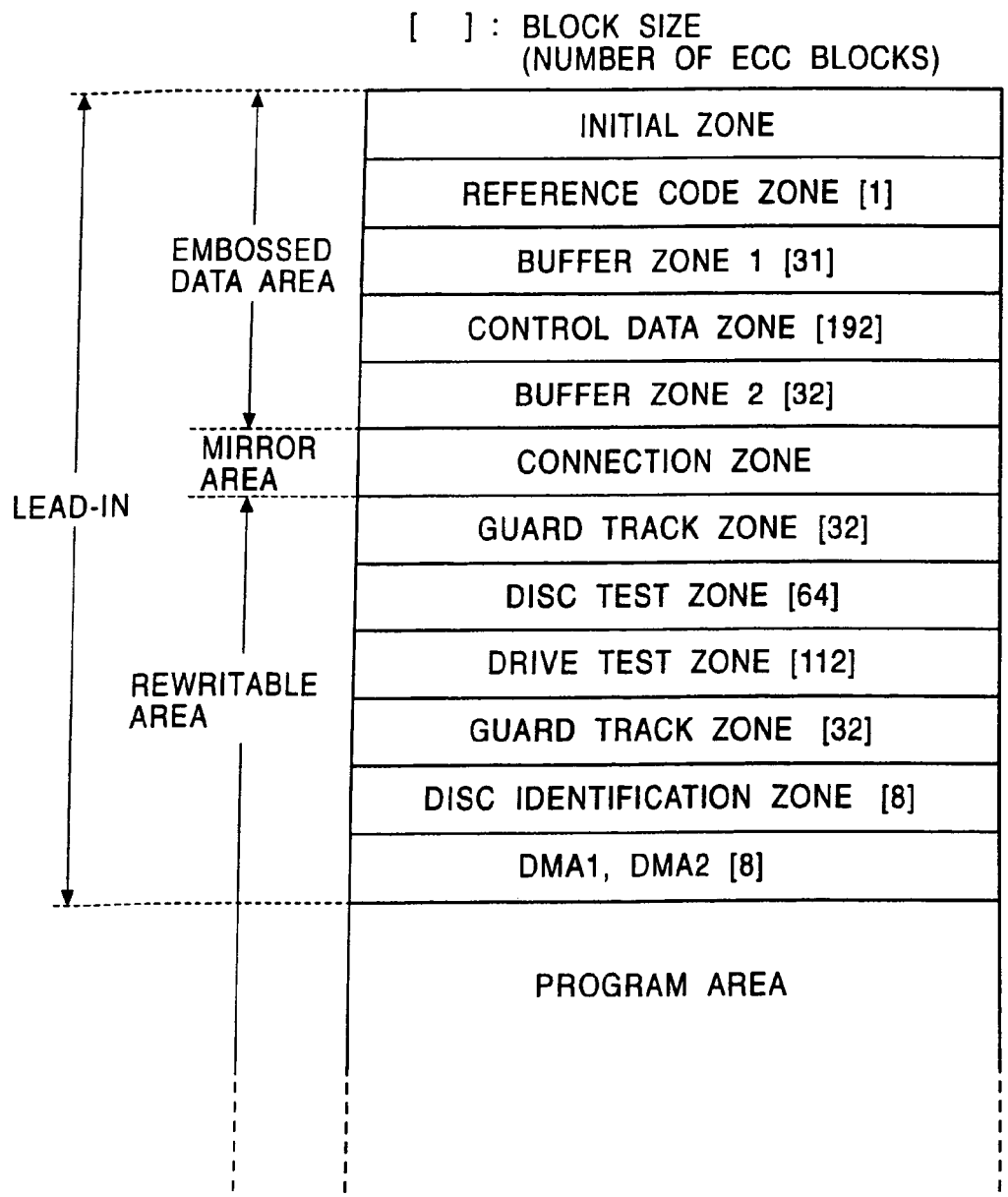
FIG. 62 illustrates the structure of the lead-in area of a DVD-RAM.

The detailed configuration of the lead-in area is shown in FIG. 62.

The lead-in area is largely formed of an embossed data area, a mirror area, and a rewritable area. In the embossed data area, an initial zone, a one-block (ECC block) reference code zone, a 31-block buffer zone, a 192-block control data zone, and a 32-block buffer zone are sequentially disposed.

Subsequently, in the rewritable area after a mirror area (connection zone), a 32-block guard track zone, a 64-block disc test zone, a 112-block drive test zone, a 32-block guard track zone, an 8-block disc identification zone, an 8-block defect management area (DMA) 1, and an 8-block DMA2 are sequentially disposed.

Figure 63:
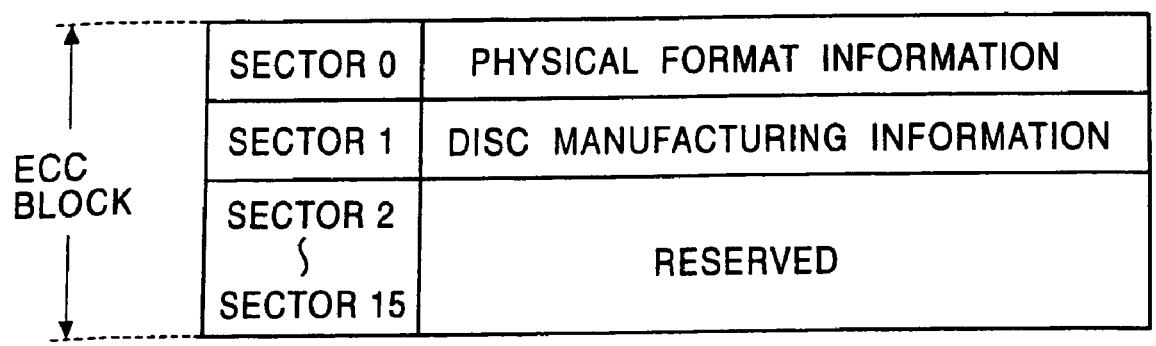
FIG. 63 illustrates the block structure of a control data zone of a DVD-RAM.

The configuration of each of the 192 blocks of the control data zone in the embossed data area is shown in FIG. 63.

One block is formed of 16 sectors from sector 0 to sector 15. One sector has 2048 bytes. In sector 0, physical format information is recorded. In sector 1, disc manufacturing information is recorded. 192 blocks configured as described above are recorded in the control data zone.

Figures 64, 65:
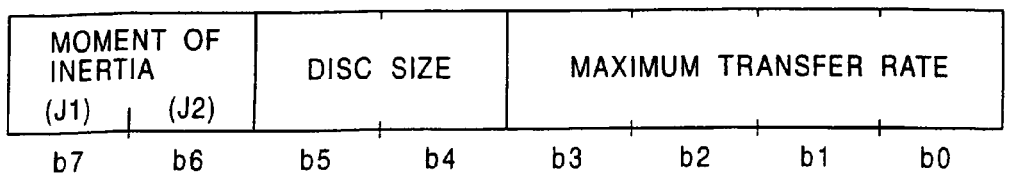
FIG. 64 illustrates the contents of the physical format information according to an embodiment of the present invention.
FIG. 65 illustrates part of the physical format information shown in FIG. 64.

The contents of the physical format information (2048 bytes) recorded in sector 0 are partially shown in FIG. 64. In the head byte at byte position 0 of the 2048-byte sector, the medium type and the part version is recorded.

In the subsequent byte at byte position 1, the moment of inertia, the disc size, and the maximum transfer rate are recorded. This information has, for example, eight bits of bit 0 to bit 7, as shown in FIG. 65, in which the maximum transfer rate is recorded in four bits from b0 to b3, the disc size is recorded in two bits from b4 and b5, and the moment of inertia is recorded in two bits b6 and b7. Concerning the two bits b4 and b5 representing the disc size, the value "00" may represent a 12-cm disc, while the value "01" may indicate an 8-cm disc, and the other values may be reserved. Alternatively, by using the two bits b4 and b5, a combination of the disc size and the disc configuration may be indicated rather than only the disc size. The two bits b7 and b6 designating the moment of inertia may be represented by J1 and J2, respectively, and the moment of inertia may be defined as shown in FIG. 60B.

In FIG. 64, at byte position 2 (one byte), the disc structure is recorded as a predetermined definition. At byte position 3 (one byte), the recording density is recorded as a predetermined definition. At byte position 32 (one byte), the disc type ID is recorded.

Concerning a DVD-RAM, the physical information of the recording medium is recorded in the embossed data area of the lead-in area. Accordingly, the disc drive unit is able to precisely and easily determine the disc size/configuration, the moment of inertia, the medium type, and so on. It is thus possible to provide suitable settings according to the physical characteristics of the disc and perform the appropriate recording/reading operation correspondingly.

7-3 DVD+RW

In a DVD+RW, which is a DVD-format rewritable disc using a phase-change recording technique, various items of information are recorded on the disc by a phase-modulated wobbling groove. Thus, the physical characteristic information of the disc is included in address in ADIP information which is to be recorded as the phase-modulated wobbling groove.

The phase-modulated wobbling information is described below with reference to FIGS. 66A, 66B, and 66C. Eight wobbles form one ADIP unit. The wobbles are then phase-modulated in such a manner that positive wobbles PW and negative wobbles NW are generated in a predetermined order. Accordingly, the ADIP unit represents a synchronization pattern, "0" data, or "1" data.

The head of the positive wobble PW directs toward the inner periphery of the disc, while the head of the negative wobble NW directs toward the outer periphery of the disc.

Figure 66A:
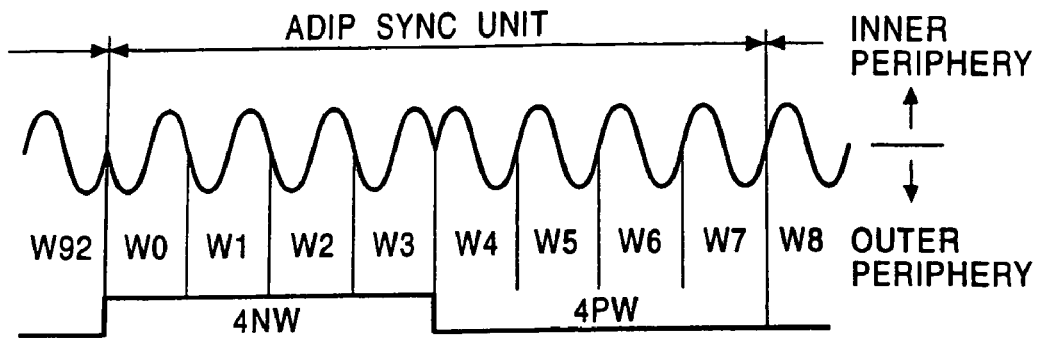
FIGS. 66A, 66B, and 66C illustrate the phase modulation of ADIP units of a DVD+RW.

FIG. 66A illustrates the synchronization pattern (ADIP synchronization unit). The first four wobbles (W0 through W3) are negative wobbles NW, and the last four wobbles (W4 through W7) are positive wobbles PW.

Figure 66B:
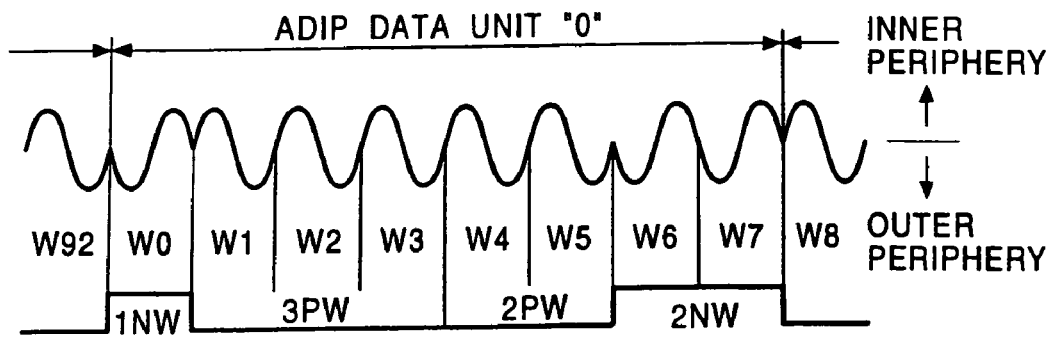

FIG. 66B illustrates the ADIP data unit indicating "0" data. The first wobble W0 is a negative wobble NW, which serves as a bit synchronization, and the subsequent three wobbles (W1 through W3) are positive wobbles PW. In the last four wobbles, the two wobbles (W4 and W5) are positive wobbles PW, and the remaining two wobbles (W6 and W7) are negative wobbles NW. With this arrangement, the ADIP data represents "0" data.

Figure 66C:
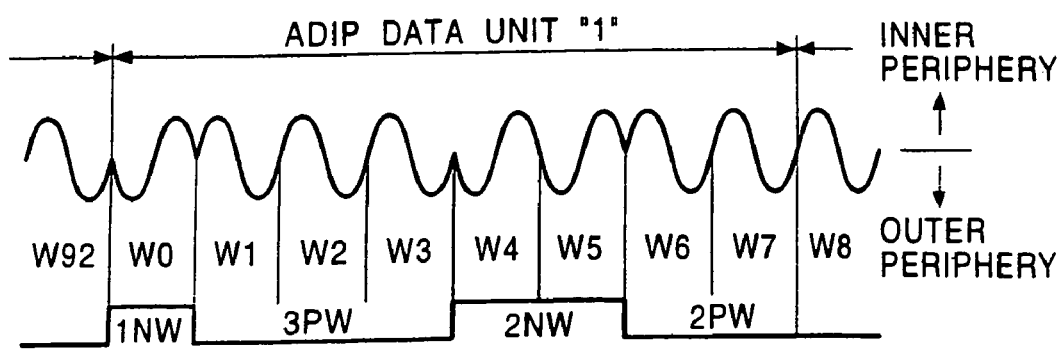

FIG. 66C illustrates the ADIP data unit indicating "1" data. The first wobble W0 is a negative wobble NW, which serves as a bit synchronization, and the subsequent three wobbles (W1 through W3) are positive wobbles PW. In the last four wobbles, the two wobbles (W4 and W5) are negative wobbles NW, and the remaining two wobbles (W6 and W7) are positive wobbles PW. With this arrangement, the ADIP data represents "1" data.

The data structure of the above-described ADIP units is as follows.

Figure 67:
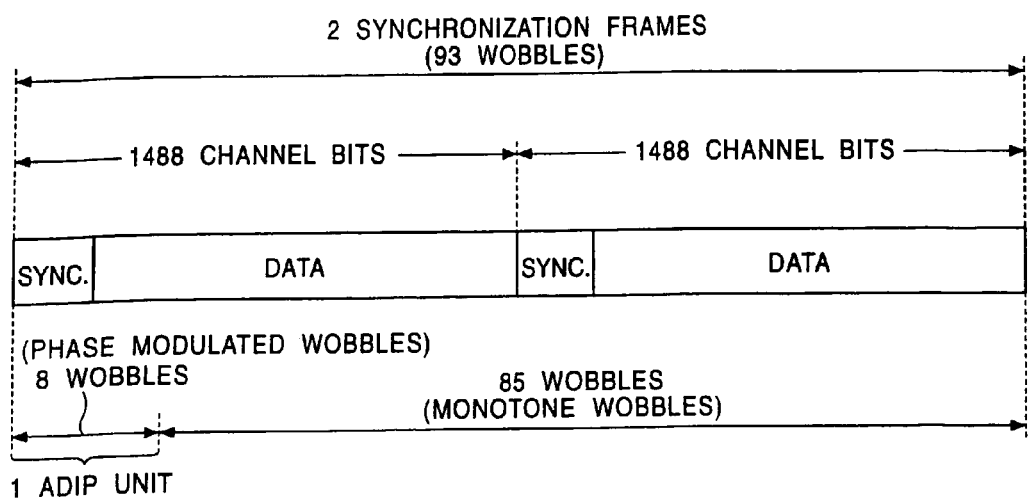
FIG. 67 illustrates an ADIP unit of a DVD+RW.

The ADIP unit information recorded as a wobbling groove is formed of two synchronization frames as one unit shown in FIG. 67. The two synchronization frames has 93 wobbles.

One wobble has 32 channel bits (32 T), and accordingly, one synchronization frame is equal to 1488 channel bits. One ADIP unit is formed by eight phase-modulated wobbles among the two synchronization frames (93 wobbles). The remaining 85 wobbles are monotone wobbles, which are not phase-modulated.

Figure 68A:
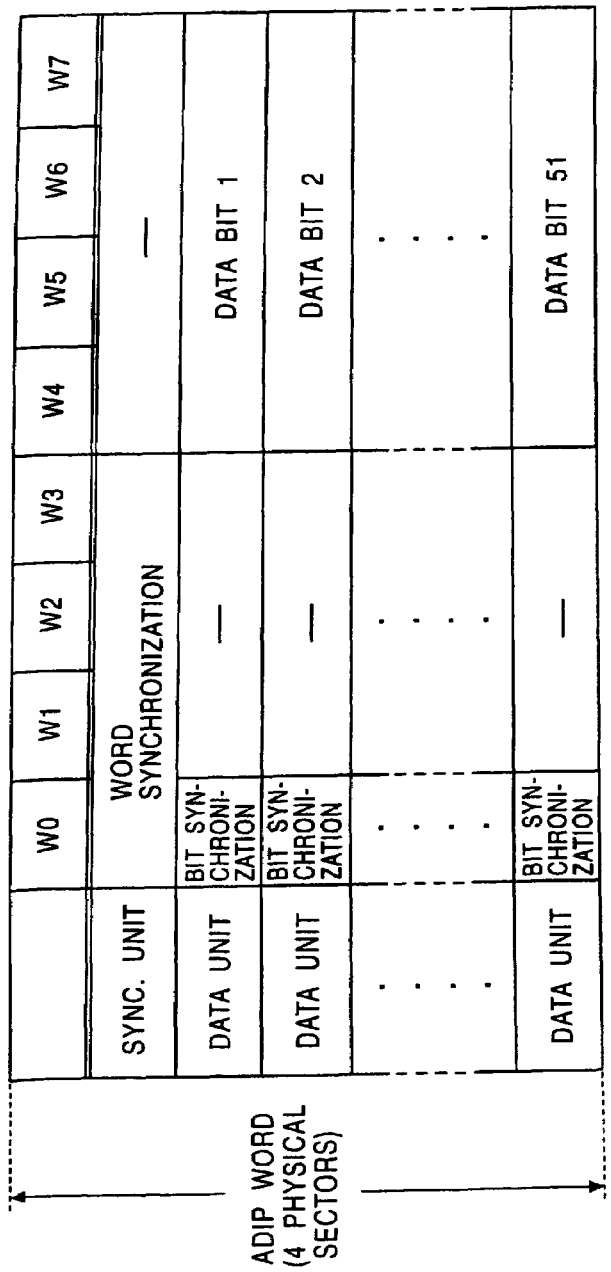
FIGS. 68A an 68B illustrate the structure of an ADIP word of a DVD+RW.

Fifty-two ADIP units form one ADIP word, which is equivalent to four physical sectors. The structure of the ADIP word is shown in FIG. 68A.

The ADIP word, which is formed of 52 ADIP units, each having eight wobbles (W0 through W7), has 52-bit information. The ADIP word consists of one ADIP synchronization unit and 51 ADIP data units. Accordingly, among the 52 bits, as shown in FIG. 68A, data bit 1 to data bit 51 other than the word synchronization (data bit 0) can be used for recording 51-bit information.

Figure 68B:
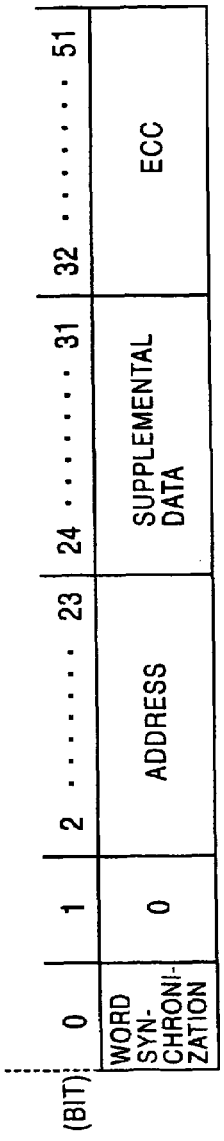

FIG. 68B illustrates the structure of the 52-bit ADIP word. Twenty-two bits from data bit 2 to data bit 23 are used for recording the physical address. The physical address is provided for each ADIP word. Eight bits from data bit 24 to data bit 31 are used for recording supplemental data. Data bit 32 through data bit 51 are used as ECC data.

Concerning the eight-bit supplemental data for each ADIP word, 256 supplemental data are collected from consecutive 256 ADIP data, thereby forming a 256-byte table. In such a table, the physical format information, such as the one shown in FIG. 69A, can be recorded.

Figures 69A, 69B:
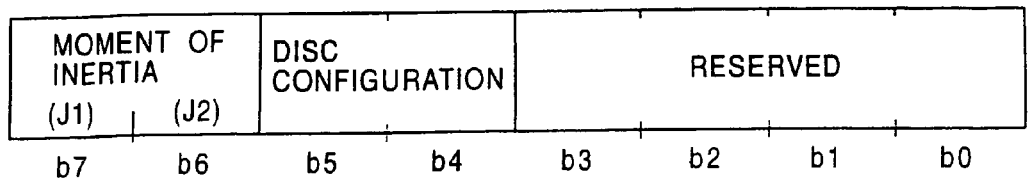
FIGS. 69A and 69B illustrate the physical format information to be recorded in an ADIP word according to an embodiment of the present invention.

FIG. 69A illustrates only byte positions 0 to 30 among the 256 bytes, and the remaining bytes from byte positions 31 to 255 are not shown.

One byte at byte position 0 is used for recording the disc category and the version number. One byte at byte position 1 is used for recording the disc size. One byte at byte position 2 is used for recording the disc structure. One byte at byte position 3 is used for recording the recording density. Twelve bytes at byte positions 4 through 15 are used for recording the data zone allocation. One byte at byte position 17 is used for recording the moment of inertia and the disc configuration.

At byte position 17, for example, as shown in FIG. 69B, two bits b7 and b6 are used for recording the moment of inertia, and two bits b5 and b4 are used for recording the disc configuration.

When bits b7 and b6 are represented by J1 and J2, respectively, the moment of inertia can be defined as shown in FIG. 60B. The disc configuration information can be recorded by the definition shown in FIG. 34 by using the two bits b5 and b4.

As discussed above, in the case of a DVD+RW, the physical information of the disc is recorded as a phase-modulated wobbling groove. This enables a disc drive unit to correctly and easily determine the disc size, the disc configuration, the moment of inertia, the medium type, etc. As a result, it is possible to perform suitable settings according to the physical characteristics and thus to perform an appropriate recording/reading operation correspondingly.

While the present invention has been described with reference to what are presently considered to be the preferred embodiment, various modifications may be made to the configuration of the disc drive unit, the operations of the unit, the structure of the wobble information, the structure of the sub-Q data, etc.

What is claimed is:

1. A disk shaped recording medium for recording data, wherein
   a recording track is formed by a groove on said recording medium, said groove representing predetermined information by wobbling of said groove, and
   said predetermined information including, manufacturer code, diameter information and at least one of disk type, a product type, and a disk density.

2. The disk shaped recording medium according to claim 1, wherein said diameter information and at least one of the manufacturer code, the product type, and the disk density is recorded in a lead-in area formed on said recording medium.

3. The disk shaped recording medium according to claim 1, wherein said predetermined information further includes material information indicating a material of recording layer of said recording medium.

* * * * *